(12) United States Patent
Possos et al.

(10) Patent No.: US 11,093,788 B2
(45) Date of Patent: Aug. 17, 2021

(54) SCENE CHANGE DETECTION

(71) Applicant: Intel Corporation, Santa Clara, CA (US)

(72) Inventors: Sebastian Possos, Sammamish, WA (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 15/891,811

(22) Filed: Feb. 8, 2018

(65) Prior Publication Data
US 2019/0042874 A1     Feb. 7, 2019

(51) Int. Cl.
| | |
|---|---|
| *G06K 9/62* | (2006.01) |
| *H04N 19/142* | (2014.01) |
| *H04N 5/14* | (2006.01) |
| *G06K 9/46* | (2006.01) |
| *G06K 9/00* | (2006.01) |
| *G06N 5/00* | (2006.01) |
| *H04N 19/179* | (2014.01) |
| *H04N 19/107* | (2014.01) |
| *G06N 20/20* | (2019.01) |
| *H04N 19/114* | (2014.01) |

(52) U.S. Cl.
CPC ....... *G06K 9/6202* (2013.01); *G06K 9/00765* (2013.01); *G06K 9/4604* (2013.01); *G06N 5/003* (2013.01); *G06N 20/20* (2019.01); *H04N 5/147* (2013.01); *H04N 19/107* (2014.11); *H04N 19/114* (2014.11); *H04N 19/142* (2014.11); *H04N 19/179* (2014.11)

(58) Field of Classification Search
CPC combination set(s) only.
See application file for complete search history.

(56) References Cited

U.S. PATENT DOCUMENTS

| | | | | |
|---|---|---|---|---|
| 5,099,322 A | * | 3/1992 | Gove | G08B 13/19602 |
| | | | | 348/700 |
| 5,828,786 A | * | 10/1998 | Rao | G06K 9/00711 |
| | | | | 382/236 |

(Continued)

OTHER PUBLICATIONS

V. Chasanis et al., "Simultaneous detection of abrupt cuts and dissolves in videos using support vector machines," retrieved from <academia.edu/2453501/Simultaneous_detection_of_abrupt_cuts_and_dissolves_in_videos_using_support_vector_machines>, Pattern Recognition Letters 30, pp. 55-65, Sep. 6, 2008.

(Continued)

*Primary Examiner* — Zhiyu Lu
(74) *Attorney, Agent, or Firm* — Jordan IP Law, LLC

(57) ABSTRACT

Methods, apparatuses and systems may provide for technology that quickly and accurately detects scene changes by evaluating a current frame based at least in part on a plurality of feature groups. Each of the feature groups may include a plurality of feature values determined from individual features. The individual features may include one or more spatial features of the current frame and one or more temporal features of the current frame as compared with previously evaluated temporal features of a previous reference frame. A determination of whether a scene change has occurred at the current frame may be made based at least in part on a majority vote among the plurality of feature groups.

21 Claims, 54 Drawing Sheets

(56) References Cited

U.S. PATENT DOCUMENTS

| | | | | |
|---|---|---|---|---|
| 6,055,025 | A * | 4/2000 | Shahraray | G11B 27/031 348/700 |
| 6,327,390 | B1 * | 12/2001 | Sun | H04N 5/147 348/E5.067 |
| 7,227,893 | B1 * | 6/2007 | Srinivasa | G06K 9/00771 348/155 |
| 7,408,986 | B2 * | 8/2008 | Winder | H04N 5/145 348/699 |
| 7,558,320 | B2 * | 7/2009 | Winder | H04N 5/145 348/699 |
| 7,974,849 | B1 * | 7/2011 | Begole | G06Q 10/10 705/1.1 |
| 8,903,130 | B1 * | 12/2014 | Carceroni | H04N 21/8106 382/103 |
| 2004/0125877 | A1 * | 7/2004 | Chang | H04N 21/2343 375/240.28 |
| 2007/0171972 | A1 * | 7/2007 | Tian | H04N 7/0112 375/240.12 |
| 2009/0086814 | A1 * | 4/2009 | Leontaris | H04N 19/17 375/240.02 |
| 2010/0098342 | A1 * | 4/2010 | Davis | G06K 9/00476 382/220 |
| 2011/0051809 | A1 * | 3/2011 | Lee | H04N 19/142 375/240.08 |
| 2011/0085734 | A1 * | 4/2011 | Berg | G06F 16/785 382/195 |
| 2011/0109758 | A1 * | 5/2011 | Liang | H04N 19/46 348/222.1 |
| 2012/0033933 | A1 * | 2/2012 | Suzuki | G11B 27/105 386/230 |
| 2014/0355667 | A1 * | 12/2014 | Lei | H04N 19/593 375/240.02 |
| 2016/0189388 | A1 * | 6/2016 | Gupta | G06T 7/11 382/180 |
| 2018/0343448 | A1 * | 11/2018 | Possos | H04N 19/117 |

OTHER PUBLICATIONS

J. Korpi-Anttila, "Automatic Colour Enhancement and Scene Change Detection of Digital Video," Thesis, Lab of Media Technology, Helsinki Univ. Technology, retrieved from <citeseerx.ist.psu.edu/viewdoc/download?doi=10.1.1.583.6013&rep=rep1&type=pdf>, Graphics Arts in Finland 32, 2002, 10 pages.

R. Lenhart., "Reliable Transition Detection in Videos: A Survey and Practitioner's Guide," retrieved from <pdfs.semanticscholar.org/10c8/691e23dffadab19c39fb9245496efbf75b2a.pdf_ga=2.158633146.1466876878.1615992823-1324978837.1615992823>, Int. Journal Image Graphics, 2001, 18 pages.

R. Lenhart, "Comparison of Automatic Shot Boundary Detection Algorithms," retrieved from <image.ece.ntua.gr/Dourses_static/dip/advanced/material/shot/Comparison%20of%20Automatic%20Shot%20Boundary%20Detection%20Algorithms.pdf>, Electronic Imaging, 1999, 12 pages.

W. Ren et al., "Automatic Video Shot Boundary Detection Using Machine Learning,"Intelligent Data Engineering and Automated Learning (IDEAL), 2004, Springer Verlag., pp. 301-308.

A. Smeaton et al., "Video shot boundary detection: Seven years of TRECVid activity," Computer Vision and Image Understanding, retrieved from <doras.dcu.ie/4080/1/sbretro.pdf>, 2010, 25 pages.

H. Witten et al., "Data Mining: Practical Machine Learning Tools and Techniques," 3rd Edition, Morgan Kaufman, 2011, 625 pages.

* cited by examiner

2500

| 1446 | 1400 | 1341 | 1399 | 1266 | 1274 | Rs |
|---|---|---|---|---|---|---|
| 866 | 863 | 858 | 850 | 859 | 933 | Cs |
| 2312 | 2263 | 2199 | 2149 | 2124 | 2209 | SC |
| 9 | 8 | 8 | 9 | 9 | 9 | AFD |
| 5 | 4 | 4 | 4 | 3 | 5 | TSC |
| 3 | 3 | 3 | 3 | 3 | 3 | RsDiff |
| 2 | 2 | 3 | 3 | 2 | 3 | CsDiff |
| 13 | 13 | 18 | 18 | 13 | 18 | RsCsDiff |
| 2 | 2 | 3 | 2 | 3 | 5 | MVDiff |
| 88 | 86 | 85 | 84 | 84 | 84 | srDCval |
| 86 | 85 | 84 | 84 | 84 | 84 | refDCval |
| 2 | 1 | 1 | 0 | 0 | 0 | gchDC |
| 45 | 33 | 37 | 38 | 36 | 35 | posBalance |
| 22 | 25 | 26 | 29 | 30 | 33 | negBalance |
| 1 | 0 | -1 | 0 | 0 | 9 | diffAFD |
| 1 | 0 | 0 | 1 | -2 | 5 | diffTSC |
| 0 | -5 | 0 | 5 | -5 | 18 | diffRsCsdiff |
| 0 | -1 | 1 | -1 | -2 | 5 | diffMVdiff |
| 0 | 0 | 0 | 0 | 0 | 0 | Scindex |
| 6 | 5 | 5 | 5 | 4 | 6 | TSCindex |
| 0 | 0 | 0 | 0 | 0 | 0 | groundtruth |

| 2860 | 2869 | 2909 | 2866 | 2873 | 2867 | 2878 | 2866 | 1511 | 1533 | 1498 |
|---|---|---|---|---|---|---|---|---|---|---|
| 3984 | 3982 | 3026 | 2981 | 3032 | 2946 | 2888 | 2960 | 960 | 911 | 889 |
| 5854 | 5851 | 5935 | 5787 | 5905 | 5813 | 5766 | 5766 | 2471 | 2444 | 2387 |
| 7 | 4 | 4 | 4 | 8 | 10 | 11 | 10 | 41 | 10 | 9 |
| 7 | 4 | 4 | 5 | 8 | 9 | 9 | 9 | 26 | 6 | 5 |
| 7 | 4 | 4 | 5 | 7 | 9 | 9 | 8 | 21 | 4 | 4 |
| 8 | 4 | 5 | 6 | 9 | 9 | 10 | 9 | 21 | 3 | 3 |
| 113 | 33 | 41 | 61 | 130 | 162 | 181 | 145 | 882 | 35 | 35 |
| 0 | 0 | 0 | 0 | 1 | 2 | 2 | 87 | 83 | 5 | 4 |
| 94 | 94 | 93 | 93 | 93 | 93 | 93 | 94 | 94 | 92 | 90 |
| 94 | 93 | 93 | 93 | 93 | 93 | 94 | 94 | 92 | 90 | 88 |
| 0 | 1 | 0 | 0 | 0 | 0 | 1 | 0 | 2 | 2 | 2 |
| 33 | 26 | 23 | 24 | 31 | 36 | 34 | 37 | 65 | 43 | 46 |
| 23 | 14 | 16 | 18 | 27 | 30 | 34 | 32 | 54 | 39 | 36 |
| 3 | 0 | 0 | -4 | -2 | -1 | 1 | -31 | 31 | 1 | 0 |
| 3 | 0 | -1 | -3 | -4 | 0 | 0 | -17 | 30 | 1 | 0 |
| 81 | -9 | -30 | -69 | -32 | -19 | 36 | -737 | 857 | 0 | 12 |
| 0 | 0 | 0 | -1 | -1 | 0 | -85 | 4 | 78 | 1 | 2 |
| 0 | 0 | 0 | 0 | 0 | 0 | 0 | 0 | 0 | 0 | 0 |
| 8 | 5 | 5 | 6 | 9 | 9 | 9 | 9 | 9 | 7 | 6 |
| 0 | 0 | 0 | 0 | 0 | 0 | 0 | 0 | 1 | 0 | 0 |

| 2968 | 3097 | 3031 | 2948 | 2928 | 3085 | 2965 | 2860 | 2876 | 2858 | 2887 |
|---|---|---|---|---|---|---|---|---|---|---|
| 2955 | 2966 | 2946 | 2973 | 3018 | 3041 | 2972 | 3007 | 2980 | 2959 | 2932 |
| 5923 | 6063 | 5977 | 5921 | 5946 | 6126 | 5937 | 5867 | 5856 | 5817 | 5819 |
| 13 | 12 | 11 | 8 | 7 | 5 | 6 | 6 | 5 | 6 | 8 |
| 10 | 10 | 10 | 8 | 8 | 6 | 6 | 6 | 5 | 6 | 8 |
| 10 | 10 | 11 | 9 | 8 | 7 | 8 | 8 | 7 | 7 | 8 |
| 9 | 10 | 10 | 8 | 8 | 4 | 6 | 6 | 5 | 6 | 7 |
| 181 | 200 | 221 | 145 | 128 | 65 | 100 | 100 | 74 | 85 | 113 |
| 2 | 2 | 3 | 2 | 0 | 0 | 1 | 1 | 0 | 0 | 0 |
| 97 | 97 | 97 | 97 | 97 | 96 | 96 | 96 | 95 | 94 | 94 |
| 97 | 97 | 97 | 97 | 96 | 96 | 95 | 95 | 94 | 94 | 94 |
| 0 | 0 | 0 | 0 | 1 | 0 | 1 | 0 | 1 | 0 | 0 |
| 38 | 41 | 37 | 36 | 36 | 30 | 33 | 30 | 28 | 29 | 31 |
| 36 | 34 | 35 | 26 | 24 | 20 | 19 | 21 | 19 | 20 | 28 |
| 1 | 1 | 3 | 1 | 2 | -1 | 0 | 1 | -1 | -2 | 1 |
| 0 | 0 | 2 | 0 | 2 | 0 | 0 | 1 | -1 | -2 | 1 |
| -19 | -21 | 76 | 17 | 63 | -35 | 0 | 36 | -11 | -38 | 0 |
| 0 | -1 | 1 | 2 | 0 | -1 | 0 | 1 | 0 | 0 | 0 |
| 0 | 0 | 0 | 0 | 0 | 0 | 0 | 0 | 0 | 0 | 0 |
| 9 | 9 | 9 | 9 | 9 | 7 | 7 | 7 | 6 | 7 | 9 |
| 0 | 0 | 0 | 0 | 0 | 0 | 0 | 0 | 0 | 0 | 0 |

| 3339 | 3276 | 3290 | 3252 | 3254 | 3126 | 3069 | 3012 | 3000 | 3014 | 2922 |
|------|------|------|------|------|------|------|------|------|------|------|
| 3247 | 3128 | 3139 | 3088 | 3149 | 3045 | 3008 | 2918 | 2973 | 2994 | 2810 |
| 6576 | 6404 | 6419 | 6340 | 6403 | 6171 | 6077 | 5930 | 5973 | 6008 | 5732 |
| 12 | 13 | 14 | 14 | 14 | 13 | 14 | 15 | 15 | 14 | 14 |
| 8 | 6 | 4 | 4 | 5 | 4 | 4 | 4 | 4 | 5 | 9 |
| 8 | 9 | 8 | 9 | 9 | 8 | 7 | 8 | 9 | 9 | 11 |
| 9 | 10 | 8 | 9 | 9 | 7 | 8 | 10 | 9 | 8 | 10 |
| 145 | 181 | 128 | 163 | 163 | 113 | 113 | 164 | 162 | 145 | 221 |
| 0 | 0 | 0 | 0 | 0 | 0 | 0 | 0 | 0 | 0 | 1 |
| 98 | 98 | 98 | 98 | 98 | 98 | 98 | 98 | 98 | 98 | 97 |
| 98 | 98 | 98 | 98 | 98 | 98 | 98 | 98 | 98 | 97 | 97 |
| 0 | 0 | 0 | 0 | 0 | 0 | 0 | 0 | 0 | 1 | 0 |
| 35 | 39 | 39 | 40 | 40 | 38 | 40 | 42 | 42 | 42 | 41 |
| 34 | 36 | 38 | 39 | 36 | 40 | 38 | 38 | 39 | 37 | 38 |
| -1 | -1 | 0 | 0 | -1 | 1 | -1 | 0 | 1 | 0 | 1 |
| 2 | 2 | 0 | -1 | 1 | 0 | 0 | 0 | -1 | -4 | -1 |
| -36 | 53 | -34 | 0 | 49 | 0 | -31 | 2 | 17 | -28 | 40 |
| 0 | 0 | 0 | 0 | 0 | 0 | 0 | 0 | 0 | -1 | -1 |
| 0 | 0 | 0 | 0 | 0 | 0 | 0 | 0 | 0 | 0 | 0 |
| 9 | 7 | 5 | 5 | 6 | 5 | 5 | 5 | 5 | 6 | 9 |
| 0 | 0 | 0 | 0 | 0 | 0 | 0 | 0 | 0 | 0 | 0 |

| 3616 | 3433 | 3442 | 3392 | 3412 | 3383 | 3443 | 3346 | 3274 | 3236 | 3315 |
|------|------|------|------|------|------|------|------|------|------|------|
| 3473 | 3283 | 3506 | 3382 | 3372 | 3516 | 3372 | 3312 | 3159 | 3028 | 3207 |
| 7089 | 6716 | 6948 | 6774 | 6784 | 6899 | 6815 | 6658 | 6433 | 6164 | 6522 |
| 9 | 10 | 11 | 11 | 13 | 12 | 11 | 12 | 13 | 13 | 13 |
| 9 | 9 | 10 | 9 | 8 | 9 | 10 | 9 | 7 | 7 | 7 |
| 9 | 9 | 9 | 9 | 10 | 10 | 10 | 10 | 9 | 9 | 9 |
| 10 | 10 | 11 | 12 | 10 | 10 | 10 | 10 | 10 | 11 | 10 |
| 181 | 181 | 202 | 225 | 200 | 200 | 200 | 200 | 181 | 202 | 181 |
| 1 | 1 | 1 | 0 | 1 | 1 | 2 | 1 | 0 | 0 | 0 |
| 97 | 97 | 96 | 97 | 96 | 96 | 97 | 97 | 97 | 98 | 98 |
| 97 | 96 | 97 | 96 | 96 | 97 | 97 | 97 | 98 | 98 | 98 |
| 0 | 1 | 1 | 1 | 0 | 1 | 0 | 0 | 1 | 0 | 0 |
| 34 | 34 | 35 | 37 | 37 | 37 | 35 | 34 | 37 | 34 | 38 |
| 30 | 31 | 33 | 33 | 35 | 35 | 34 | 36 | 36 | 36 | 36 |
| -1 | -1 | 0 | -2 | 1 | 1 | -1 | -1 | 1 | -1 | 1 |
| 0 | -1 | 1 | 1 | -1 | -1 | 1 | 2 | 0 | 0 | -1 |
| 0 | -21 | -23 | 25 | 0 | 0 | 0 | 19 | -21 | 22 | 36 |
| 0 | 0 | 1 | -1 | 0 | -1 | 1 | 1 | 0 | 0 | 0 |
| 1 | 0 | 1 | 0 | 0 | 1 | 0 | 0 | 0 | 0 | 0 |
| 9 | 9 | 9 | 9 | 9 | 9 | 9 | 9 | 8 | 8 | 8 |
| 0 | 0 | 0 | 0 | 0 | 0 | 0 | 0 | 0 | 0 | 0 |

FIG. 25E

| 3396 | 3408 | 3176 | 3295 | 3589 | 3368 | 3469 | 3630 | 3435 | 3532 | 3492 |
|---|---|---|---|---|---|---|---|---|---|---|
| 3316 | 3327 | 3176 | 3095 | 3333 | 3211 | 3274 | 3416 | 3256 | 3394 | 3317 |
| 6712 | 6735 | 6352 | 6390 | 6922 | 6579 | 6733 | 7046 | 6691 | 6826 | 6809 |
| 11 | 11 | 12 | 12 | 11 | 9 | 8 | 8 | 6 | 7 | 7 |
| 11 | 10 | 11 | 10 | 10 | 9 | 8 | 9 | 7 | 7 | 7 |
| 10 | 10 | 11 | 10 | 11 | 9 | 8 | 9 | 7 | 7 | 7 |
| 11 | 10 | 11 | 10 | 10 | 9 | 8 | 9 | 7 | 8 | 8 |
| 221 | 200 | 242 | 200 | 221 | 162 | 128 | 162 | 98 | 113 | 113 |
| 2 | 1 | 2 | 1 | 1 | 0 | 0 | 0 | 0 | 0 | 0 |
| 96 | 96 | 97 | 96 | 96 | 96 | 96 | 96 | 97 | 97 | 96 |
| 96 | 97 | 96 | 96 | 96 | 96 | 96 | 97 | 97 | 96 | 97 |
| 0 | 1 | 1 | 0 | 0 | 0 | 0 | 1 | 0 | 1 | 1 |
| 39 | 36 | 41 | 40 | 39 | 37 | 33 | 32 | 29 | 32 | 29 |
| 34 | 34 | 33 | 35 | 33 | 31 | 29 | 29 | 24 | 28 | 26 |
| 0 | -1 | 0 | 1 | 2 | 1 | 0 | 2 | -1 | 0 | -2 |
| 1 | -1 | 1 | 0 | 1 | 1 | -1 | 2 | 0 | 0 | -2 |
| 21 | -43 | 42 | -21 | 59 | 34 | -34 | 64 | -43 | 0 | -68 |
| 1 | -1 | 1 | 0 | 1 | 0 | 0 | 0 | 0 | 0 | -1 |
| 0 | 0 | 0 | 0 | 1 | 0 | 0 | 1 | 0 | 0 | 0 |
| 9 | 9 | 9 | 9 | 9 | 9 | 9 | 9 | 8 | 8 | 8 |
| 0 | 0 | 0 | 0 | 0 | 0 | 0 | 0 | 0 | 0 | 0 |

2500 ⇘

| 1846 | 1999 | 2243 | 2340 | 2441 | 2415 | 2437 | 2500 | 2504 | 3426 | 3485 |
|---|---|---|---|---|---|---|---|---|---|---|
| 1742 | 1861 | 2294 | 2495 | 2631 | 2318 | 2530 | 2600 | 2623 | 3371 | 3441 |
| 3587 | 3960 | 4537 | 4835 | 5072 | 4733 | 4867 | 5100 | 5127 | 6797 | 6936 |
| 9 | 9 | 8 | 8 | 9 | 11 | 9 | 6 | 8 | 44 | 10 |
| 6 | 7 | 6 | 6 | 6 | 9 | 6 | 5 | 6 | 34 | 10 |
| 6 | 6 | 6 | 5 | 6 | 7 | 5 | 4 | 5 | 30 | 10 |
| 5 | 4 | 5 | 5 | 7 | 7 | 7 | 4 | 5 | 31 | 11 |
| 61 | 82 | 61 | 50 | 85 | 98 | 74 | 32 | 50 | 1861 | 221 |
| 11 | 8 | 6 | 5 | 9 | 13 | 22 | 12 | 72 | 64 | 3 |
| 65 | 65 | 66 | 69 | 71 | 73 | 71 | 77 | 80 | 83 | 96 |
| 65 | 66 | 69 | 71 | 73 | 71 | 77 | 80 | 83 | 96 | 96 |
| 0 | 1 | 3 | 2 | 2 | 2 | 6 | 3 | 3 | 13 | 0 |
| 32 | 29 | 22 | 20 | 25 | 30 | 11 | 14 | 23 | 40 | 37 |
| 24 | 25 | 25 | 29 | 29 | 27 | 27 | 30 | 32 | 80 | 32 |
| 0 | 1 | 0 | -1 | -2 | 2 | 3 | -2 | -36 | 34 | -1 |
| -1 | 1 | 0 | 0 | -3 | 3 | 1 | -1 | -28 | 24 | -1 |
| 9 | -9 | 11 | -35 | -13 | 24 | 43 | -18 | -1811 | 1640 | 0 |
| 5 | 2 | 1 | -4 | -4 | -9 | 10 | -60 | 3 | 61 | 1 |
| 0 | 0 | 0 | 0 | 0 | 0 | 0 | 0 | 0 | 0 | 1 |
| 7 | 8 | 7 | 7 | 7 | 9 | 7 | 6 | 7 | 9 | 9 |
| 0 | 0 | 0 | 0 | 0 | 0 | 0 | 0 | 0 | 1 | 0 |

| 1512 | 1240 | 1130 | 1055 | 865 | 633 | 916 | 1235 | 1321 | 1562 | 1768 |
|------|------|------|------|-----|-----|-----|------|------|------|------|
| 2185 | 1698 | 1491 | 778 | 1224 | 1437 | 1556 | 1368 | 1422 | 1481 | 1359 |
| 3697 | 2918 | 2621 | 1833 | 2089 | 2070 | 2472 | 2603 | 2743 | 3043 | 3227 |
| 27 | 38 | 38 | 43 | 45 | 41 | 37 | 31 | 27 | 19 | 12 |
| 11 | 16 | 12 | 13 | 15 | 13 | 10 | 7 | 8 | 7 | 5 |
| 8 | 10 | 11 | 9 | 8 | 8 | 8 | 9 | 10 | 9 | 7 |
| 14 | 15 | 13 | 13 | 12 | 16 | 15 | 13 | 10 | 8 | 5 |
| 260 | 325 | 290 | 250 | 208 | 330 | 289 | 250 | 200 | 145 | 74 |
| 56 | 50 | 47 | 54 | 62 | 60 | 37 | 34 | 23 | 10 | 7 |
| 81 | 94 | 98 | 100 | 92 | 83 | 78 | 81 | 77 | 70 | 67 |
| 94 | 98 | 100 | 92 | 82 | 78 | 81 | 77 | 70 | 67 | 65 |
| 13 | 4 | 2 | 8 | 10 | 4 | 3 | 4 | 7 | 3 | 2 |
| 36 | 53 | 59 | 71 | 71 | 65 | 58 | 65 | 64 | 52 | 40 |
| 60 | 51 | 50 | 43 | 46 | 51 | 54 | 43 | 35 | 33 | 29 |
| -11 | 0 | -5 | -2 | 4 | 4 | 6 | 4 | 8 | 7 | 3 |
| -5 | 4 | -1 | -2 | 3 | 3 | 3 | -1 | 1 | 3 | -1 |
| -65 | 35 | 40 | 42 | -112 | 31 | 39 | 30 | 55 | 71 | 13 |
| 6 | 3 | -7 | -8 | 2 | 23 | 3 | 11 | 13 | 3 | -4 |
| 0 | 0 | 0 | 0 | 0 | 0 | 0 | 0 | 0 | 0 | 0 |
| 9 | 9 | 9 | 9 | 9 | 9 | 9 | 8 | 9 | 8 | 6 |
| 0 | 0 | 0 | 0 | 0 | 0 | 0 | 0 | 0 | 0 | 0 |

| 1953 | 1839 | 1837 | 1990 | 1892 | 1790 | 1523 | 1308 | 1328 | 1343 | 1396 |
|---|---|---|---|---|---|---|---|---|---|---|
| 2750 | 2964 | 2678 | 3008 | 2401 | 1986 | 1595 | 1410 | 1394 | 1561 | 1765 |
| 4703 | 4803 | 4515 | 4998 | 4293 | 3766 | 3118 | 2718 | 2722 | 2904 | 3161 |
| 19 | 25 | 28 | 36 | 26 | 28 | 32 | 33 | 33 | 29 | 21 |
| 10 | 9 | 9 | 33 | 11 | 12 | 10 | 10 | 12 | 11 | 9 |
| 6 | 7 | 7 | 21 | 9 | 9 | 9 | 9 | 8 | 8 | 6 |
| 12 | 13 | 14 | 32 | 14 | 13 | 12 | 13 | 13 | 15 | 12 |
| 180 | 218 | 245 | 1465 | 277 | 259 | 225 | 250 | 233 | 289 | 180 |
| 13 | 8 | 90 | 99 | 58 | 58 | 38 | 60 | 71 | 55 | 41 |
| 97 | 99 | 103 | 104 | 85 | 90 | 92 | 92 | 89 | 83 | 82 |
| 99 | 103 | 104 | 85 | 90 | 92 | 92 | 89 | 83 | 82 | 81 |
| 2 | 4 | 1 | 19 | 5 | 2 | 0 | 3 | 6 | 1 | 1 |
| 41 | 44 | 49 | 78 | 45 | 49 | 51 | 55 | 59 | 50 | 42 |
| 40 | 45 | 45 | 44 | 47 | 43 | 38 | 37 | 38 | 48 | 44 |
| -4 | -3 | -8 | 10 | -2 | -4 | -1 | 0 | 4 | 8 | -6 |
| 1 | 0 | -24 | 22 | -1 | 2 | 0 | -2 | 1 | 2 | -2 |
| -38 | -27 | -1230 | 1188 | 27 | 25 | -25 | 17 | -56 | 109 | -80 |
| 5 | -82 | -9 | 41 | 0 | 0 | -2 | -11 | 16 | 14 | -15 |
| 0 | 0 | 0 | 0 | 0 | 0 | 0 | 0 | 0 | 0 | 0 |
| 9 | 9 | 9 | 9 | 9 | 9 | 9 | 9 | 9 | 9 | 9 |
| 0 | 0 | 0 | 1 | 0 | 0 | 0 | 0 | 0 | 0 | 0 |

| 2425 | 2185 | 2171 | 2115 | 2138 |
|------|------|------|------|------|
| 3782 | 3334 | 3305 | 3043 | 2653 |
| 6207 | 5519 | 5476 | 5158 | 4791 |
| 21 | 21 | 21 | 19 | 18 |
| 9 | 11 | 12 | 11 | 10 |
| 8 | 8 | 8 | 9 | 7 |
| 14 | 16 | 15 | 12 | 11 |
| 260 | 320 | 289 | 225 | 170 |
| 9 | 6 | 7 | 6 | 14 |
| 100 | 100 | 99 | 97 | 97 |
| 100 | 99 | 97 | 97 | 97 |
| 0 | 1 | 2 | 0 | 0 |
| 40 | 40 | 44 | 43 | 41 |
| 38 | 40 | 40 | 41 | 38 |
| 0 | 0 | 2 | 1 | -1 |
| -2 | -1 | 1 | 1 | 0 |
| -60 | 31 | 64 | 55 | -10 |
| 3 | -1 | 1 | -8 | 1 |
| 0 | 0 | 0 | 0 | 0 |
| 9 | 9 | 9 | 9 | 9 |
| 0 | 0 | 0 | 0 | 0 |

| | | | | |
|---|---|---|---|---|
| 5563 | 5705 | 5688 | 5771 | Rs |
| 4923 | 5122 | 4975 | 4904 | Cs |
| 10486 | 10827 | 10663 | 10675 | SC |
| 8 | 7 | 7 | 6 | AFD |
| 9 | 8 | 7 | 6 | TSC |
| 14 | 12 | 12 | 11 | RsDiff |
| 15 | 12 | 12 | 9 | CsDiff |
| 421 | 288 | 288 | 202 | RsCsDiff |
| 0 | 0 | 0 | 0 | MVDiff |
| 77 | 77 | 77 | 77 | ssDCval |
| 77 | 77 | 77 | 77 | refDCval |
| 0 | 0 | 0 | 0 | gchDC |
| 29 | 28 | 26 | 23 | posBalance |
| 27 | 24 | 24 | 31 | negBalance |
| 1 | 0 | 1 | 0 | diffAFD |
| 1 | 1 | 1 | 0 | diffTSC |
| 133 | 0 | 86 | 2 | diffRsCsdif |
| 0 | 0 | 0 | 0 | diffMVdiff |
| 1 | 1 | 1 | 1 | Scindex |
| 9 | 9 | 8 | 7 | TSCindex |
| 0 | 0 | 0 | 0 | groundtruth |

| 2404 | 2434 | 2405 | 2423 | 2336 | 2243 | 2432 | 5660 | 5705 | 5641 | 5789 |
|------|------|------|------|------|------|------|------|------|------|------|
| 1001 | 1033 | 933 | 878 | 959 | 838 | 860 | 5188 | 5134 | 4991 | 5054 |
| 3405 | 3467 | 3338 | 3301 | 3295 | 3081 | 3292 | 10848 | 10839 | 10652 | 10843 |
| 9 | 10 | 8 | 8 | 9 | 8 | 9 | 29 | 7 | 7 | 7 |
| 4 | 4 | 4 | 4 | 4 | 5 | 4 | 24 | 7 | 8 | 8 |
| 5 | 5 | 4 | 4 | 5 | 5 | 6 | 48 | 10 | 11 | 12 |
| 6 | 4 | 3 | 3 | 4 | 5 | 3 | 39 | 11 | 14 | 12 |
| 61 | 41 | 25 | 25 | 41 | 50 | 45 | 3825 | 221 | 317 | 288 |
| 4 | 3 | 7 | 7 | 4 | 6 | 61 | 60 | 0 | 0 | 0 |
| 81 | 80 | 80 | 80 | 79 | 79 | 78 | 77 | 78 | 78 | 77 |
| 80 | 80 | 80 | 79 | 79 | 78 | 77 | 78 | 78 | 77 | 77 |
| 1 | 0 | 0 | 1 | 0 | 1 | 1 | 1 | 0 | 1 | 0 |
| 33 | 34 | 32 | 33 | 34 | 35 | 38 | 64 | 27 | 27 | 28 |
| 25 | 27 | 25 | 25 | 25 | 25 | 27 | 53 | 22 | 24 | 25 |
| -1 | 2 | 0 | -1 | 1 | -1 | -20 | 22 | 0 | 0 | -1 |
| 0 | 0 | 0 | 0 | -1 | 1 | -20 | 17 | -1 | 0 | -1 |
| 29 | 16 | 0 | -16 | -9 | 5 | -3780 | 3604 | -96 | 29 | -133 |
| 1 | -4 | 0 | 3 | -2 | -55 | 1 | 60 | 0 | 0 | 0 |
| 0 | 0 | 0 | 0 | 0 | 0 | 0 | 1 | 1 | 1 | 1 |
| 5 | 5 | 5 | 5 | 5 | 6 | 5 | 9 | 8 | 9 | 9 |
| 0 | 0 | 0 | 0 | 0 | 0 | 0 | 1 | 0 | 0 | 0 |

| 2095 | 2195 | 2307 | 2430 | 2239 | 2243 | 2305 | 2271 | 2266 | 2286 | 2261 |
|---|---|---|---|---|---|---|---|---|---|---|
| 1190 | 1359 | 1460 | 1479 | 1343 | 1247 | 1132 | 1115 | 1040 | 958 | 924 |
| 3285 | 3554 | 3767 | 3909 | 3582 | 3490 | 3437 | 3386 | 3306 | 3244 | 3185 |
| 11 | 10 | 10 | 10 | 10 | 9 | 9 | 10 | 9 | 10 | 9 |
| 4 | 4 | 4 | 5 | 5 | 4 | 4 | 4 | 3 | 3 | 4 |
| 6 | 6 | 5 | 6 | 6 | 5 | 6 | 5 | 4 | 5 | 4 |
| 6 | 5 | 5 | 5 | 5 | 4 | 5 | 6 | 4 | 3 | 3 |
| 72 | 61 | 50 | 61 | 61 | 41 | 61 | 61 | 32 | 34 | 25 |
| 5 | 7 | 11 | 3 | 1 | 3 | 1 | 2 | 3 | 3 | 2 |
| 77 | 77 | 79 | 80 | 81 | 81 | 81 | 82 | 82 | 82 | 81 |
| 77 | 79 | 80 | 81 | 81 | 81 | 82 | 82 | 82 | 81 | 81 |
| 0 | 2 | 1 | 1 | 0 | 0 | 1 | 0 | 0 | 1 | 0 |
| 36 | 33 | 33 | 34 | 34 | 33 | 34 | 34 | 33 | 34 | 34 |
| 31 | 30 | 32 | 31 | 30 | 30 | 31 | 31 | 28 | 29 | 27 |
| 1 | 0 | 0 | 0 | 1 | 0 | -1 | 1 | -1 | 1 | 0 |
| 0 | 0 | -1 | 0 | 1 | 0 | 0 | 1 | 0 | -1 | 0 |
| 11 | 11 | -11 | 0 | 20 | -20 | 0 | 29 | -2 | 9 | -36 |
| -2 | -4 | 8 | 2 | -2 | 2 | -1 | -1 | 0 | 1 | -2 |
| 0 | 0 | 0 | 0 | 0 | 0 | 0 | 0 | 0 | 0 | 0 |
| 5 | 5 | 5 | 6 | 6 | 5 | 5 | 5 | 4 | 4 | 5 |
| 0 | 0 | 0 | 0 | 0 | 0 | 0 | 0 | 0 | 0 | 0 |

| 1671 | 1633 | 1630 | 1540 | 1546 | 1500 | 1595 | 1666 | 1659 | 1848 | 2001 |
|---|---|---|---|---|---|---|---|---|---|---|
| 942 | 974 | 997 | 982 | 961 | 1011 | 964 | 944 | 1034 | 1198 | 1304 |
| 2613 | 2607 | 2627 | 2522 | 2507 | 2511 | 2559 | 2610 | 2693 | 3046 | 3305 |
| 7 | 7 | 9 | 9 | 10 | 12 | 12 | 13 | 12 | 12 | 11 |
| 4 | 3 | 4 | 4 | 4 | 4 | 4 | 4 | 5 | 5 | 4 |
| 3 | 4 | 4 | 4 | 4 | 4 | 5 | 5 | 5 | 5 | 5 |
| 3 | 3 | 6 | 4 | 4 | 4 | 6 | 6 | 5 | 6 | 4 |
| 18 | 25 | 52 | 32 | 32 | 32 | 61 | 61 | 50 | 61 | 41 |
| 4 | 2 | 3 | 3 | 5 | 3 | 5 | 5 | 3 | 3 | 5 |
| 69 | 69 | 70 | 70 | 71 | 72 | 73 | 74 | 75 | 75 | 76 |
| 69 | 70 | 70 | 71 | 72 | 73 | 74 | 75 | 75 | 76 | 77 |
| 0 | 1 | 0 | 1 | 1 | 1 | 1 | 1 | 0 | 1 | 1 |
| 28 | 27 | 31 | 31 | 31 | 32 | 33 | 36 | 36 | 37 | 35 |
| 23 | 23 | 26 | 27 | 31 | 32 | 32 | 33 | 33 | 33 | 31 |
| 0 | -2 | 0 | -1 | -2 | 0 | -1 | 1 | 0 | 1 | 0 |
| 1 | -1 | 0 | 0 | 0 | 0 | 0 | -1 | 0 | 1 | 0 |
| -2 | -27 | 20 | 0 | 0 | -29 | 0 | 11 | -11 | 20 | -31 |
| 2 | -4 | 0 | -2 | 2 | -2 | 0 | 2 | 0 | -2 | 0 |
| 0 | 0 | 0 | 0 | 0 | 0 | 0 | 0 | 0 | 0 | 0 |
| 5 | 4 | 5 | 5 | 5 | 5 | 5 | 5 | 6 | 6 | 5 |
| 0 | 0 | 0 | 0 | 0 | 0 | 0 | 0 | 0 | 0 | 0 |

| 1799 | 1710 | 1626 | 1636 | 1587 | 1543 | 1640 | 1612 | 1632 | 1687 | 1671 |
|------|------|------|------|------|------|------|------|------|------|------|
| 1175 | 1125 | 1023 | 1018 | 993  | 961  | 1025 | 1059 | 1059 | 984  | 983  |
| 2974 | 2835 | 2649 | 2654 | 2580 | 2504 | 2665 | 2671 | 2691 | 2671 | 2654 |
| 9    | 9    | 8    | 8    | 7    | 8    | 8    | 9    | 9    | 8    | 8    |
| 5    | 5    | 4    | 4    | 4    | 5    | 4    | 5    | 5    | 4    | 4    |
| 5    | 4    | 4    | 3    | 4    | 5    | 4    | 4    | 6    | 4    | 4    |
| 5    | 4    | 6    | 3    | 3    | 4    | 4    | 4    | 4    | 5    | 3    |
| 30   | 32   | 32   | 18   | 25   | 41   | 32   | 32   | 32   | 41   | 25   |
| 4    | 3    | 2    | 2    | 3    | 3    | 2    | 3    | 4    | 4    | 5    |
| 69   | 69   | 69   | 68   | 68   | 68   | 68   | 69   | 69   | 69   | 69   |
| 69   | 69   | 68   | 68   | 68   | 68   | 69   | 69   | 69   | 69   | 69   |
| 0    | 0    | 1    | 0    | 0    | 0    | 1    | 0    | 0    | 0    | 0    |
| 34   | 33   | 32   | 32   | 32   | 33   | 31   | 34   | 34   | 32   | 31   |
| 29   | 26   | 24   | 25   | 23   | 27   | 26   | 28   | 25   | 25   | 24   |
| 0    | 1    | 0    | 1    | -1   | 0    | -1   | 0    | 1    | 0    | 1    |
| 0    | 1    | 0    | 0    | -1   | 1    | -1   | 0    | 1    | 0    | 0    |
| 18   | -20  | 34   | -7   | -16  | 9    | 0    | -20  | 11   | 16   | 7    |
| 1    | 1    | 0    | -1   | 0    | 1    | -1   | -1   | 0    | -1   | 1    |
| 0    | 0    | 0    | 0    | 0    | 0    | 0    | 0    | 0    | 0    | 0    |
| 6    | 6    | 5    | 5    | 5    | 6    | 5    | 6    | 6    | 5    | 5    |
| 0    | 0    | 0    | 0    | 0    | 0    | 0    | 0    | 0    | 0    | 0    |

| 883 | 720 | 36 | 8 | 46 | 98 | 283 | 832 | 1637 | 1847 |
|---|---|---|---|---|---|---|---|---|---|
| 374 | 307 | 0 | 0 | 78 | 11 | 36 | 460 | 926 | 1067 |
| 1257 | 1027 | 36 | 8 | 124 | 109 | 319 | 1292 | 2563 | 2914 |
| 10 | 8 | 14 | 2 | 6 | 13 | 19 | 22 | 27 | 13 |
| 5 | 4 | 12 | 1 | 2 | 6 | 10 | 10 | 15 | 6 |
| 2 | 2 | 5 | 0 | 0 | 0 | 2 | 5 | 8 | 5 |
| 4 | 1 | 2 | 0 | 0 | 0 | 0 | 3 | 5 | 4 |
| 20 | 5 | 29 | 0 | 0 | 0 | 4 | 34 | 89 | 41 |
| 170 | 137 | 163 | 165 | 194 | 215 | 211 | 131 | 61 | 24 |
| 48 | 45 | 37 | 22 | 20 | 24 | 34 | 41 | 55 | 67 |
| 45 | 37 | 22 | 20 | 24 | 34 | 41 | 55 | 67 | 68 |
| 3 | 8 | 15 | 2 | 4 | 10 | 7 | 14 | 12 | 1 |
| 54 | 86 | 72 | 33 | 20 | 10 | 33 | 30 | 39 | 41 |
| 34 | 3 | 0 | 0 | 20 | 41 | 45 | 64 | 60 | 42 |
| 2 | -6 | 12 | -4 | -7 | -6 | -3 | -5 | 14 | 4 |
| 1 | -8 | 11 | -1 | -4 | -4 | 0 | -5 | 9 | 2 |
| 15 | -24 | 29 | 0 | 0 | -4 | -30 | -55 | 48 | -4 |
| 33 | -26 | -2 | -39 | -21 | 4 | 80 | 70 | 37 | 17 |
| 0 | 0 | 0 | 0 | 0 | 0 | 0 | 0 | 0 | 0 |
| 6 | 5 | 9 | 2 | 3 | 7 | 9 | 9 | 9 | 7 |
| 0 | 0 | 0 | 0 | 0 | 0 | 0 | 0 | 0 | 0 |

| 723 | 628 | 587 | 539 | 480 | 398 | 319 | 500 | 761 | 870 | 837 |
|---|---|---|---|---|---|---|---|---|---|---|
| 401 | 313 | 251 | 263 | 238 | 208 | 242 | 434 | 532 | 459 | 282 |
| 1124 | 941 | 838 | 802 | 718 | 606 | 561 | 934 | 1293 | 1329 | 1119 |
| 17 | 17 | 16 | 16 | 16 | 17 | 17 | 18 | 16 | 14 | 15 |
| 4 | 3 | 3 | 3 | 3 | 4 | 3 | 3 | 4 | 3 | 7 |
| 3 | 2 | 2 | 2 | 1 | 2 | 2 | 3 | 3 | 2 | 2 |
| 2 | 2 | 1 | 1 | 1 | 1 | 1 | 5 | 5 | 3 | 2 |
| 13 | 8 | 5 | 5 | 2 | 5 | 5 | 18 | 18 | 13 | 8 |
| 9 | 14 | 18 | 17 | 18 | 22 | 26 | 28 | 28 | 81 | 97 |
| 83 | 80 | 77 | 75 | 72 | 68 | 64 | 62 | 61 | 61 | 57 |
| 80 | 77 | 73 | 72 | 68 | 64 | 62 | 61 | 61 | 57 | 48 |
| 3 | 3 | 2 | 3 | 4 | 4 | 2 | 1 | 0 | 4 | 9 |
| 45 | 46 | 45 | 46 | 49 | 47 | 43 | 40 | 37 | 35 | 43 |
| 38 | 36 | 34 | 31 | 28 | 30 | 32 | 32 | 29 | 26 | 19 |
| 0 | 1 | 0 | 0 | -1 | 0 | -1 | 2 | 2 | -1 | 5 |
| 1 | 0 | 0 | 0 | -1 | 1 | 0 | -1 | 1 | -4 | 2 |
| 5 | 3 | 0 | 3 | -3 | 0 | -13 | 0 | 5 | 5 | -12 |
| -5 | -4 | 1 | -1 | -14 | 6 | -2 | 0 | -33 | -16 | -73 |
| 0 | 0 | 0 | 0 | 0 | 0 | 0 | 0 | 0 | 0 | 0 |
| 5 | 4 | 4 | 4 | 4 | 5 | 4 | 4 | 5 | 4 | 8 |
| 0 | 0 | 0 | 0 | 0 | 0 | 0 | 0 | 0 | 0 | 0 |

| 903 | 909 | 877 | 844 | 905 | 922 | 972 | 903 | 920 | 940 | 865 |
|---|---|---|---|---|---|---|---|---|---|---|
| 513 | 507 | 478 | 482 | 529 | 741 | 670 | 602 | 473 | 434 | 474 |
| 1416 | 1416 | 1355 | 1326 | 1434 | 1663 | 1642 | 1505 | 1393 | 1374 | 1339 |
| 7 | 7 | 6 | 7 | 7 | 9 | 10 | 11 | 13 | 13 | 14 |
| 4 | 3 | 4 | 3 | 4 | 4 | 4 | 3 | 3 | 3 | 3 |
| 3 | 2 | 2 | 2 | 2 | 2 | 2 | 3 | 2 | 2 | 3 |
| 2 | 2 | 1 | 2 | 2 | 3 | 2 | 4 | 2 | 2 | 2 |
| 13 | 8 | 5 | 8 | 8 | 13 | 8 | 25 | 8 | 8 | 13 |
| 10 | 4 | 5 | 5 | 7 | 10 | 9 | 8 | 7 | 5 | 7 |
| 66 | 67 | 68 | 69 | 71 | 74 | 76 | 80 | 82 | 83 | 84 |
| 67 | 68 | 69 | 71 | 74 | 76 | 80 | 82 | 83 | 84 | 83 |
| 1 | 1 | 1 | 2 | 3 | 2 | 4 | 2 | 1 | 1 | 1 |
| 25 | 27 | 26 | 27 | 27 | 30 | 29 | 34 | 38 | 40 | 41 |
| 35 | 33 | 31 | 32 | 33 | 36 | 37 | 35 | 37 | 38 | 38 |
| 0 | 1 | -1 | 0 | -2 | -1 | -1 | -2 | 0 | -1 | -3 |
| 1 | -1 | 1 | -1 | 0 | 0 | 1 | 0 | 0 | 0 | -1 |
| 5 | 3 | -3 | 0 | -5 | 5 | -17 | 17 | 0 | -5 | 0 |
| 6 | -1 | 0 | -2 | -3 | 1 | 1 | 1 | 2 | -2 | -2 |
| 0 | 0 | 0 | 0 | 0 | 0 | 0 | 0 | 0 | 0 | 0 |
| 5 | 4 | 5 | 4 | 5 | 5 | 5 | 4 | 4 | 4 | 4 |
| 0 | 0 | 0 | 0 | 0 | 0 | 0 | 0 | 0 | 0 | 0 |

FIG. 26H

| 1193 | 481 | 386 | 333 | 351 | 500 | 645 | 798 | 937 | 1042 | 980 |
|---|---|---|---|---|---|---|---|---|---|---|
| 911 | 392 | 319 | 264 | 234 | 396 | 447 | 480 | 503 | 877 | 594 |
| 1104 | 773 | 705 | 497 | 473 | 896 | 1092 | 1278 | 1440 | 1619 | 1534 |
| 15 | 40 | 17 | 16 | 14 | 12 | 9 | 8 | 7 | 7 | 7 |
| 6 | 23 | 4 | 4 | 3 | 3 | 3 | 4 | 3 | 3 | 3 |
| 5 | 11 | 3 | 2 | 2 | 3 | 3 | 3 | 2 | 3 | 3 |
| 7 | 9 | 2 | 2 | 2 | 3 | 2 | 2 | 2 | 2 | 2 |
| 74 | 202 | 13 | 8 | 8 | 18 | 13 | 13 | 8 | 13 | 13 |
| 119 | 121 | 31 | 22 | 19 | 13 | 15 | 11 | 8 | 8 | 11 |
| 68 | 71 | 68 | 67 | 63 | 60 | 59 | 59 | 60 | 62 | 64 |
| 71 | 68 | 67 | 63 | 60 | 59 | 59 | 60 | 62 | 64 | 66 |
| 3 | 3 | 1 | 4 | 3 | 1 | 0 | 1 | 2 | 2 | 2 |
| 36 | 48 | 44 | 49 | 47 | 39 | 34 | 30 | 23 | 24 | 25 |
| 38 | 70 | 36 | 30 | 27 | 30 | 28 | 31 | 33 | 35 | 36 |
| -35 | 23 | 1 | 2 | 2 | 3 | 1 | 1 | 0 | 0 | 0 |
| -17 | 19 | 0 | 1 | 0 | 0 | -1 | 1 | 0 | 0 | -1 |
| -128 | 189 | 5 | 0 | -10 | 5 | 0 | 5 | -5 | 0 | 0 |
| -2 | 90 | 9 | 3 | 4 | 0 | 4 | 3 | 0 | -3 | 1 |
| 0 | 0 | 0 | 0 | 0 | 0 | 0 | 0 | 0 | 0 | 0 |
| 7 | 9 | 5 | 5 | 4 | 4 | 4 | 5 | 4 | 4 | 4 |
| 0 | 1 | 0 | 0 | 0 | 0 | 0 | 0 | 0 | 0 | 0 |

2600

| 1044 | 1061 | 1154 | 1017 | 1113 | 1204 | 1168 |
|------|------|------|------|------|------|------|
| 605  | 836  | 988  | 943  | 598  | 678  | 812  |
| 1649 | 1897 | 2142 | 1960 | 1711 | 1882 | 1980 |
| 19   | 21   | 26   | 27   | 26   | 21   | 19   |
| 7    | 7    | 7    | 9    | 10   | 7    | 6    |
| 9    | 9    | 10   | 10   | 10   | 9    | 7    |
| 8    | 8    | 9    | 9    | 9    | 7    | 7    |
| 145  | 145  | 181  | 181  | 181  | 130  | 98   |
| 46   | 36   | 36   | 35   | 31   | 27   | 19   |
| 50   | 46   | 46   | 52   | 56   | 57   | 62   |
| 46   | 46   | 52   | 56   | 57   | 62   | 68   |
| 4    | 0    | 6    | 4    | 1    | 5    | 6    |
| 42   | 39   | 34   | 36   | 41   | 38   | 35   |
| 30   | 37   | 51   | 52   | 48   | 48   | 46   |
| -2   | -3   | -1   | 1    | 5    | 2    | 4    |
| 0    | 0    | -2   | -1   | 3    | 1    | 0    |
| 0    | -36  | 0    | 0    | 51   | 32   | 24   |
| 10   | 0    | 1    | 4    | 4    | 8    | -100 |
| 0    | 0    | 0    | 0    | 0    | 0    | 0    |
| 8    | 8    | 8    | 9    | 9    | 8    | 7    |
| 0    | 0    | 0    | 0    | 0    | 0    | 0    |

| 236 | 245 | 238 | 243 | 239 | 239 | 236 | 238 | 231 | 227 | 231 |
|-----|-----|-----|-----|-----|-----|-----|-----|-----|-----|-----|
| 311 | 311 | 300 | 298 | 283 | 285 | 283 | 287 | 281 | 281 | 290 |
| 547 | 556 | 538 | 541 | 522 | 514 | 518 | 525 | 512 | 508 | 521 |
| 1 | 1 | 1 | 1 | 1 | 1 | 1 | 1 | 1 | 1 | 1 |
| 1 | 1 | 1 | 1 | 1 | 1 | 1 | 1 | 1 | 1 | 1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 45 | 45 | 45 | 45 | 45 | 45 | 45 | 45 | 45 | 45 | 45 |
| 45 | 45 | 45 | 45 | 45 | 45 | 45 | 45 | 45 | 45 | 45 |
| 0 | 0 | 0 | 0 | 0 | 0 | 0 | 0 | 0 | 0 | 0 |
| 7 | 8 | 7 | 8 | 5 | 5 | 5 | 2 | 3 | 5 | 4 |
| 5 | 5 | 5 | 5 | 4 | 4 | 4 | 1 | 1 | 3 | 2 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 2 | 2 | 2 | 2 | 2 | 2 | 2 | 1 | 1 | 1 | 1 |
| 0 | 0 | 0 | 0 | 0 | 0 | 0 | 0 | 0 | 0 | 0 |

| 202 | 191 | 177 | 178 | 189 | 186 | 178 | 184 | 182 | 179 | 242 |
| --- | --- | --- | --- | --- | --- | --- | --- | --- | --- | --- |
| 172 | 166 | 168 | 172 | 164 | 167 | 155 | 159 | 164 | 167 | 327 |
| 374 | 357 | 345 | 350 | 353 | 353 | 333 | 343 | 346 | 346 | 569 |
| 0 | 1 | 1 | 1 | 1 | 1 | 1 | 1 | 1 | 1 | 22 |
| 1 | 1 | 1 | 1 | 1 | 1 | 1 | 1 | 1 | 2 | 11 |
| 0 | 0 | 0 | 0 | 0 | 0 | 0 | 0 | 0 | 0 | 3 |
| 0 | 0 | 0 | 0 | 0 | 0 | 0 | 0 | 0 | 0 | 4 |
| 0 | 0 | 0 | 0 | 0 | 0 | 0 | 0 | 0 | 0 | 25 |
| 0 | 0 | 0 | 0 | 0 | 0 | 0 | 0 | 0 | 76 | 74 |
| 44 | 44 | 44 | 44 | 44 | 44 | 44 | 44 | 44 | 44 | 44 |
| 44 | 44 | 44 | 44 | 44 | 44 | 44 | 44 | 44 | 44 | 45 |
| 0 | 0 | 0 | 0 | 0 | 0 | 0 | 0 | 0 | 0 | 1 |
| 6 | 9 | 7 | 8 | 7 | 7 | 7 | 9 | 9 | 13 | 58 |
| 3 | 6 | 5 | 6 | 5 | 4 | 4 | 7 | 7 | 9 | 48 |
| -1 | 0 | 0 | 0 | 0 | 0 | 0 | 0 | 0 | -21 | 21 |
| 0 | 0 | 0 | 0 | 0 | 0 | 0 | 0 | -1 | -9 | 10 |
| 0 | 0 | 0 | 0 | 0 | 0 | 0 | 0 | 0 | -25 | 25 |
| 0 | 0 | 0 | 0 | 0 | 0 | 0 | 0 | -76 | 2 | 74 |
| 0 | 0 | 0 | 0 | 0 | 0 | 0 | 0 | 0 | 0 | 0 |
| 1 | 2 | 2 | 2 | 2 | 2 | 2 | 2 | 2 | 3 | 9 |
| 0 | 0 | 0 | 0 | 0 | 0 | 0 | 0 | 0 | 0 | 1 |

2700

| 192 | 186 | 187 | 190 | 200 | 198 | 200 | 194 | 197 | 186 | 188 |
|-----|-----|-----|-----|-----|-----|-----|-----|-----|-----|-----|
| 182 | 178 | 181 | 181 | 179 | 183 | 181 | 187 | 182 | 184 | 180 |
| 374 | 364 | 368 | 371 | 379 | 381 | 381 | 381 | 379 | 370 | 368 |
| 0 | 0 | 0 | 0 | 0 | 1 | 1 | 1 | 1 | 1 | 1 |
| 0 | 0 | 0 | 0 | 1 | 1 | 1 | 1 | 1 | 1 | 1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 44 | 45 | 45 | 45 | 45 | 45 | 44 | 44 | 44 | 44 | 44 |
| 45 | 45 | 45 | 45 | 45 | 44 | 44 | 44 | 44 | 44 | 44 |
| 1 | 0 | 0 | 0 | 0 | 1 | 0 | 0 | 0 | 0 | 0 |
| 1 | 1 | 1 | 2 | 3 | 4 | 8 | 6 | 12 | 8 | 8 |
| 1 | 1 | 1 | 0 | 2 | 1 | 5 | 3 | 7 | 4 | 5 |
| 0 | 0 | 0 | 0 | -1 | 0 | 0 | 0 | 0 | 0 | 1 |
| 0 | 0 | 0 | -1 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 1 | 1 | 1 | 1 | 1 | 2 | 1 | 2 | 1 | 1 |
| 0 | 0 | 0 | 0 | 0 | 0 | 0 | 0 | 0 | 0 | 0 |

| 288 | 288 | 296 | 292 | 194 | 184 | 189 | 190 | 187 |
|-----|-----|-----|-----|-----|-----|-----|-----|-----|
| 223 | 218 | 220 | 221 | 177 | 188 | 177 | 174 | 174 |
| 511 | 506 | 516 | 513 | 371 | 372 | 366 | 364 | 361 |
| 0 | 0 | 1 | 0 | 26 | 0 | 0 | 0 | 0 |
| 1 | 1 | 1 | 1 | 14 | 1 | 0 | 0 | 0 |
| 0 | 0 | 0 | 0 | 3 | 0 | 0 | 0 | 0 |
| 0 | 0 | 0 | 0 | 3 | 0 | 0 | 0 | 0 |
| 0 | 0 | 0 | 0 | 18 | 0 | 0 | 0 | 0 |
| 0 | 0 | 0 | 82 | 82 | 0 | 0 | 0 | 0 |
| 48 | 48 | 48 | 48 | 48 | 44 | 44 | 44 | 44 |
| 48 | 48 | 48 | 48 | 44 | 44 | 44 | 44 | 44 |
| 0 | 0 | 0 | 0 | 4 | 0 | 0 | 0 | 0 |
| 2 | 2 | 2 | 5 | 58 | 3 | 1 | 1 | 0 |
| 1 | 1 | 1 | 3 | 55 | 1 | 0 | 0 | 0 |
| 0 | -1 | 1 | -26 | 26 | 0 | 0 | 0 | 0 |
| 0 | 0 | 0 | -13 | 13 | 1 | 0 | 0 | 0 |
| 0 | 0 | 0 | -18 | 18 | 0 | 0 | 0 | 0 |
| 0 | 0 | -82 | 0 | 82 | 0 | 0 | 0 | 0 |
| 0 | 0 | 0 | 0 | 0 | 0 | 0 | 0 | 0 |
| 1 | 1 | 1 | 1 | 9 | 1 | 1 | 1 | 1 |
| 0 | 0 | 0 | 0 | 1 | 0 | 0 | 0 | 0 |

FIG. 27J

SCENE CHANGE DETECTION

TECHNICAL FIELD

Embodiments generally relate to scene change detection. More particularly, embodiments relate to technology that quickly and accurately detects scene changes in order to improve compression efficiency during video coding.

BACKGROUND

Numerous available solutions for scene change detection may have focused on certain features such as, for example, using color histograms, luma properties, edge information, adaptive thresholding, motion compensation, and other features. Low robustness or reliability (e.g., due to the use of a few, sometimes not very reliable features) may result. Moreover, these available solutions may often suffer from one or more of the following disadvantages: a higher delay due to a need to buffer several frames of video for analysis; a high rate of false positives; slow speed of detection as feature extraction is performed on full resolution video; and a high complexity of (software or hardware) the particular implementation.

BRIEF DESCRIPTION OF THE DRAWINGS

The various advantages of the embodiments will become apparent to one skilled in the art by reading the following specification and appended claims, and by referencing the following drawings, in which:

FIGS. 25a-25j illustrate an example table of metadata for fast motion with multiple shot changes;

FIGS. 26a-26j illustrate an example table of metadata for medium motion with multiple shot changes; and FIGS. 27a-27j illustrate an example table of metadata for Slow motion with multiple shot changes.

DETAILED DESCRIPTION

Figure 1:
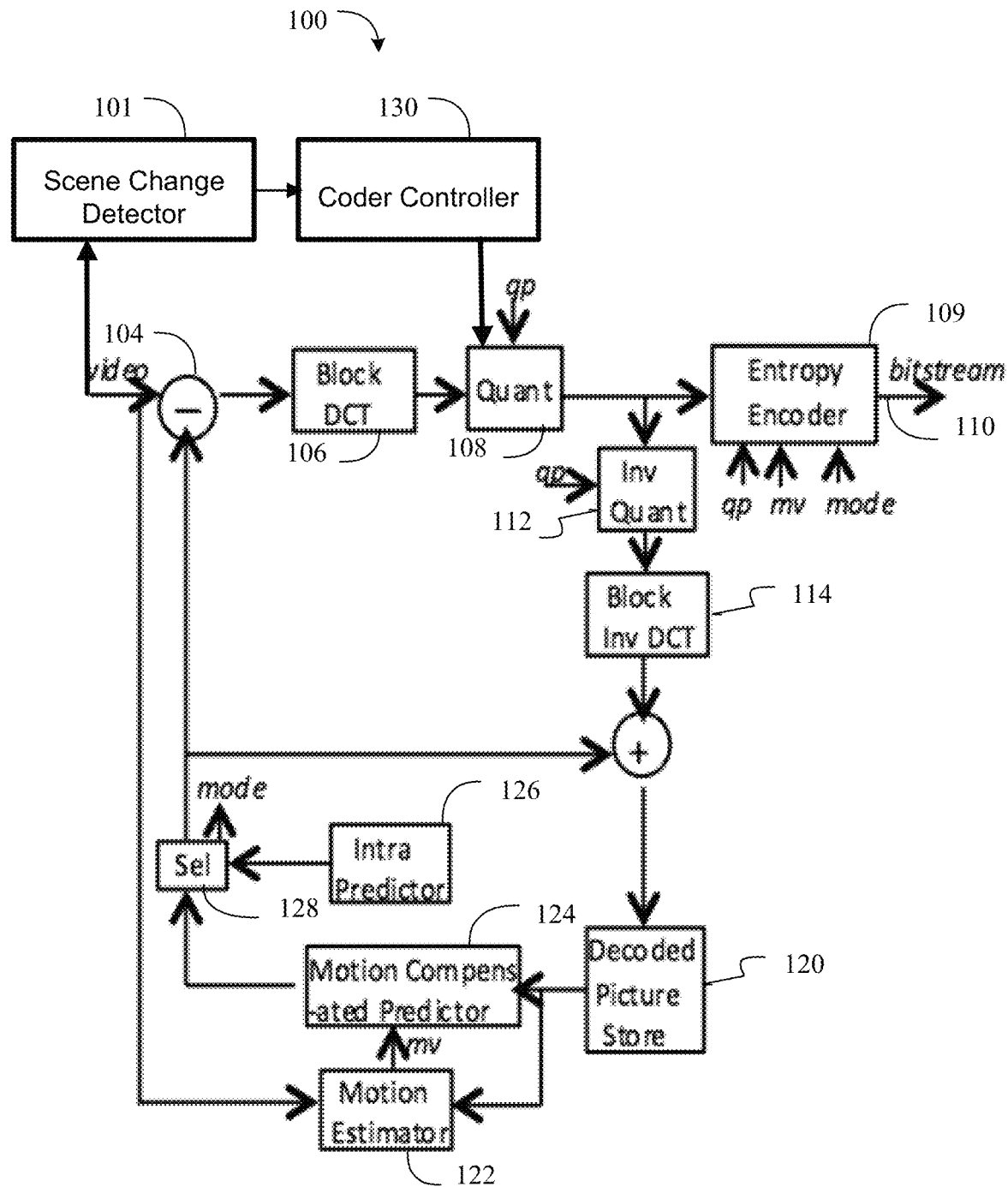
FIG. 1 is an illustrative block diagram of an example video coding system according to an embodiment.

As described above, numerous available solutions for scene change detection have focused on certain features, such as, utilizing color histogram, luma properties, edge information, adaptive thresholding, motion compensation, and other features. Low robustness or reliability (due to use of a few, sometimes not very reliable features). These available solutions often suffer from one or more of the following disadvantages: a higher delay due to a need to buffer several frames of video for analysis; a high rate of false positives; slow speed of detection as feature extraction is performed on full resolution video; and a high complexity of (software or hardware) the particular implementation.

As will be described in greater detail below, implementations described herein may present a fast and robust method for accurately detecting abrupt scene changes (or shot boundary) in video sequences. Accurate detection of abrupt scene changes is critical to improving compression efficiency and visual quality for video encoding with state of art standards such as Advanced Video Coding (e.g., AVC/H.264) and High Efficiency Video Coding (e.g., HEVC/H.265). As used herein, the term "robust detection" refers to any video sequence correct detection/identification of frames where scene changes occur with respect to a ground truth (e.g., a ground truth that is predetermined manually by a human observer or pre-determined by a very high complexity based ideal scene change detector); and refers to having a very low rate of false scene change detections (e.g., not detecting scene changes where they do not exist as per the ground truth). Furthermore, a practical reality of developing any low delay video compression system is for its key components (e.g., including any scene change detector) to work at as much faster than real-time as possible even for high definition content and higher resolutions, so that the entire system can operate in real-time. As used herein, the term "real-time" refers to operations for detecting scene changes in 33 milliseconds (e.g., $\frac{1}{30}^{th}$ of a second) for a 30 frames per second frame rate video. Sometimes video frame rate can even be 60 frames per second, in which case real-time operation would mean $\frac{1}{60}$ seconds=16.67 milliseconds. Some implementations described herein has been experimentally shown to operate at approximately 275 times faster than real-time, operating at around 0.06 millisecond for 1080p content.

The implementations described herein may (1) examine many features on test content to determine the various promising features, (2) determine how features interact with each other to create several groups of features where some of the features may be common to different groups, (3) develop a paradigm for making decision of scene change or not by making independent decisions of scene change or not for each individual feature group and voting for a majority decision, (4) use machine learning for training on ground truth data to deduce relationships to create useful groups of features, and use the learned behavior of feature groups/ voting on feature data of video sequences for which a decision is needed.

The implementations described herein may present a fast and robust way to detect scene changes in video sequences. Scene change detection is important for a number of applications including efficient video compression, video search, video summarization, and others. The implementations described herein may improve quality of graphics processing unit acceleration or hardware video codecs by: introducing powerful features to create robust feature groups that may be effective for scene change detection; performing feature extraction on downsampled pictures to increase processing speed by avoiding processing of full size pictures; performing feature extraction on a frame-by-frame basis to increase processing speed by avoiding lookahead operations on future frames; using multiple level differentials to keep small statistical information about past behavior; and using a small footprint to allow for a software implementation that is fast and that is simple to optimize for hardware.

FIG. 1 is an illustrative block diagram of an example video coding system 100, arranged in accordance with at least some implementations of the present disclosure. In various implementations, video coding system 100 may be configured to undertake video coding and/or implement video codecs according to one or more advanced video codec standards, such as, for example, the Advanced Video Coding (e.g., AVC/H.264) video compression standard or the High Efficiency Video Coding (e.g., HEVC/H.265) video compression standard, but is not limited in this regard. Further, in various embodiments, video coding system 100 may be implemented as part of an image processor, video processor, and/or media processor.

As used herein, the term "coder" may refer to an encoder and/or a decoder. Similarly, as used herein, the term "coding" may refer to encoding via an encoder and/or decoding via a decoder. For example video coding system 100 may include video encoder with an internal video decoder, as illustrated in FIG. 1, while a companion coder may only include a video decoder (not illustrated independently here), and both are examples of a "coder" capable of coding.

In some examples, video coding system 100 may include additional items that have not been shown in FIG. 1 for the sake of clarity. For example, video coding system 100 may include a processor, a radio frequency-type (RF) transceiver a display, an antenna, and/or the like. Further, video coding system 100 may include additional items such as a speaker, a microphone, an accelerometer, memory, a router, network interface logic, and/or the like that have not been shown in FIG. 1 for the sake of clarity.

Video coding system 100 may operate via the general principle of inter-frame coding, or more specifically, motion-compensated (DCT) transform coding that modern standards are based on (although some details may be different for each standard). Inter-frame coding typically includes coding using up to three types picture types (e.g., I-pictures, P-Pictures, and B-pictures) arranged in a fixed or adaptive picture structure that is repeated a few times and collectively referred to as a group-of-pictures. I-pictures are typically used to provide clean refresh for random access (or channel switching) at frequent intervals, and are also used at abrupt scene changes. I-pictures are typically the hardest to compress and provide the least compression gain. P-pictures are typically used for basic inter-frame coding and may be used successively or intertwined with an arrangement of B-pictures. P-pictures typically provide moderate compression. B-pictures are typically bi-directionally coded inter-frame pictures. B-pictures typically provide the highest level of compression. The entire inter-frame coding process of video coding system 100 may involve bitrate/coding error (e.g., distortion) tradeoffs with the goal of keeping video quality as good as possible while also subject to any needed random access and also remaining within the available bandwidth.

In some examples, during the operation of video coding system 100 for the encoding of video content, the video content may be provided to a scene change detector 101 in the form of a series of frames of video. As will be described in greater detail below, scene change detector 101 may operate so as to analyze a current frame of the video content to determine whether a scene change has occurred at the current frame.

In various implementations, scene change detector 101 is designed to be simple yet robust. Scene change detector 101 may be based on a low delay architecture and may use only consecutive pairs of frames (e.g., a current frame and an previous reference frame), as well as corresponding fields if video is interlaced, to detect scene changes. The consecutive pairs of frames used can be every "current frame" and an "immediately previous frame."

In some examples, scene change detector 101 may evaluate a current frame of video content (and the immediately previous frame, in some cases) based at least in part on a plurality of feature groups. As will be described below, each of these feature groups may include a plurality of feature values determined from individual features. The individual features may include one or more spatial features of the current frame and one or more temporal features of the current frame as compared with previously evaluated temporal features of a previous reference frame. The evaluation of the current frame by scene change detector 101 may include an evaluation limited to an evaluation of a sequence of the current frame and a previous reference frame. Thus there is no need to store and examine a longer sequence of frames (e.g., looking ahead to future frames) and thus reduced corresponding delay and complexity. Scene change detector 101 may determine whether a scene change has occurred at the current frame based at least in part on a majority vote among the plurality of feature groups.

The video content may be differenced at operation 104 with the output from the internal decoding loop 105 to form residual video content.

The residual content may be subjected to video transform operations at transform module (e.g., "block DCT") 106 and subjected to video quantization processes at quantization module (e.g., "quant") 108.

The output of transform module (e.g., "block DCT") 106 and quantization module 108 may be provided to an entropy encoder 109 and to an inverse transform module (e.g., "inv quant") 112 and a de-quantization module (e.g., "block inv DCT") 114. Entropy encoder 109 may output an entropy encoded bitstream 111 for communication to a corresponding decoder.

Within an internal decoding loop of video coding system 100, inverse transform module (e.g., "inv quant") 112 and de-quantization module (e.g., "block inv DCT") 114 may implement the inverse of the operations undertaken transform module (e.g., "block DCT") 106 and quantization module (e.g., "quant") 108 to provide reconstituted residual content. The reconstituted residual content may be added to the output from the internal decoding loop 105 to form reconstructed decoded video content. Those skilled in the art may recognize that transform and quantization modules and de-quantization and inverse transform modules as described herein may employ scaling techniques. The decoded video content may be provided to a decoded picture store 120, a motion estimator 122, a motion compensated predictor 124 and an intra predictor 126. A selector (e.g., "Sel") may send out mode information (e.g., intra-mode, inter-mode, etc.) based on the intra-prediction output of intra predictor 126 and the inter-prediction output of motion compensated predictor 124. It will be understood that the same and/or similar operations as described above may be performed in decoder-exclusive implementations of video coding system 100.

As will be explained in greater detail below, in some examples, video coding system 100 may further include a coder controller 130 associated with the scene change detector 101. For example, coder controller 130 may adjust coding operations based at least in part on the scene change determination made by scene change detector 101. In some implementations, coder controller 130 may operate to set inter-frame dependencies based at least in part on the output of scene change detector 101. For example, coder controller 130 may specify certain frames as I-pictures or the like (e.g., frames that are intended to be independently coded via intra-prediction) based at least in part on the output of scene change detector 101. Accordingly, coder controller 130 may assign the current frame as an I-picture based at least in part on a determination by scene change detector 101 of whether a scene change has occurred at the current frame. Additionally or alternatively, coder controller 130 may group certain frames together as a scene (or group-of-pictures as will be discussed in more detail below) based at least in part on the output of scene change detector 101.

Additionally or alternatively, knowing where scene changes take place in video sequences in advance of coding may help coder controller 130 with better selection of coding parameters and thus reduce the appearance of visual artifacts and their propagative effect. Apart from scene changes, scene transitions (fades, dissolves, wipes) also are of concern in video coding as, without such detection, visual coding artifacts and their propagation can occur in video coding. Usually these visual artifacts are more severe when bandwidth is very limited and/or when the scene being coded is complex; however, when bandwidth is sufficient and/or scenes are not very complex, the visual impact of scene transitions may be minimal. Having an ability to detect fade, dissolves, and wipes would be desirable as part of the detection of scene changes. Often many solutions for scene change detection overly complex and/or are not reliable enough. Further, such drawbacks are typically especially pronounced when dealing with fade, dissolve, and wipe detection as part of the detection of scene changes. For example, very few usable solutions exist that do not require delay of many frames, often a delay of in between ten to thirty frames. Such a delay is typically not consistent with video encoding that often needs to be low delay in many applications.

Figure 2:
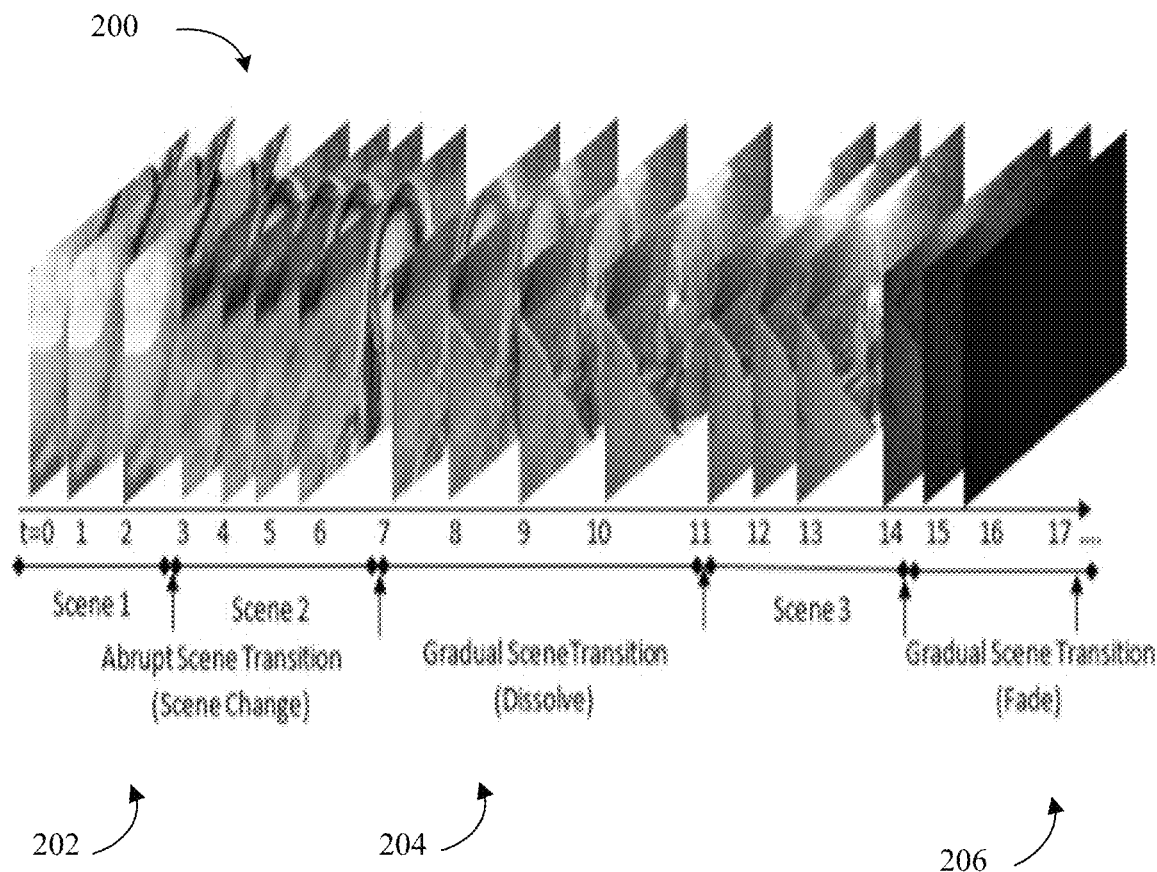
FIG. 2 is an example video sequence with a set of frames showing a scene change, a dissolve, and a fade.

FIG. 2 shows an example video sequence 200 with a set of frames showing a an abrupt-type scene change 202, a dissolve-type scene change 204, and a fade-type scene change 206.

Video sequence 200 can be thought of as including a number of different scenes, with each scene including one or more shots, and each shot including a number of continuous frames. Typically, a shot is defined as a time ordered set of frames generated by a single camera movement. Thus, shots within a scene are considered to have a common context, with abrupt transition (e.g., when a shot finishes and the next one starts) is referred to as a shot change. By comparison, abrupt transition (e.g., when a scene finishes and the next one starts) is referred to as an abrupt-type scene change 202. Thus abrupt-type scene changes 202 are abrupt discontinuities in video sequence 200 that allow for change of context within a longer video-story, and shot changes are discontinuities that allow for change in sub-context within a video-sub-story.

For practical reasons, while we appreciate the difference between a shot-change versus an abrupt-type scene-change 202, we use these terms interchangeably rather than distinguish between them. Another reason for this has to do with the fact that there is no significant difference between the process for detection of an abrupt-type scene change 202 as compared to a shot change, and the same features can in fact be used to detect either an abrupt-type scene change 202 or shot changes in video.

In certain cases such as in broadcast video content, in addition to scene or shot changes, edit effects that are referred to as scene transitions (e.g. fade in/out, dissolve or wipe) may be employed as separators between scenes. A fade-type scene change 206 may refer to an edit effect that consists of a gradual temporal transition from a color (e.g., typically black or white) to a scene or vice versa. A dissolve-type scene change 204 may refer to an edit effect that refers to a gradual temporal transition that from one scene to another scene. This transition is typically of temporal length between five to sixty frames, starting with frames simultaneously showing first scene fading out and the second frame slowly fading in, till both scenes are roughly the same in strength, and continuing on till the first scene disappears when the second scene appears at full strength. A wipe-type scene change (not illustrated here) may refer to an edit effect that can be seen per frame as spatially pushing current scene out, and pulling in a new scene. Such a wipe-type scene change can be horizontal (left to right or right to left), vertical, or diagonal, although complex wipes are also possible.

Figure 3:
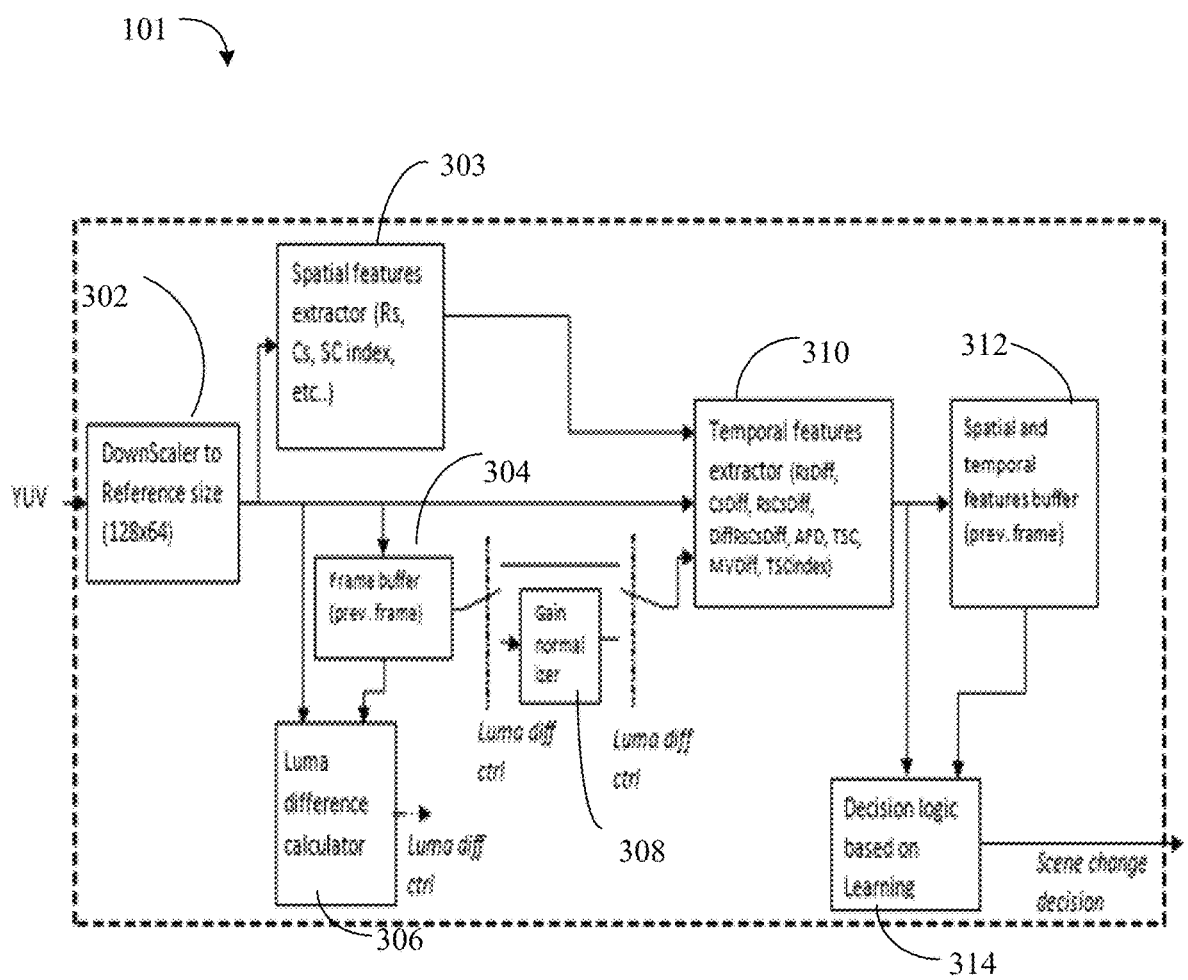
FIG. 3 is an illustrative block diagram of an example scene change detector apparatus according to an embodiment.

FIG. 3 is an illustrative block diagram of an example scene change detector 101, arranged in accordance with at least some implementations of the present disclosure. In various implementations, scene change detector 101 is designed to be simple yet robust. Scene change detector 101 may be based on a low delay architecture and may use only consecutive pairs of frames (e.g., a current frame and an previous reference frame), as well as corresponding fields if video is interlaced, to detect scene changes. The consecutive pairs of frames used can be every "current frame" and an "immediately previous frame."

In some examples, scene change detector 101 may evaluate a current frame of video content (and the immediately previous frame, in some cases) based at least in part on a plurality of feature groups. As will be described below, each of these feature groups may include a plurality of feature values determined from individual features. The evaluation of the current frame by scene change detector 101 may include an evaluation limited to an evaluation of an previous reference frame. Thus there is no need to store and examine a longer sequence of frames (e.g., looking ahead to future frames) and thus reduced corresponding delay and complexity. Accordingly, the operations of scene change detector 101 may be performed in real-time in the absence of lookahead operations beyond the immediate next frame as compared to the current frame. Scene change detector 101 may determine whether a scene change has occurred at the current frame based at least in part on a majority vote among the plurality of feature groups.

In various implementations, scene change detector 101 may include a variety of components. For example, scene change detector 101 may include a downscaler 302. Downscaler 302 may downsample luma of the current frame based at least in part on point sampling or box filtering. For example, luma frames (or fields) may undergo downsampling (e.g., via point sampling or via box filtering) to generate reference pictures (e.g., of 128×64 size) that undergoes further evaluation.

In some examples, downscaler 302 may operate via box filtering. Box filtering resizing may take the pixel array and divides it into blocks of size stepw×steph and then computes the average value of each block and returns it as the pixel value for that specific position. Please note that multiplication may be indicated herein with an "x", an "X", or with an "*".

$$stepw = \frac{srcWidth}{128} \quad (1)$$

$$steph = \frac{srcHeight}{64} \quad (2)$$

$$box\_filt\_pixel(i, j) = \frac{\sum_{y=0}^{steph} \sum_{x=0}^{stepw} Y(i*stepw+x, j*steph+y)}{stepw*steph} \quad (3)$$

Equations (1), (2), and (3) describe the process to calculate each pixel of the resized picture, where Y(x,y) is a reference to the pixel value in the position (x, y) in the Y layer.

In other examples, downscaler 302 may operate via point subsampling. In point subsampling each pixel value of the resized image may be grabbed directly from the original picture, without any modification. The way to select pixels is to divide the original picture into blocks of size ☐☐☐☐☐ . . . ☐_☐☐☐☐h and pick the pixel in the up left corner. If the resulting number for steph is even, then each other line of pixels in the resized image will extracted from the pixel immediately below the up left corner, this is done so any interleaved features can be correctly passed to the small image.

$$correction(j)=(steph\ \%2)*(i\%2) \quad (4)$$

$$point\_sub\_pixel(i,j)=Y(i*stepw,j*steph+correction(j)) \quad (5)$$

Pseudo code for Point subsampling:
initialize stepw as full frame width divided by 128.
initialize steph as full frame height divided by 64.
initialize need_correction as 1 if steph is even and 0 if not.
For each pixel in the destination frame do
Set correction to 1 if need_correction is 1 and vertical position is even, and 0 if not.
Copy value from original frame pixel to destination frame pixel that coincides with the following equation: source pixel position is equal to destination vertical position times step_h plus correction, times original frame pitch plus destination horizontal position times step_w.

pointer $ps=pSrc+((y*step\_h+correction)*srcPitch)+(x*step\_w)$;

pointer $pd=pDst+(y*dstPitch)+x$;

$pd[0]=ps[0]$;

A spatial features extractor 303 may to determine spatial features values from the downsampled luma of the current frame without reference to other frames. As will be described in greater detail below, the spatial features values may be determined from one or more spatial features including a picture based average of a row wise block gradient array (Rs), a picture based average of a column wise gradient array (Cs), a picture based sum and then an average of a block-wise spatial complexity (SC), a spatial complexity index that maps picture spatial complexity ranges to a single value (SCindex) an average luma value of the current frame (ssDCval), and an average luma value of the previous reference frame (refDCval). Additional details regarding the operation of spatial features extractor 303 may be found below, with regard to FIG. 10.

A frame buffer 304 may store a luma array of the previous reference frame. A luma difference calculator 306 may calculate a picture luma average of a luma array of the current frame and to difference the picture luma average of the current frame from a picture luma average of the previous reference frame. A gain normalizer 308 may compensate the luma level of the previous reference frame based at least in part on a luma level difference between the current frame and the previous reference frame.

A temporal features extractor 310 may determine temporal features values from the downsampled luma of the current frame, the downsampled luma of the previous reference frame, and the determined spatial feature values. As will be described in greater detail below, these temporal features values may include or more of the following feature types: one or more temporal differentials of the spatial features of the current frame as compared with spatial features of the previous reference frame, one or more basic temporal features of the current frame as compared to the previous reference frame, one or more temporal differentials of the temporal features of the current frame as compared to the previous reference frame, and at least one temporal differential of the temporal differentials of the spatial features of the current frame as compared to the previous reference frame.

For example, the one or more basic temporal features of the current frame as compared to the previous reference frame may include one or more of the following temporal features: a count of a number of positive frame difference pixels in the current frame (posBalance), a count of a number of negative frame difference pixels in the current frame (negBalance), an absolute frame difference of the current frame with respect to the previous reference frame (AFD), an average value of motion compensated frame difference between the current frame with respect to the previous reference frame (TSC), and a mapped value of a range of values associated with the average value of motion compensated frame difference between the current frame with respect to the previous reference frame that is mapped to a single value (TSCindex).

Likewise, the one or more temporal differentials of the spatial features of the current frame as compared to the previous reference frame may include one or more of the following temporal features: a gain change temporal difference between the average luma value of the current frame and the previous reference frame (gchDC), a temporal difference of picture spatial complexities based on block rows of the current frame and the previous reference frame (RsDiff), a temporal difference of picture spatial complexities based on block columns of the current frame and the previous reference frame (CsDiff), and a temporal difference of picture spatial complexities based on block rows and block columns of the current frame and the previous reference frame (RsCsDiff).

Additionally, the one or more temporal differentials of the spatial features of the current frame as compared with spatial features of the previous reference frame may include one or more of the following temporal features: a temporal difference of the absolute frame difference of the current frame with respect to the previous reference frame (DiffAFD), a motion vector difference of the current frame with respect to the previous reference frame including an average of picture of a square of difference of current frame minus previous reference frame x component of motion vector and of square of difference of the current frame minus the previous reference frame y component of motion vector (MVDiff), a temporal difference of the temporal difference of the motion vector difference of the current frame with respect to the previous reference frame (DiffMVDiffVal), and a temporal difference of the average value of motion compensated frame difference between the current frame with respect to the previous reference frame (DiffTSC).

Lastly, the temporal differential of the temporal differentials of the spatial features of the current frame as compared to the previous reference frame may include the following temporal feature: a temporal difference of the temporal difference of picture spatial complexities based on block rows and block columns of the current frame and the previous reference frame (DiffRsCsDiff).

Additional details regarding the operation of temporal features extractor 310 may be found below, with regard to FIG. 11.

A spatial and temporal features buffer 312 may store the determined spatial features values of the previous reference frame and the determined temporal feature values of the previous reference frame.

A decision logic controller 314 may perform the determination of whether a scene change has occurred. For example, decision logic controller 314 may perform the determination of whether a scene change has occurred based at least in part on the determined spatial features values of the current frame, the determined temporal feature values of the current frame, the determined spatial features values of the previous reference frame and the determined temporal feature values of the previous reference frame. Additional details regarding the operation of decision logic controller 314 may be found below, with regard to FIG. 12.

In some examples, decision logic controller 314 may use pre-trained models to classify if scene change has occurred or not. As will be described in greater detail below, at least some of the feature groups utilized by decision logic controller 314 may comprise a decision tree determined via a Random Forest machine learning approach. For example, decision logic controller 314 may be trained based at least in part on machine learning (ML). In such machine learning new extracted features may be fed in conjunction with already specified features, and a corresponding groundtruth (e.g., a pre-determined data set) letting machine learning (e.g., Weka or other training scheme) to produce the decision tree or performance curve as defined.

A few example feature groups are described below; however, it will be appreciated that additional and/or alternative feature groups might be used. In some implementations, the majority vote among the plurality of feature groups may be performed among an odd number of feature groups, such as thirteen feature groups, twenty-one feature groups, or the like. Additionally or alternatively, the majority vote may be a simple majority vote (e.g., requiring seven out of thirteen votes) or may include a bias value (e.g., requiring a super majority vote).

For example, a first feature group involved in the majority vote among the plurality of feature groups may include the picture based average of a row wise block gradient array (Rs), the picture based average of a column wise gradient array (Cs), and the picture based sum and then an average of a block-wise spatial complexity (SC). This first feature group includes spatial-type features that may be used to analyze the amount and distribution of texture over the current frame.

A second feature group involved in the majority vote among the plurality of feature groups may include the absolute frame difference of the current frame with respect to the previous reference frame (AFD), the average value of motion compensated frame difference between the current frame with respect to the previous reference frame (TSC), the temporal difference of picture spatial complexities based on block rows of the current frame and the previous reference frame (RsDiff), the temporal difference of picture spatial complexities based on block columns of the current frame and the previous reference frame (CsDiff), and the temporal difference of picture spatial complexities based on block rows and block columns of the current frame and the previous reference frame (RsCsDiff). This second feature group includes spatial-temporal-type features that may be used to analyze the amount and distribution of motion, and covered/uncovered areas for the current frame and the previous reference frame pair.

A third feature group involved in the majority vote among the plurality of feature groups may include the motion vector difference of the current frame with respect to the previous reference frame including an average of picture of a square of difference of current frame minus previous reference frame x component of motion vector and of square of difference of the current frame minus the previous reference frame y component of motion vector (MVDiff), the temporal difference of the absolute frame difference of the current frame with respect to the previous reference frame (DiffAFD), the temporal difference of the temporal difference of picture spatial complexities based on block rows and block columns of the current frame and the previous reference frame (DiffRsCsDiff), the temporal difference of the temporal difference of the motion vector difference of the current frame with respect to the previous reference frame (DiffMVDiffVal), and the temporal difference of the average value of motion compensated frame difference between the current frame with respect to the previous reference frame (DiffTSC). This third feature group includes spatial-temporal-type features that may be used to keeps a history of the spatial-temporal flow analyze whether the current frame and the previous reference frame pair are moving towards a more complex behavior or a simpler behavior.

A fourth feature group involved in the majority vote among the plurality of feature groups may include the average luma value of the current frame (ssDCval), the average luma value of the previous reference frame (refDCval), the gain change temporal difference between the average luma value of the current frame and the previous reference frame (gchDC), the count of a number of positive frame difference pixels in the current frame (posBalance), and the count of a number of negative frame difference pixels in the current frame (negBalance). This fourth feature group includes features that may be used to analyze how much luma energy is changing and in which direction (e.g., darker, stable, or brighter) for the current frame and the previous reference frame pair. For example, this fourth feature group might be used to detect a sudden gain change or fade to eliminate false positive detections of scene changes.

In operation, an implementation of the scene change detector 101 described herein was adapted to run on a x86 architecture. This scene change detector 101 implementation performs a scene change analysis in 60 us per 1080p frame. The detection rate over the training data set is 99.996%, for the validation data set that includes 40000 frames, with 350 scene change frames, the results are listed below in Table 1.

TABLE 1

Training and Validation test sets detection performance

| Training testset - 205689 frames | | | Validation testset - 40000 frames | | |
|---|---|---|---|---|---|
| No Scene change frm detected | Scene change frm detected | | No Scene change frm detected | Scene change frm detected | |
| 203901 | 3 | No scene change frm | 39649 | 1 | No scene change frm |
| 5 | 1780 | Scene change frm | 2 | 348 | Scene change frm |
| 99.996% correct detection/0.004% false detection | | | 99.992% correct detection/0.008% false detection | | |

Figure 4:
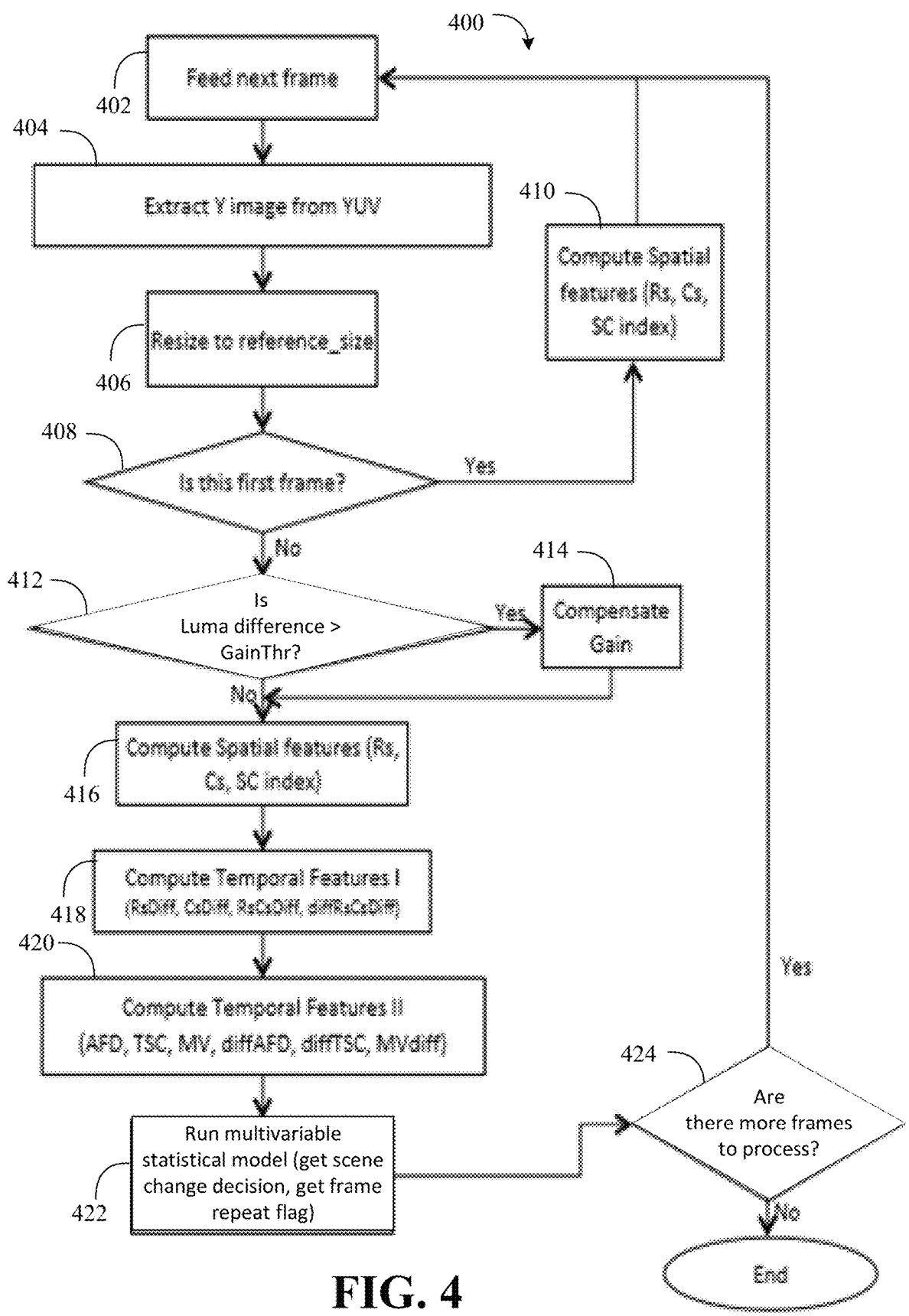
FIG. 4 is an illustrative block diagram of an example of a method of conducting scene change detection according to an embodiment.

FIG. 4 shows a process 400 of scene detection. The process 400 may generally be implemented via one or more of the components of the coding system 100 (FIG. 1) or scene change detector 101 (FIG. 2), already discussed.

With continuing reference to FIG. 2, at operation 402 (e.g., "Feed next frame"), where the next frame may be fed into process 400.

At operation 404 (e.g., "Extract Y image from YUV"), luma of the current frame may be extracted.

At operation 406 (e.g., "Resize to reference_size"), luma of the current frame may be downsampled based at least in part on point sampling or box filtering, via downscaler 302. In some examples, the downsampled luma of the previous reference frame may be stored, via frame buffer 304.

At operation 408 (e.g., "Is this first frame?"), a determination of whether the current frame is the first frame may be made. If so, the process proceeds to operation 410, otherwise the process proceeds to operation 412.

At operation 410 (e.g., "Compute Spatial features (Rs, Cs, SC index)"), spatial features values may be determined from the downsampled luma of the current frame without reference to other frames, via a spatial features extractor 303. For example, such spatial features values may be determined from one or more spatial features including a picture based average of a row wise block gradient array (Rs), a picture based average of a column wise gradient array (Cs), a picture based sum and then an average of a block-wise spatial complexity (SC), or a spatial complexity index that maps picture spatial complexity ranges to a single value (SCindex).

At operation 412 (e.g., "Is luma difference>GainThr?"), the average luminance value of the whole downsampled luma of the current frame as compared with the stored luma of the previous reference frame may be measured, via luma difference calculator 306.

At operation 414 (e.g., "Compensate Gain"), the luma level of the current frame may be compensated based at least in part on matching a luma level of the previous reference frame, via gain normalizer 308.

At operation 416 (e.g., "Compute Spatial features (Rs, Cs, SC index)"), spatial features values may be determined from the downsampled luma of the current frame without reference to other frames, via a spatial features extractor 303. For example, such spatial features values may be determined from one or more spatial features including a picture based average of a row wise block gradient array (Rs), a picture based average of a column wise gradient array (Cs), a picture based sum and then an average of a block-wise spatial complexity (SC), or a spatial complexity index that maps picture spatial complexity ranges to a single value (SCindex).

At operation 418 (e.g., "Compute Temporal Features I (RsDiff, CsDiff, RsCsDiff, DiffRsCsDiff)"), a first portion of temporal features values may be determined from the downsampled luma of the current frame, the downsampled luma of the previous reference frame, and the determined spatial feature values, via temporal features extractor 310.

At operation 420 (e.g., "Compute Temporal Features II (AFD, TSC, MV, DiffAFD, DiffTSC, MVDiff)"), a second portion of temporal features values may be determined from the downsampled luma of the current frame, the downsampled luma of the previous reference frame, and the determined spatial feature values, via temporal features extractor 310. In some implementations, the determined spatial features values of the previous reference frame and the determined temporal feature values of the previous reference frame operations 418 and 420 may be stored, via spatial and temporal features buffer 312.

At operation 422 (e.g., "Run multivariable statistical model (get scene change decision, get frame repeat flag)"), a determination may be made as to whether a scene change has occurred at the current frame based at least in part on a majority vote among the plurality of feature groups, via decision logic controller 314. For example, the determination of whether a scene change has occurred may be based at least in part on the determined spatial features values of the current frame, the determined temporal feature values of the current frame, the determined spatial features values of the previous reference frame and the determined temporal feature values of the previous reference frame.

In operation, process 400 may operate to evaluate a current frame based at least in part on a plurality of feature groups. Each of the feature groups may include a plurality of feature values determined from individual features. The evaluation of the current frame may be limited to an evaluation of an previous reference frame and an immediate next frame.

At operation 424 (e.g., "Are there more frames to process?"), a decision may be made to continue the process until there are no more frames to process.

Figure 5:
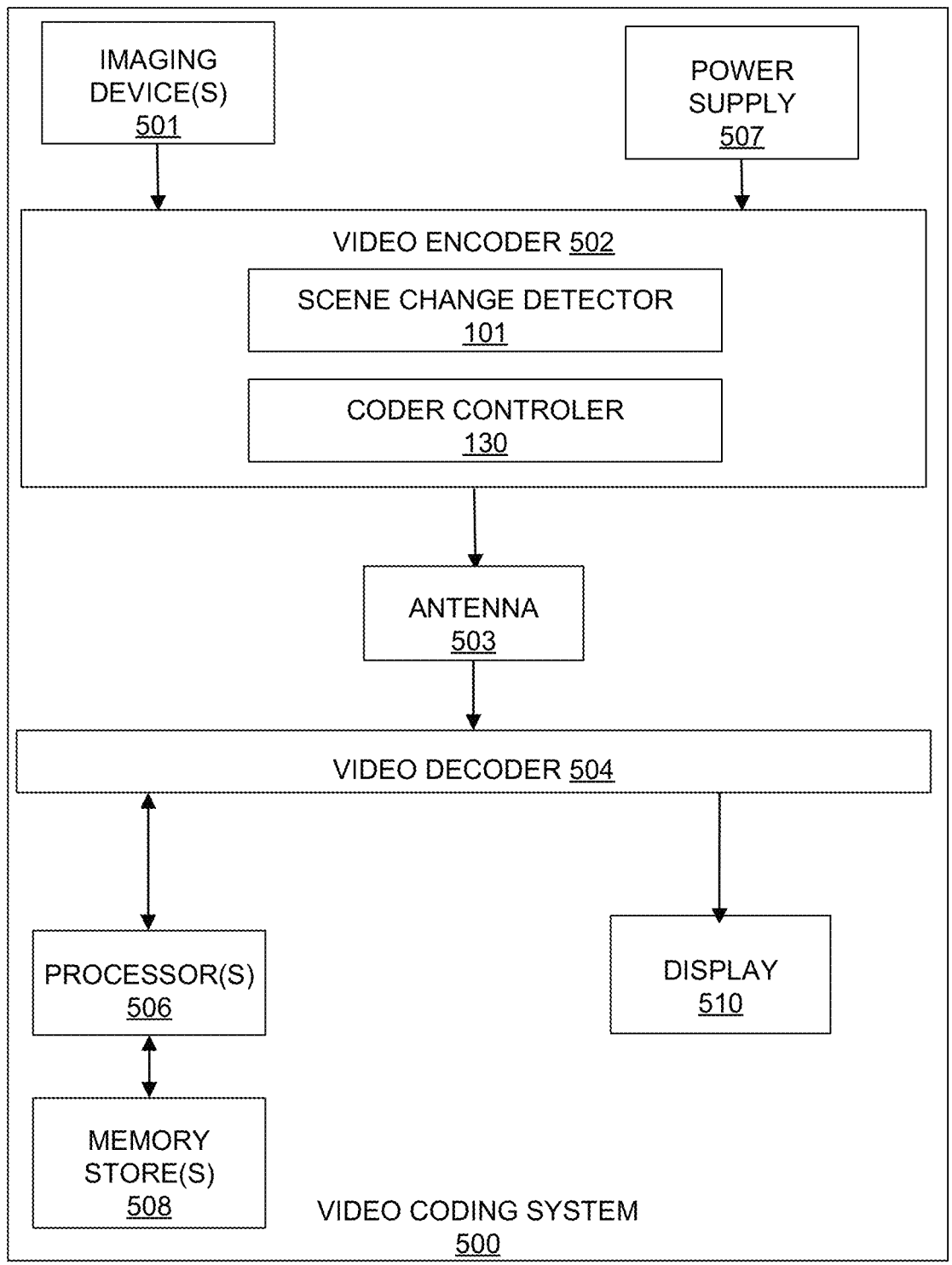
FIG. 5 is an illustrative block diagram of an example video coding system according to an embodiment.

FIG. 5 is an illustrative diagram of example video coding system 500, arranged in accordance with at least some implementations of the present disclosure. In the illustrated implementation, video coding system 500, although illustrated with both video encoder 502 and video decoder 504, video coding system 500 may include only video encoder 502 or only video decoder 504 in various examples. Video coding system 500 may include imaging device(s) 501, an antenna 503, one or more processor(s) 506, one or more memory store(s) 508, a power supply 507, and/or a display device 510. As illustrated, imaging device(s) 501, antenna 503, video encoder 502, video decoder 504, processor(s) 506, memory store(s) 508, and/or display device 510 may be capable of communication with one another.

In some examples, video coding system 500 may include a scene change detector 101 (FIG. 3) and/or coder controller 130 (FIG. 1) associated with video encoder 502 and/or video decoder 504. Further, For example, antenna 503 may be configured to transmit or receive an encoded bitstream of video data, for example. Processor(s) 506 may be any type of processor and/or processing unit. For example, processor(s) 506 may include distinct central processing units, distinct graphic processing units, integrated system-on-a-chip (SoC) architectures, the like, and/or combinations thereof. In addition, memory store(s) 508 may be any type of memory. For example, memory store(s) 508 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 508 may be implemented by cache memory. Further, in some implementations, video coding system 500 may include display device 510. Display device 510 may be configured to present video data.

Figure 6:
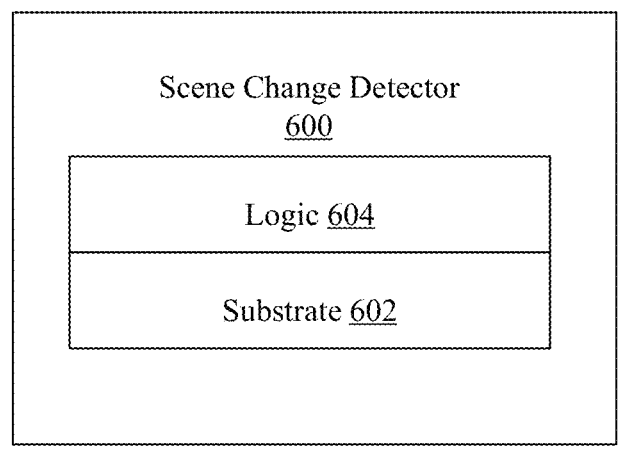
FIG. 6 is an illustrative block diagram of an example of a logic architecture according to an embodiment.

FIG. 6 shows a scene change detector apparatus 600 (e.g., semiconductor package, chip, die). The apparatus 600 may implement one or more aspects of process 400 (FIG. 4). The apparatus 600 may be readily substituted for some or all of the coding system 100 (FIG. 1) and/or scene change detector 101 (FIG. 2), already discussed.

The illustrated apparatus 600 includes one or more substrates 602 (e.g., silicon, sapphire, gallium arsenide) and logic 604 (e.g., transistor array and other integrated circuit/IC components) coupled to the substrate(s) 602. The logic 604 may be implemented at least partly in configurable logic or fixed-functionality logic hardware.

Moreover, the logic 604 may configure one or more first logical cores associated with a first virtual machine of a cloud server platform, where the configuration of the one or more first logical cores is based at least in part on one or more first feature settings. The logic 604 may also configure one or more active logical cores associated with an active virtual machine of the cloud server platform, where the configuration of the one or more active logical cores is based at least in part on one or more active feature settings, and where the active feature settings are different than the first feature settings.

Figure 7:
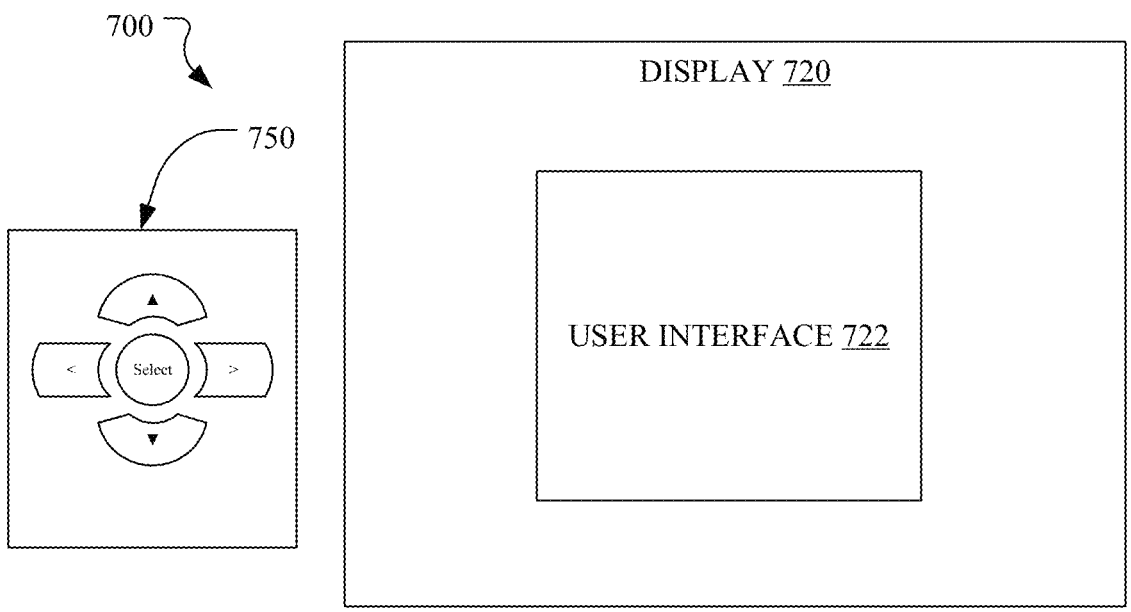
FIG. 7 is an illustrative block diagram of an example system according to an embodiment.
Figure 7:
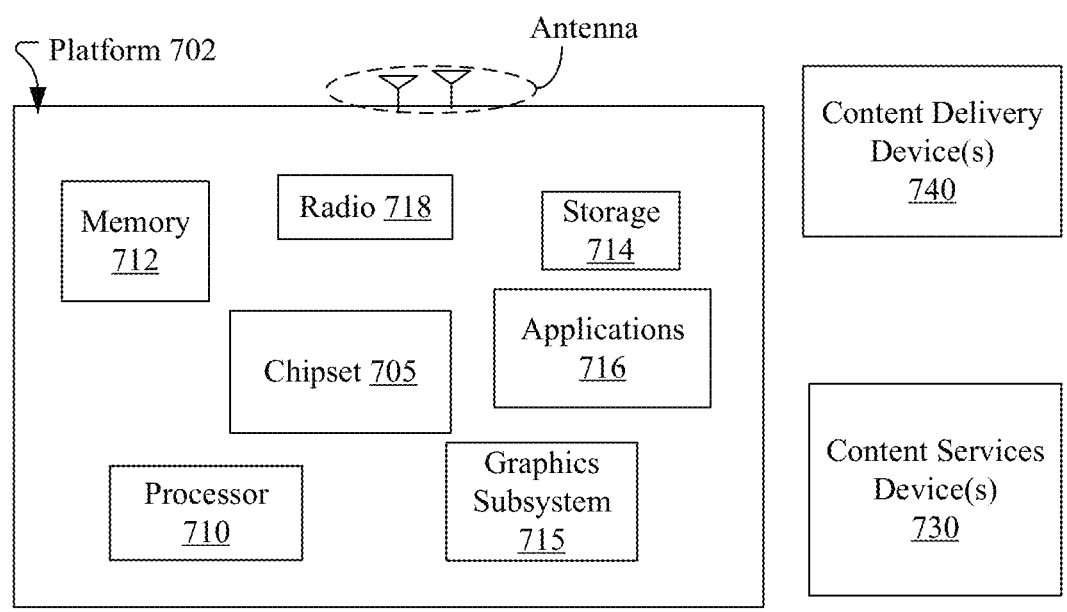
Figure 7:
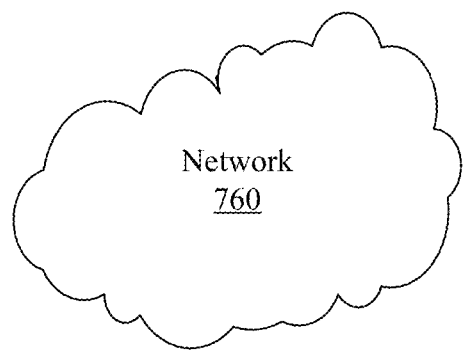

FIG. 7 illustrates an embodiment of a system 700. In embodiments, system 700 may include a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off" In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 8:
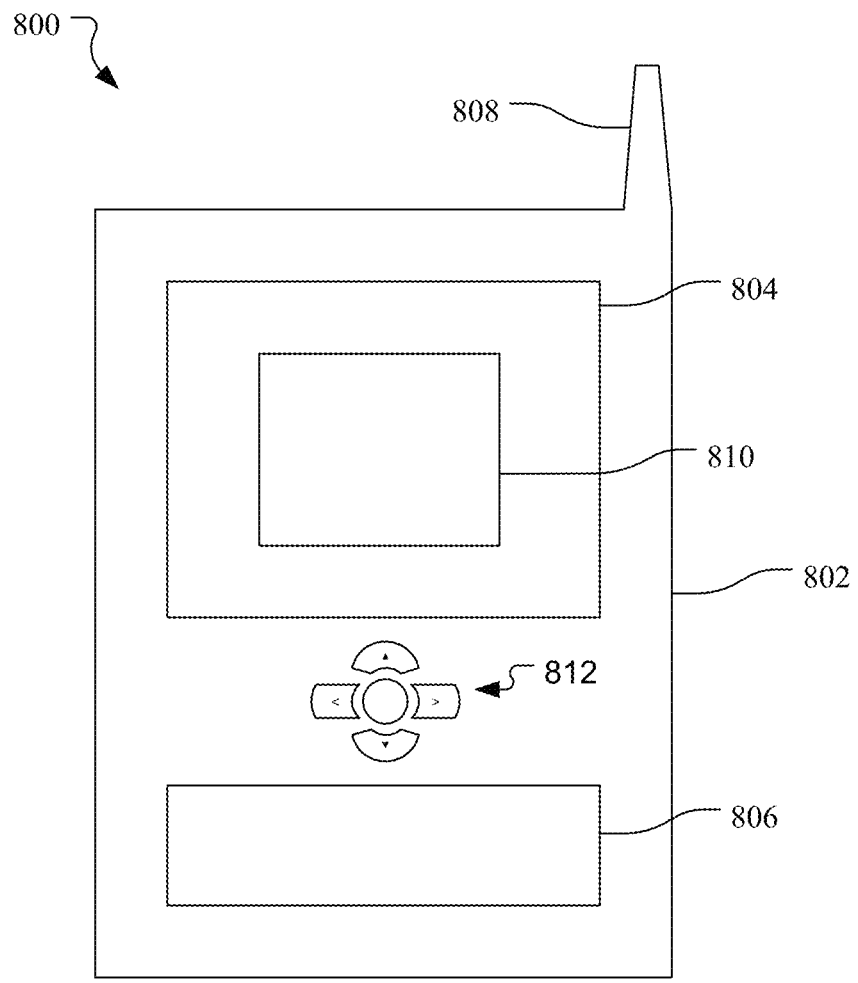
FIG. 8 is an illustrative block diagram of an example of a system having a small form factor according to an embodiment.

As described above, the system 700 may be embodied in varying physical styles or form factors. FIG. 8 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Figure 9:
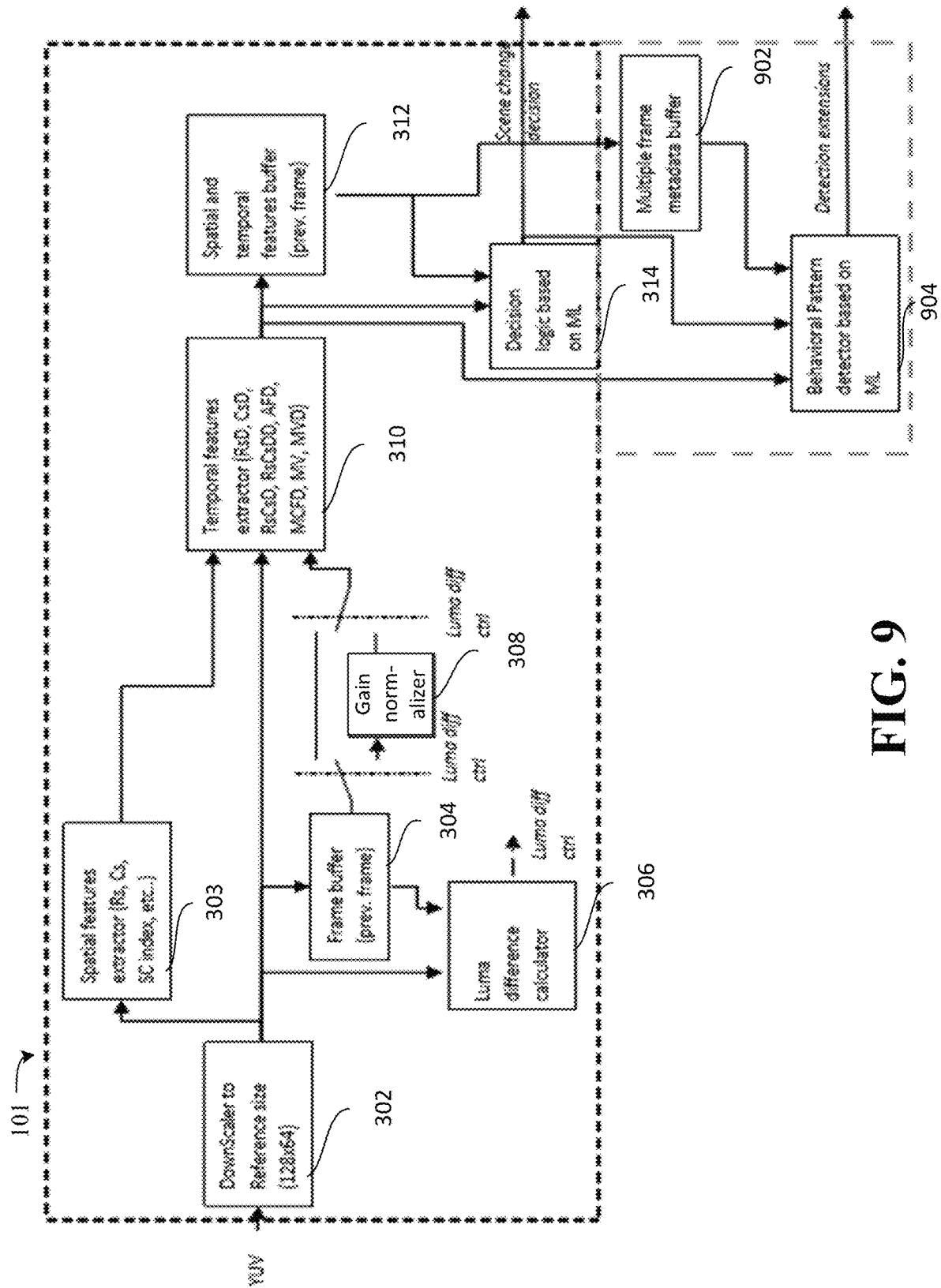
FIG. 9 is an illustrative block diagram of another example scene change detector according to an embodiment.

FIG. 9 is an illustrative block diagram of another example scene change detector 101, arranged in accordance with at least some implementations of the present disclosure. In various implementations, scene change detector 101, as illustrated in FIG. 3, may be adapted, as illustrated here in FIG. 9, to capture behavioral patterns of different video effects.

In some examples, scene change detector 101 may include multiple frame metadata buffer 902. Multiple frame metadata buffer 902 may collect metadata to create a temporal window in which to capture a behavioral patterns of different video effects. For example this temporal window may be refreshed every time that a scene change is detected, therefore keeping consistency of the current behavior for the current frame.

A behavior pattern detector 904 may be used to improve scene change detection final decision, with the introduction of a second level of analysis. Behavior pattern detector 904 may be trained based at least in part on machine learning (ML). For example, some techniques to train the behavioral pattern detector 904 may be the same as or similar to those presented herein for the scene change decision logic 314. For example, in such machine learning new extracted features may be fed in conjunction with already specified features, and the corresponding groundtruth (e.g., a predetermined data set) letting Weka or other training scheme to produce the decision tree or performance curve as defined. As discussed herein, one such behavior that might be trained for behavioral pattern detector 904 is if there is a scene change. However, in some case, additional or alternative behaviors may also be useful, e.g., gain change (e.g., without scene change), slow transition of a scene to black (e.g., fade out), or from a black to actual scene (fade in), or slow transition from one scene to another (e.g., cross dissolve), etc.

Figure 10:
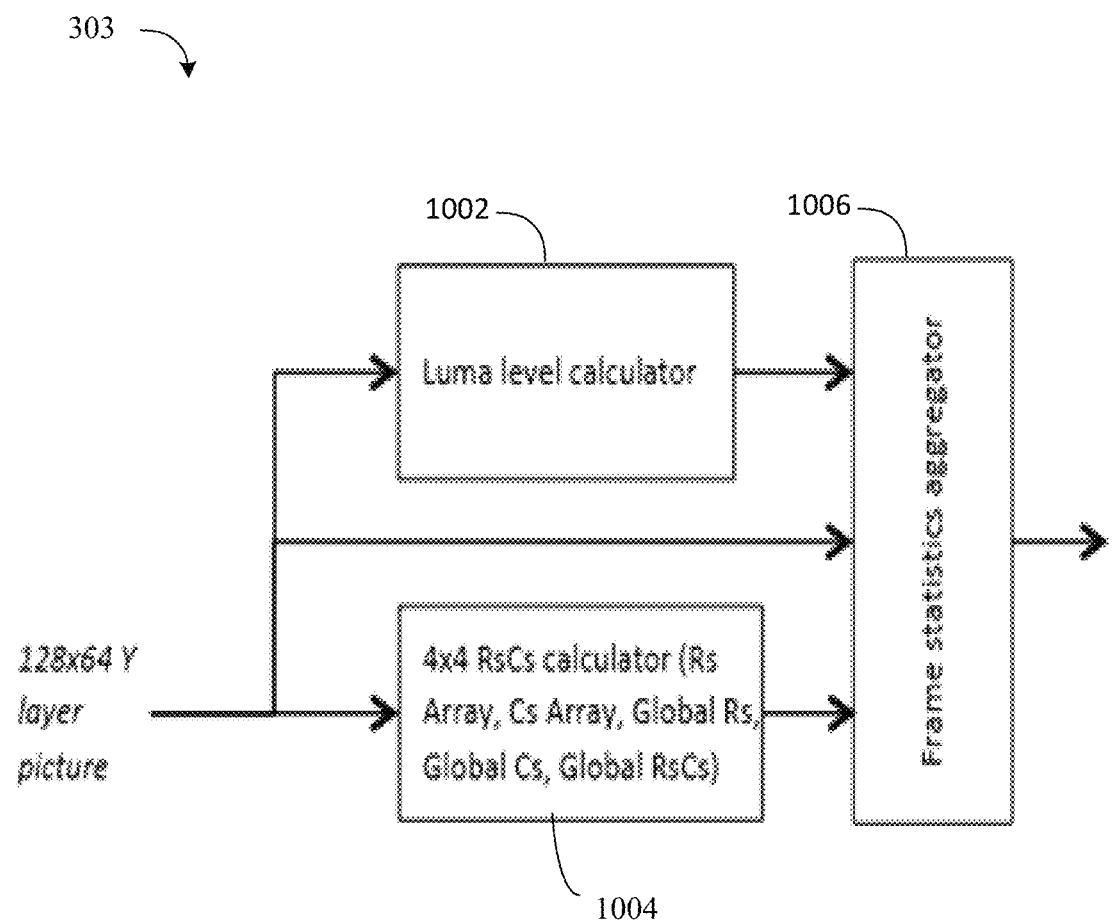
FIG. 10 is an illustrative block diagram of an example spatial features extractor according to an embodiment.

FIG. 10 is an illustrative block diagram of an example spatial features extractor 303, arranged in accordance with at least some implementations of the present disclosure. In various implementations, spatial features extractor 303 may extract a set of features that allow the detection of scene changes by relying on the texture information present on the current frame. Such an analysis does not require information from previous frames and it is computed as soon as the current frame is available.

In the illustrated example, spatial features extractor 303 may perform a luma level calculation via luma level calculator 1002. For example, luma level calculator 1002 may measure the average luminance value of the whole resized picture. The equation is shown below in Equation (6).

$$avgLuma = \frac{\sum_{x=0}^{127}\sum_{y=0}^{63} Y(x, y)}{128 * 64} \tag{6}$$

In the illustrated example, spatial features extractor 303 may perform other feature calculations via 4×4 RsCs calculator 1004. For example, for 4×4 RsCs calculator 1004 Rs is the difference between the rows of two 4×4 luma blocks divided by 4 squared, where one of the blocks is shifted one row down with respect to the source. The scaled frame may be divided into 4×4 blocks, and for each block Equation (7) is applied. Y is luma layer of resized image, i and j indicate the pixel coordinates of the top left corner.

$$Rs_{4\times 4}(j, i) = \sum_{x=0}^{3}\sum_{y=0}^{3}\left(\frac{Y(j+x, i+y) - Y(j+x, i+1+y)}{4}\right)^2 \tag{7}$$

$$gblRs = \frac{\sum_{x=0}^{31}\sum_{x=0}^{15} Rs\_4x4(x, y)}{512} \quad (8)$$

4×4 RsCs calculator 1004 may calculate Global Rs as the average of the whole Rs array as seen in Equation (8). The 512 dividing value may be derived from 128/4*64/4, for example.

Similarly, 4×4 RsCs calculator 1004 may calculate Cs between two 4×4 blocks but the moved block is shifted to the right as seen in Equation (9).

$$Cs(j, i) = \sum_{x=0}^{3}\sum_{y=0}^{3}\left(\frac{(Y(j+x, i+y) - Y(j+1+x, i+y))^2}{4}\right) \quad (9)$$

$$gblCs = \frac{\sum_{x=0}^{31}\sum_{x=0}^{15} Cs\_4x4(x, y)}{512} \quad (10)$$

Pseudo Code for RsCs calculation:
First calculate the Rs and Cs arrays.
  For each 4×4 block inside the small size picture do
    For each pixel inside the 4×4 block calculate the difference against the pixel on its left, divide the result by 4 and square it.
    Accumulate all the resulting values and save the result for that block in the Cs array
    For each pixel inside the 4×4 block calculate the difference against the pixel above, divide the result by 4 and square it.
    Accumulate all the resulting values and save the result for that block in the Rs array.
Second calculate RsCs array and frame (global) Rs, Cs.
  For each value in the Rs array, divide each RS value by 128 and accumulate, the result is then the global Rs value.
  For each value in the Rs array, divide each CS value by 128 and accumulate, the result is then the global Cs value.
  For each pair of collocated Rs and Cs values, calculate the average and save the result in the RsCs array.

To calculate spatial complexity index (SCindex) a global value of absolute texture is needed, for that GlobalRsCs is computed as shown in Equation (11).

$$gblRsCs = glbRs + gblCs \quad (11)$$

Now that the GlobalRsCs has been calculated the spatial complexity index (SCindex) is mapped using Table 2.

TABLE 2

| SC index mapping table | |
|---|---|
| SC index | gblRsCs value |
| 0 | <6844 |
| 1 | <35926 |
| 2 | <100405 |
| 3 | <236572 |
| 4 | <458329 |
| 5 | <789878 |
| 6 | <1258110 |
| 7 | <1892603 |

TABLE 2-continued

| SC index mapping table | |
|---|---|
| SC index | gblRsCs value |
| 8 | <2725625 |
| 9 | otherwise |

Further, frame statistics aggregator 1006 may aggregate the output of luma level calculator 1002 and 4×4 RsCs calculator 1004

Figure 11:
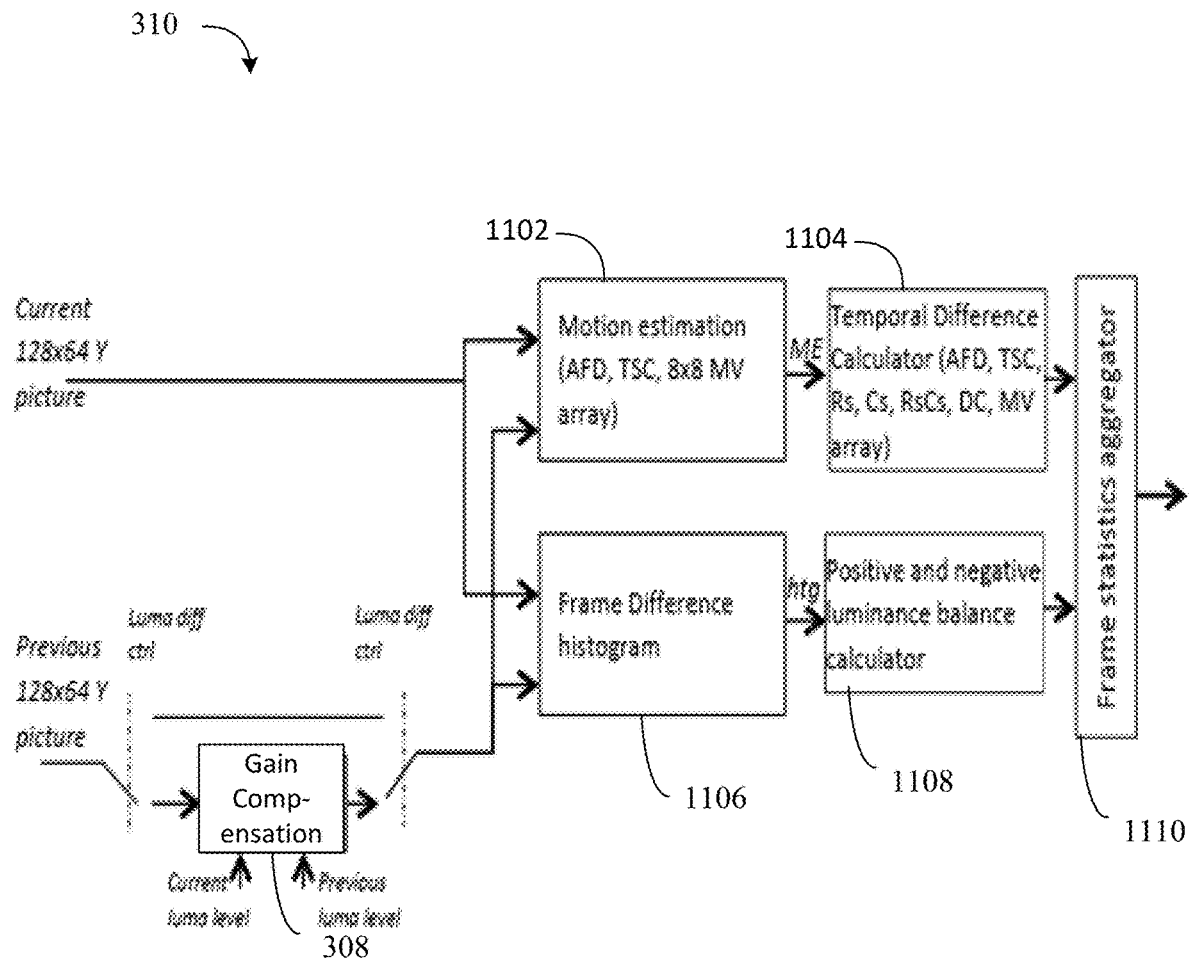
FIG. 11 is an illustrative block diagram of an example temporal features extractor according to an embodiment.

FIG. 11 is an illustrative block diagram of an example temporal features extractor 310, arranged in accordance with at least some implementations of the present disclosure. In various implementations, temporal features extractor 310 may work with two frames, current and past, to derive the appropriate temporal features that will help to determine if the current video frame is a scene change or not. If there is no previous frame temporal features extractor 310 will just set all the temporal features to 0, indicating this is the beginning of a sequence.

In the illustrated example, gain normalizer 308 may compensate the luma level of the previous frame matching the current frame luma level. For example, gain normalizer 308 may collect the luma values of previous and current frames, and compensate the gain on the previous reference by subtracting the gain (gainDiff) to each reference pixel, based on the actual difference. The calculation of gainDiff is shown in Equation (12) and the generation of each pixel in the gain compensated reference is shown in Equation (13).

$$gain = avgLuma_{previous} - avgLuma_{current} \quad (12)$$

$$gainCompRef(i, j) = \begin{cases} 0, & \text{if } (Y_{ref}(i, j) < \text{gain}) \\ 255, & \text{if } (Y_{ref}(i, j) > 255 + \text{gain}) \\ Y_{ref}(i, j) - \text{gain}, & \text{otherwise} \end{cases} \quad (13)$$

Pseudo code for Gain normalization
For each pixel in the reference frame
  If gain value is bigger than current pixel, then set destination pixel to 0
  Else if current pixel is bigger than gain plus 255, then set destination pixel to 255.
  Else set destination pixel equal to current pixel minus gain.

But the gain compensated reference is only used if the luma level difference condition is met, that condition is shown in Equation (15).

$$max\_gain\_dif = 30 \quad (14)$$

$$refFrame = \begin{cases} previousFrame, & \text{if } \left(abs\left(\frac{avgLuma_{cur} - }{avgLuma_{previous}}\right) < max\_gain\right) \\ gain\_comp\_frame, & \text{if } \left(abs\left(\frac{avgLuma_{cur} - }{avgLuma_{previous}}\right) \geq max\_gain\right) \end{cases} \quad (15)$$

In the illustrated example, temporal features extractor 310 may include a motion estimator 1102 (ME). Motion estimator 1102 may return most of the temporal features used in the scene change detection operations described herein. Motion estimator 1102 may perform the calculations presented below.

a. Calculate Absolute Frame Difference (AFD).
   i. Absolute frame difference is calculated as the average of the absolute differences between pixels of the current and previous frame (on resized domain 128× 64).

$$AFD = \frac{\sum_{i=0}^{63}\sum_{j=0}^{127}(abs(currentFrame(j,i) - referenceFrame(j,i)))}{reference\_size} \quad (16)$$

b. Do 8×8 motion estimation on current frame with respect to reference frame. Extract 8×8 Motion Vector array (MVf).
   i. Divide resized frame into 8×8 blocks
   ii. Calculate zero motion SAD
   iii. Determine motion vector candidate as the average of up to three neighbors (e.g., the three neighbors to the left, above, and diagonally above to the left of the vector candidate), and calculate SAD for the resulting motion vector
   iv. Then the vector that gave best result (smallest SAD) is used as center for +−8 (−8 to +7) search with a step of 2 pixels on each direction.
   v. And do a final refinement search of +/−1 pixel is done on the current best position.
c. Return Motion Compensated Frame Difference in 8×8 blocks from ME process (MCFD).
   i. MCFD is defined as the average value of the absolute difference between the reference and the motion compensated frame, while doing motion estimation, accumulate the best SAD resulting from each block search. Divide the resulting value by reference_size (128*64).

$$MCFD = \sum_{i=0}^{63}\sum_{j=0}^{127}(abs(referenceFrame(j,i) - motionCompensatedFrame(j,i))) \quad (17)$$

$$TSC = \frac{MCFD}{reference\_size} \quad (18)$$

Now that the MCFD value is available Temporal Spatial Complexity index (TSCindex) is mapped using Table 3.

TABLE 3

TSC index mapping table

| TSC index | MCFD value |
|---|---|
| 0 | <6144 |
| 1 | <12288 |
| 2 | <18432 |
| 3 | <24576 |
| 4 | <32768 |
| 5 | <40960 |
| 6 | <49152 |
| 7 | <57344 |
| 8 | <65536 |
| 9 | otherwise |

The above process is employed for calculating current frame's TSC value. This value is re-utilized next time around as the "previous TSC" value.

A temporal difference calculator 1104 may compute the difference of various features using current frame and previous frame features. As is understood differential is the difference operation with sign information. The steps are shown below.
a. Calculate differential for Absolute Frame Difference (diffAFD) using current and previous AFD values.
b. Calculate differential for TSC (diffTSC), using current and previous TSC values.
c. Calculate difference between Motion Vector arrays (MVdiff) for current frame.

$$MVdiff = \frac{\sum_{n=1}^{\#MVs}\left(\begin{array}{l}(mvCurrent_i \cdot x - mvPrevious_i \cdot x)^2 + \\ (mvCurrent_i \cdot y - mvPrevious_i \cdot y)^2\end{array}\right)}{\#MVs} \quad (19)$$

This value is re-utilized next time around as the "previous MVdiff" value.
d. Calculate differential of MVdiff from current and previous frame data (diffMVdiffVal).
e. Calculate difference value between current and previous TSC (diffTSC).

A frame difference histogram calculator 1106 may determine a frame difference histogram. A positive and negative luminance balance calculator 1108 may determine a positive and negative luminance balance based at least in part on the frame difference histogram. The steps are shown below.
a. Calculate signed frame difference between current and reference frames and extract histogram with 5 bins of the difference. The bins are distributed as [∞,−12], [−12,−4], [−4, 4], [4,12], [12, ∞].
b. Calculate positive balance as the sum of [4, 12], [12, ∞] bins.
c. Calculate negative balance as the sum of [∞,−12], [−12, −4] bins.

A frame statistics aggregator 1110 may aggregate the output of motion estimator 1102, temporal difference calculator 1104, frame difference histogram calculator 1106, and positive and negative luminance balance calculator 1108.

Figure 12:
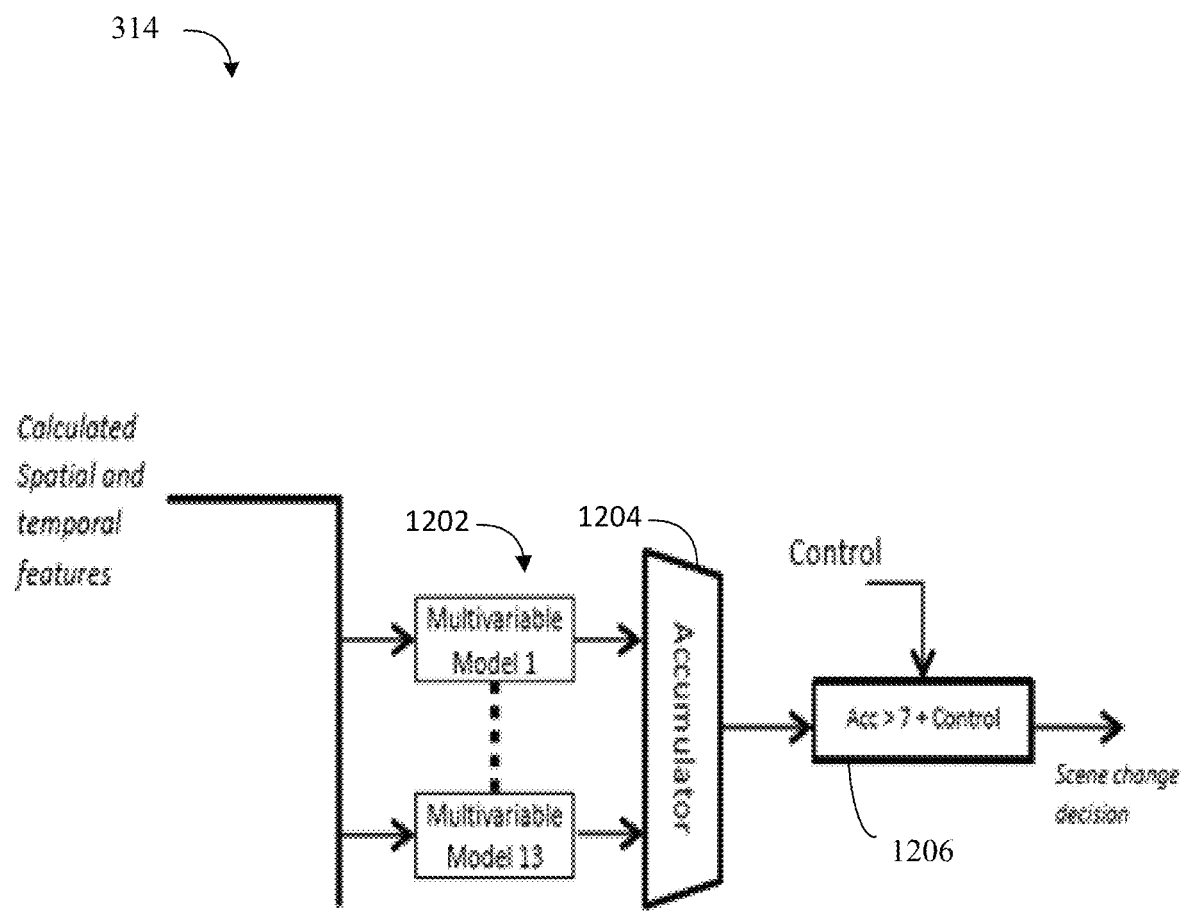
FIG. 12 is an illustrative block diagram of an example decision logic controller according to an embodiment.

FIG. 12 is an illustrative block diagram of an example decision logic controller 314, arranged in accordance with at least some implementations of the present disclosure. In various implementations, decision logic controller 314 may perform the determination of whether a scene change has occurred. In some examples, decision logic controller 314 may use pre-trained multivariable models 1202 to classify if scene change has occurred or not. Each pre-trained multivariable model 1202 may be associated with a feature group, where each feature group may include some combination of spatial features and/or temporal features of the current frame and/or the previous reference frame as the multivariable.

An accumulator 1204 may gather the votes among the plurality of feature groups (e.g., among the pre-trained multivariable models 1202). In some implementations, at box 1206 a majority vote among the plurality of feature groups may be performed among an odd number of feature groups, such as thirteen feature groups, twenty-one feature groups, or the like. Additionally or alternatively, the majority vote may be a simple majority vote (e.g., requiring seven out of thirteen votes) or may include a bias value (e.g., requiring a super majority vote).

As will be described in greater detail below, at least some of the feature groups utilized by decision logic controller 314 may comprise a decision tree determined via a Random Forest machine learning approach. For example, decision logic controller 314 may be trained based at least in part on machine learning (ML). In such machine learning new extracted features may be fed in conjunction with already specified features, and a corresponding groundtruth (e.g., a pre-determined data set) letting machine learning (e.g., Weka or other training scheme) to produce the decision tree or performance curve as defined.

In some examples, decision logic controller 314 may perform the following operations to get the scene change decision, now that all the features are available:
  a. Run statistical model on frame pair statistics
  ii. The statistical model is a Random Forest system with 13 decision trees with 6 different variables each. Each tree returns a binary decision (0,1), the decision is then accumulated and compared with the minimum limit for scene change decision. The decision limit starts at a value of 7 (roundup(13/2)) plus anything that the user has set to increase the level throughout the control variable; valid values are from 0 to 7, where 0 gives most sensitivity and 7 disables it completely.

Pseudo code for Random Forest decision
  For each tree in the forest
    Accumulate the decision (0 or 1)
    If the resulting accumulated value is bigger than 7 plus the control value (goes from 0 to 7), then return scene change detected, if not then return no scene change detected.

Figure 13:
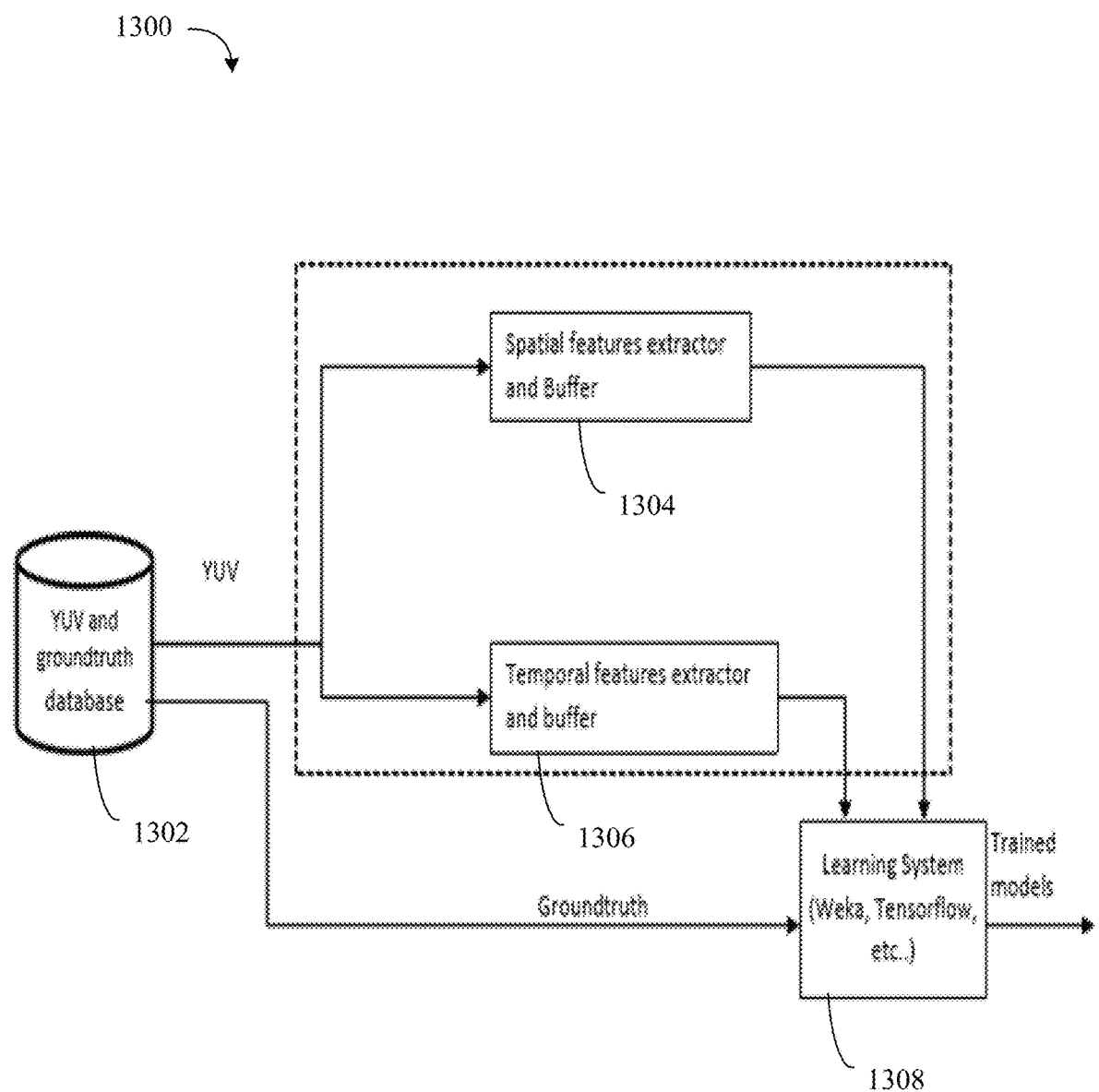
FIG. 13 is an illustrative block diagram of an example offline learning system according to an embodiment.

FIG. 13 is an illustrative block diagram of an example offline learning system 1300, arranged in accordance with at least some implementations of the present disclosure. In various implementations, offline learning system 1300 may perform training based at least in part on machine learning (ML) to determine at least some of the feature groups utilized by decision logic controller 314 (FIG. 3). For example, offline learning system 1300 determine a decision tree via a Random Forest machine learning approach, although other machine learning methods may be used. In such machine learning new extracted features may be fed in conjunction with already specified features, along with a corresponding groundtruth (e.g., a pre-determined data set) letting machine learning (e.g., Weka or other training scheme) to produce the decision tree or performance curve as defined.

In the illustrated example, offline learning system 1300 may include an offline YUV (e.g., luma (Y') and two chrominance (UV)) and groundtruth (e.g., a pre-determined data set) database 1302 that contains video frames and groundtruth information about them. A spatial features extractor 1304 collects data from each current frame. Similarly, a temporal features extractor 1306 collects data from each current frame and immediately previous frame pair. Spatial features extractor 1304 and temporal features extractor 1306 feeds such data into a learning system 1308. Learning system 1308 may then use the features and the groundtruth information to output a trained model or models adapted to determine the position of scene changes on each video sequence.

The multivariable models may be a collective set of binary decision trees trained with the features explained in more detail below. The trees may be designed following the Random Forest machine learning approach (or similar approach), which includes building a variety of individual decision trees, and using a group of features for each tree. The number of trees generated for scene change detection might be 13, 21, or some other suitable number. For example the number of trees may be generated using WEKA 3.8 version of software from University of Waikato using their implementation of Random Forest algorithm. During training, with the input features and the groundtruth, which indicates the right decision for the given data, each data point is independent and for that reason they can be fed to the training system in any order.

For training statistical data was collected from frame statistics aggregators 1006 (FIG. 10) and 1110 (FIG. 11), from 205689 frames of curated video content (e.g., video content with pre-determined groundtruth data), with different resolutions, frame rates and formats (e.g., interlaced, progressive, etc.). The data obtained is then imported to offline learning system 1300 and used for training. The raw data shown in Table 2500 of FIGS. 25a-25j, Table 2600 of FIGS. 26a-26j, and Table 2700 of FIGS. 27a-27j, is an example of the information being fed to Weka for training, where each row of the table contains the features for each current frame, and where the last column in the table is the groundtruth information, which allows the machine learning algorithm of offline learning system 1300 to produce the different decision trees. Every row of data corresponds to features for each current frame, the data can be fed to offline learning system 1300 randomly, there is no temporal dependency between rows of data, instead each row is enough for the system to construct the model or for the model to determine if that specific frame has a scene change or not.

For example, Table 2500 of FIGS. 25a-25j illustrates example metadata for fast motion with multiple shot changes (each line corresponds to a different frame) run on a scene from the movie "Any Given Sunday".

For example, Table 2600 of FIGS. 26a-26j illustrates example metadata for medium motion with multiple shot changes (each line corresponds to a different frame) run on a scene from the TV show "Castle".

For example, Table 2700 of FIGS. 27a-27j illustrates example metadata for Slow motion with multiple shot changes (each line corresponds to a different frame) run on a scene from the movie "Red eye".

With the features data available, feature values are collected on a text file (e.g., ARFF—Attribute-Relation File Format) following the particular machine learning format (e.g., weka). The ARFF file has two sections, the first section is the header information, which contains the name of the relation, then followed by the list of attributes or features, with is data type (e.g., Numeric, bool, class). The second section is the data section, which includes data for each of the attributes listed in the header.

To generate the decision logic, Weka shows different applications available from its suite, in this case Explorer App is used. When the Explorer button is pressed the GUI for opening the ARFF file is open-ended as seen in the Figure.

When the ARFF file is opened, the machine learning (e.g., Weka) user can modify the input data as needed, removing columns or putting patterns for data selection, data filtering, and validation. For scene change detection, the data may not be filtered and may used directly as it is. Then a classify operation is initiated and the selection for the classifier is available.

In some examples, the classifier to be used is may be Random Forest (or other suitable classifier) and might be located under Trees option in the classifier menu. The number of trees chosen for the random forest configuration may be 13, 21, or other suitable number. The numbers 13 and 21 were obtained heuristically. For example, 13 is the smallest odd number that reached correctly classified instances>99.99%, and the number being odd is to avoid classifications where there is a tie appears. Each of the trained trees may be directly integrated into scene change detector 101 (FIG. 3) as the multivariable model.

In some examples, the number of features in any feature group instantiated for analysis is five to give the system enough room for multiple combinations, avoiding over fitting, and providing the best results.

One important note is that the decision logic needs to be trained for each resizing method used, that means that there is one set of 13 trees for box filtering and there is another set of 13 trees used for point subsampling, because the features values extracted change widely between the two methods.

For detecting specific types of scene transitions (e.g., scene changes, fade in/out, dissolves, wipes, etc.) certain features may be more important than others. For positively detecting any type of scene transition with low false detection rates, no single feature is likely to work. However, combining a wide variety of features might be combined to perform such scene detection.

In some examples, offline learning system 1300 and scene change detector 101 (FIG. 3) may employ a total of twenty features that measure various spatial, temporal and spatial-temporal characteristics of the downsampled frames of content. These twenty features where chosen because of their properties to describe the spatial and temporal characteristics of the image, and at a higher level the general behavior of the current scene. The twenty features as well as the accuracy (e.g., how may bits used in order to reduce processing complexity) at which they are kept are: a picture based average of a row wise block gradient array (Rs) (16 bits); a picture based average of a column wise gradient array (Cs) (16 bits); a picture based sum and then an average of a block-wise spatial complexity (SC) (16 bits); an absolute frame difference of the current frame with respect to the previous reference frame (AFD) (16 bits); an average value of motion compensated frame difference between the current frame with respect to the previous reference frame (TSC) (8 bits); a temporal difference of picture spatial complexities based on block rows of the current frame and the previous reference frame (RsDiff) (8 bits); a temporal difference of picture spatial complexities based on block columns of the current frame and the previous reference frame (CsDiff) (8 bits); a temporal difference of picture spatial complexities based on block rows and block columns of the current frame and the previous reference frame (RsCsDiff) (16 bits); a motion vector difference of the current frame with respect to the previous reference frame including an average of picture of a square of difference of current frame minus previous reference frame x component of motion vector and of square of difference of the current frame minus the previous reference frame y component of motion vector (MVDiff) (16 bits); an average luma value of the current frame (ssDCval) (8 bits); an average luma value of the previous reference frame (refDCval) (8 bits); a gain change temporal difference between the average luma value of the current frame and the previous reference frame (gchDC) (8 bits); a count of a number of positive frame difference pixels in the current frame (posBalance) (8 bits); a count of a number of negative frame difference pixels in the current frame (negBalance) (8 bits); an temporal difference of the absolute frame difference of the current frame with respect to the previous reference frame (DiffAFD) (16 bits); an temporal difference of the average value of motion compensated frame difference between the current frame with respect to the previous reference frame (DiffTSC) (16 bits); a temporal difference of the temporal difference of picture spatial complexities based on block rows and block columns of the current frame and the previous reference frame (DiffRsCsDiff) (24 bits); a temporal difference of the temporal difference of the motion vector difference of the current frame with respect to the previous reference frame (DiffMVDiffVal) (24 bits); a spatial complexity index that maps picture spatial complexity ranges to a single value (SCindex) (8 bits); and a mapped value of a range of values associated with the average value of motion compensated frame difference between the current frame with respect to the previous reference frame that is mapped to a single value (TSCindex) (8 bits). The formal definition of many of these features is presented above.

There is one extra attribute that is used although it is not a feature, and it is groundtruth (gt), which is used for the groundtruth information, this element tells offline learning system 1300 how to find the relationship between the data, and the desired behavior that it is training for. For the case of scene change detection, the groundtruth information is a binary class, where 0 means no scene change and 1 means the frame has a scene change.

These features may be used for detection of scene changes (e.g., abrupt transitions) only. As reducing complexity is one of the goal for practical implementation, features may be computed on downsampled luma frames only. From sufficient experimentation, a downsampled frame size of 128×64 may be sufficient to retain variations in the signal necessary for calculation of unique features. Also for complexity reduction, features calculations may be significantly simplified eliminating square roots as well as divides.

Offline learning system 1300 may determine feature groups (e.g., 13, 21, or other number of feature groups) including a set of several features, where each feature group is permitted a vote. A few example feature groups are described below; however, it will be appreciated that additional and/or alternative feature groups might be used. In some implementations, the majority vote among the plurality of feature groups may be performed among an odd number of feature groups, such as thirteen feature groups, twenty-one feature groups, or the like. Additionally or alternatively, the majority vote may be a simple majority vote (e.g., requiring seven out of thirteen votes) or may include a bias value (e.g., requiring a super majority vote).

For example, a first feature group involved in the majority vote among the plurality of feature groups may include the picture based average of a row wise block gradient array (Rs), the picture based average of a column wise gradient array (Cs), and the picture based sum and then an average of a block-wise spatial complexity (SC). This first feature group includes spatial-type features that may be used to analyze the amount and distribution of texture over the current frame.

A second feature group involved in the majority vote among the plurality of feature groups may include the absolute frame difference of the current frame with respect to the previous reference frame (AFD), the average value of motion compensated frame difference between the current frame with respect to the previous reference frame (TSC), the temporal difference of picture spatial complexities based on block rows of the current frame and the previous reference frame (RsDiff), the temporal difference of picture spatial complexities based on block columns of the current frame and the previous reference frame (CsDiff), and the temporal difference of picture spatial complexities based on block rows and block columns of the current frame and the previous reference frame (RsCsDiff). This second feature group includes spatial-temporal-type features that may be used to analyze the amount and distribution of motion, and covered/uncovered areas for the current frame and the previous reference frame pair.

A third feature group involved in the majority vote among the plurality of feature groups may include the motion vector difference of the current frame with respect to the previous reference frame including an average of picture of a square of difference of current frame minus previous reference frame x component of motion vector and of square of difference of the current frame minus the previous reference frame y component of motion vector (MVDiff), the temporal difference of the absolute frame difference of the current frame with respect to the previous reference frame (DiffAFD), the temporal difference of the temporal difference of picture spatial complexities based on block rows and block columns of the current frame and the previous reference frame (DiffRsCsDiff), the temporal difference of the temporal difference of the motion vector difference of the current frame with respect to the previous reference frame (DiffMVDiffVal), and the temporal difference of the average value of motion compensated frame difference between the current frame with respect to the previous reference frame (DiffTSC). This third feature group includes spatial-temporal-type features that may be used to keeps a history of the spatial-temporal flow analyze whether the current frame and the previous reference frame pair are moving towards a more complex behavior or a simpler behavior.

A fourth feature group involved in the majority vote among the plurality of feature groups may include the average luma value of the current frame (ssDCval), the average luma value of the previous reference frame (refDCval), the gain change temporal difference between the average luma value of the current frame and the previous reference frame (gchDC), the count of a number of positive frame difference pixels in the current frame (posBalance), and the count of a number of negative frame difference pixels in the current frame (negBalance). This fourth feature group includes features that may be used to analyze how much luma energy is changing and in which direction (e.g., darker, stable, or brighter) for the current frame and the previous reference frame pair. For example, this fourth feature group might be used to detect a sudden gain change or fade to eliminate false positive detections of scene changes.

Additionally, the flowing features of the spatial complexity index that maps picture spatial complexity ranges to a single value (SCindex) and the mapped value of a range of values associated with the average value of motion compensated frame difference between the current frame with respect to the previous reference frame that is mapped to a single value (TSCindex) may provide a summary of the full frame texture and temporal behavior.

All of these twenty example features give specific and unique information on the state of the current frame, how the sequence is evolving, what effects are happening (e.g., flashes, fast camera motion, appearing or disappearing text), and how the content is changing. As discussed herein, a collection of these features may make robust decisions if a scene change has taken place or not.

Figure 14:
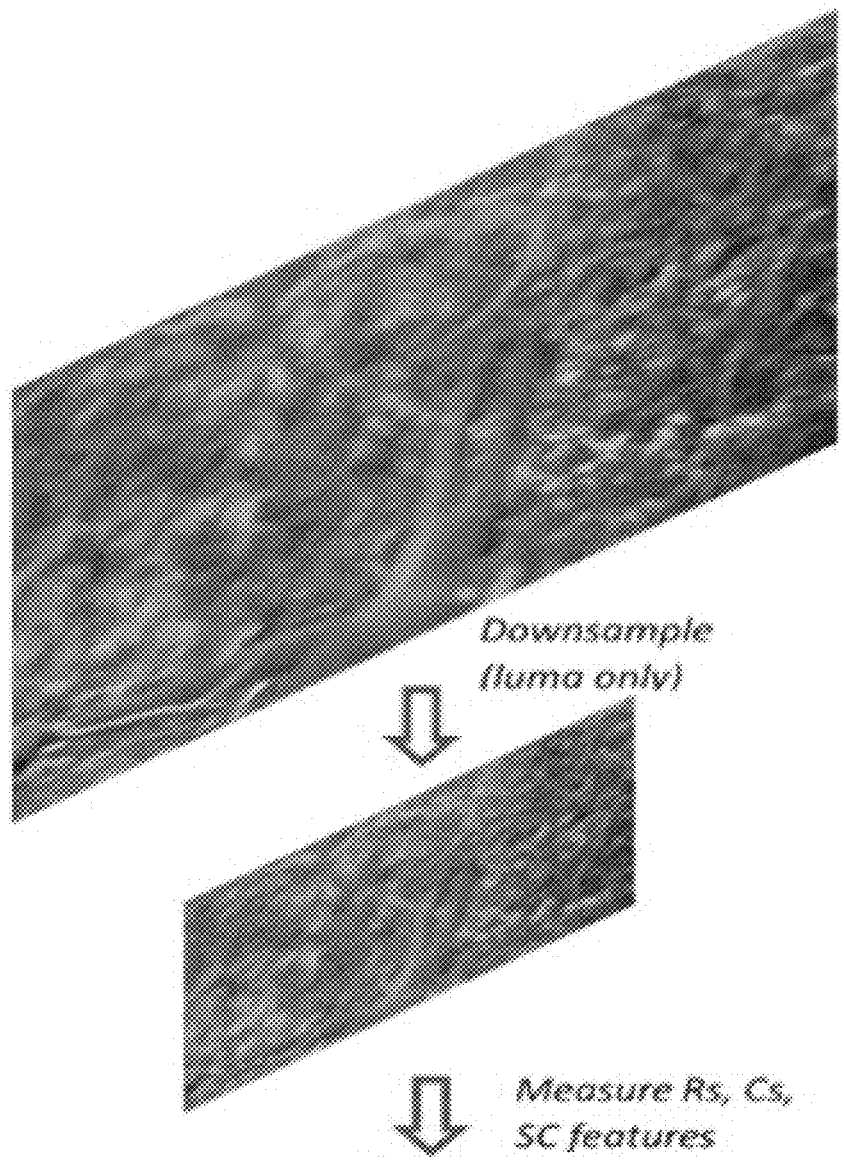
FIG. 14 is an illustrative diagram of an example luma downsampled low detail video frame with associated spatial feature values.

FIG. 14 is an illustrative diagram of an example luma downsampled low detail video frame 1400 with associated spatial feature value, arranged in accordance with at least some implementations of the present disclosure. In various implementations, luma downsampled low detail video frame 1400 may be associated with the illustrated spatial feature values that illustrate the amount and distribution of texture over the video frame.

Figure 15:
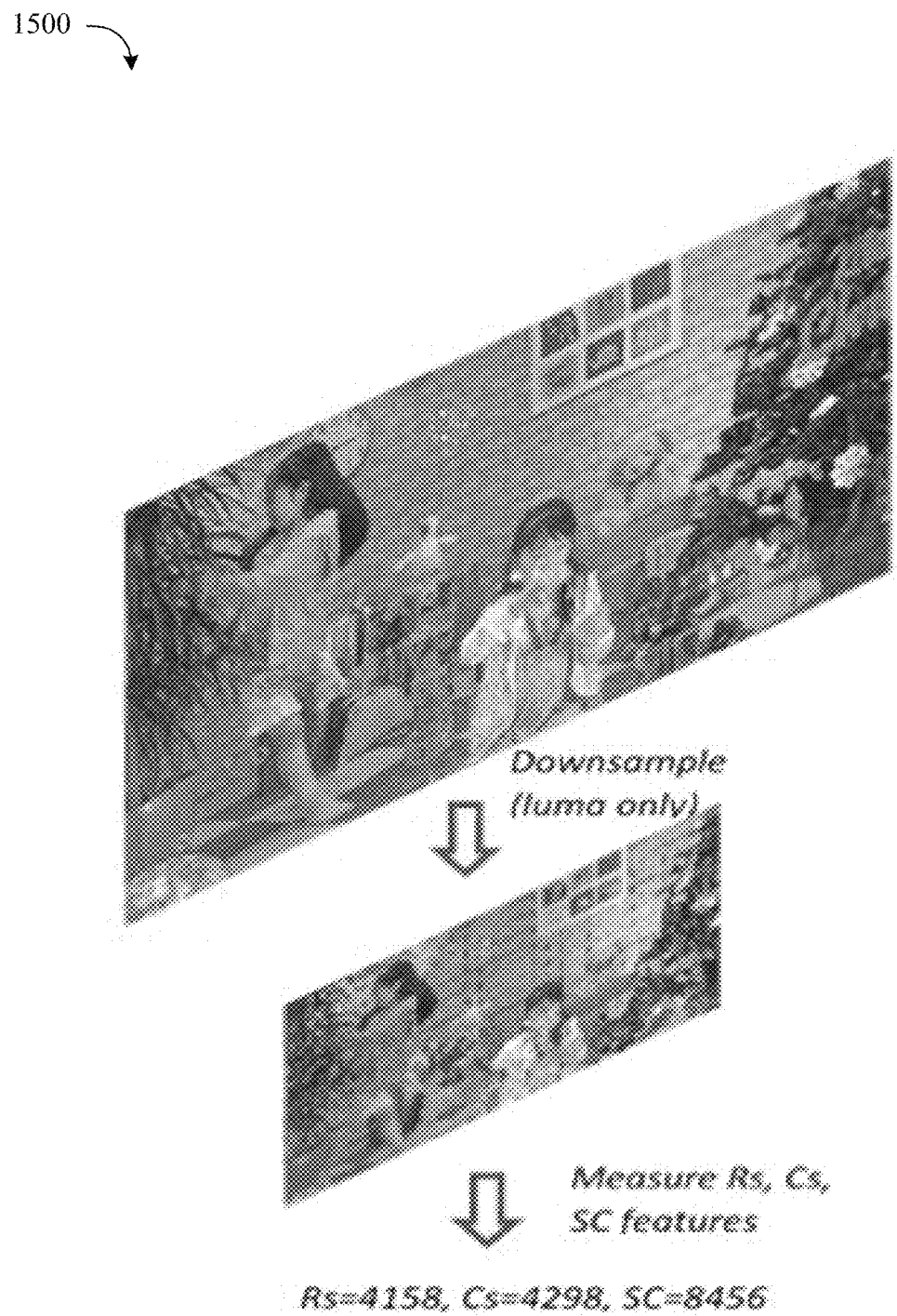
FIG. 15 is an illustrative diagram of an example luma downsampled high detail video frame with associated spatial feature values.

FIG. 15 is an illustrative diagram of an example luma downsampled high detail video frame 1500 with associated spatial feature values. In various implementations, luma downsampled high detail video frame 1500 may be associated with the illustrated spatial feature values that illustrate the amount and distribution of texture over the video frame.

Figure 16:
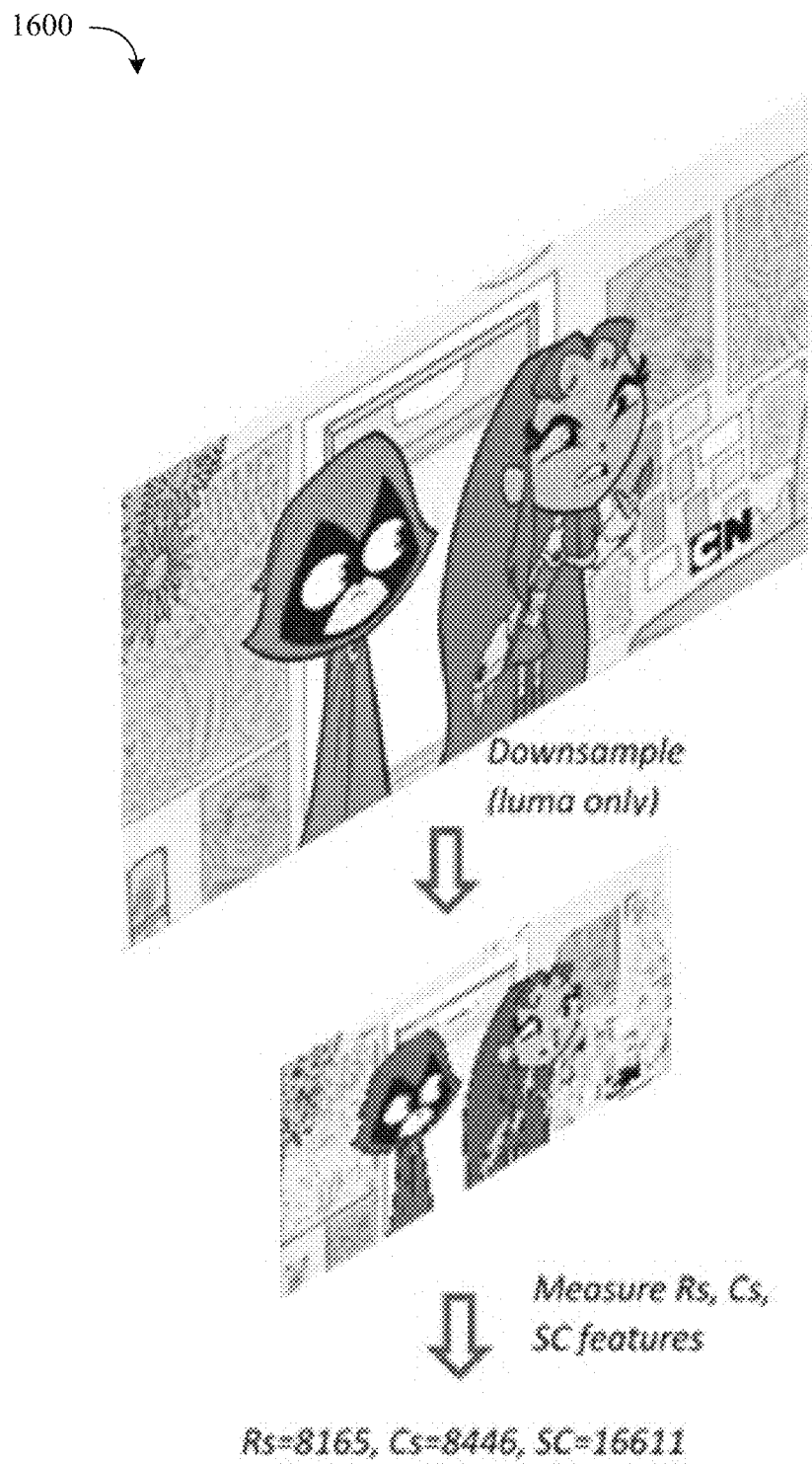
FIG. 16 is an illustrative diagram of an example luma downsampled high contrast video frame with associated spatial feature values.

FIG. 16 is an illustrative diagram of an example luma downsampled high contrast video frame 1600 with associated spatial feature values. In various implementations, luma downsampled high contrast video frame 1600 may be associated with the illustrated spatial feature values that illustrate the amount and distribution of texture over the video frame.

Figure 17:
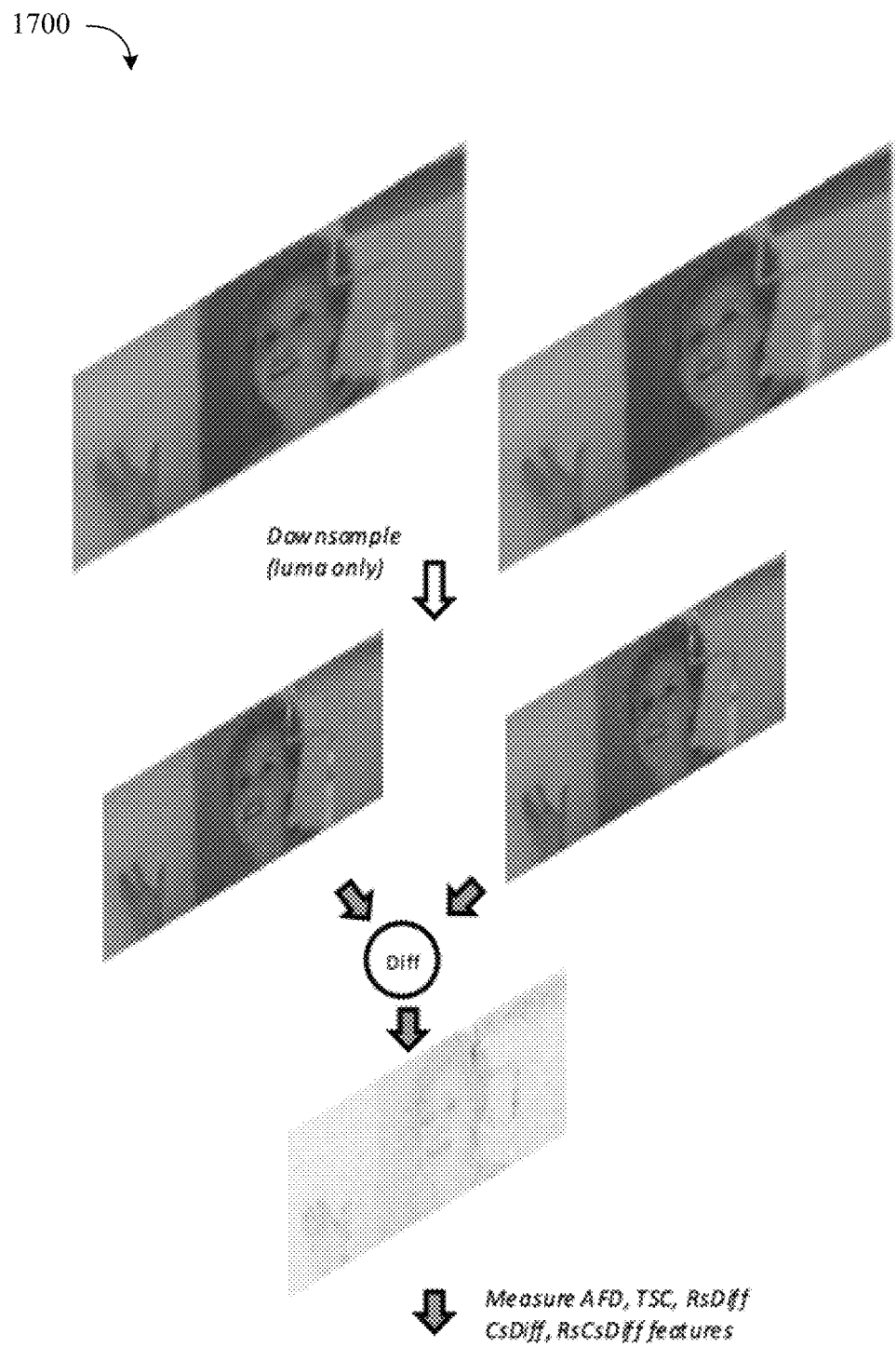
FIG. 17 is an illustrative diagram of an example luma downsampled low motion video frame sequence with associated temporal feature values.

FIG. 17 is an illustrative diagram of an example luma downsampled low motion video frame sequence 1700 with associated temporal feature values. In various implementations, luma downsampled low motion video frame sequence 1700 may be associated with the illustrated temporal feature values that illustrate the amount and distribution of motion and covered/uncovered areas over the video frame sequence.

Figure 18:
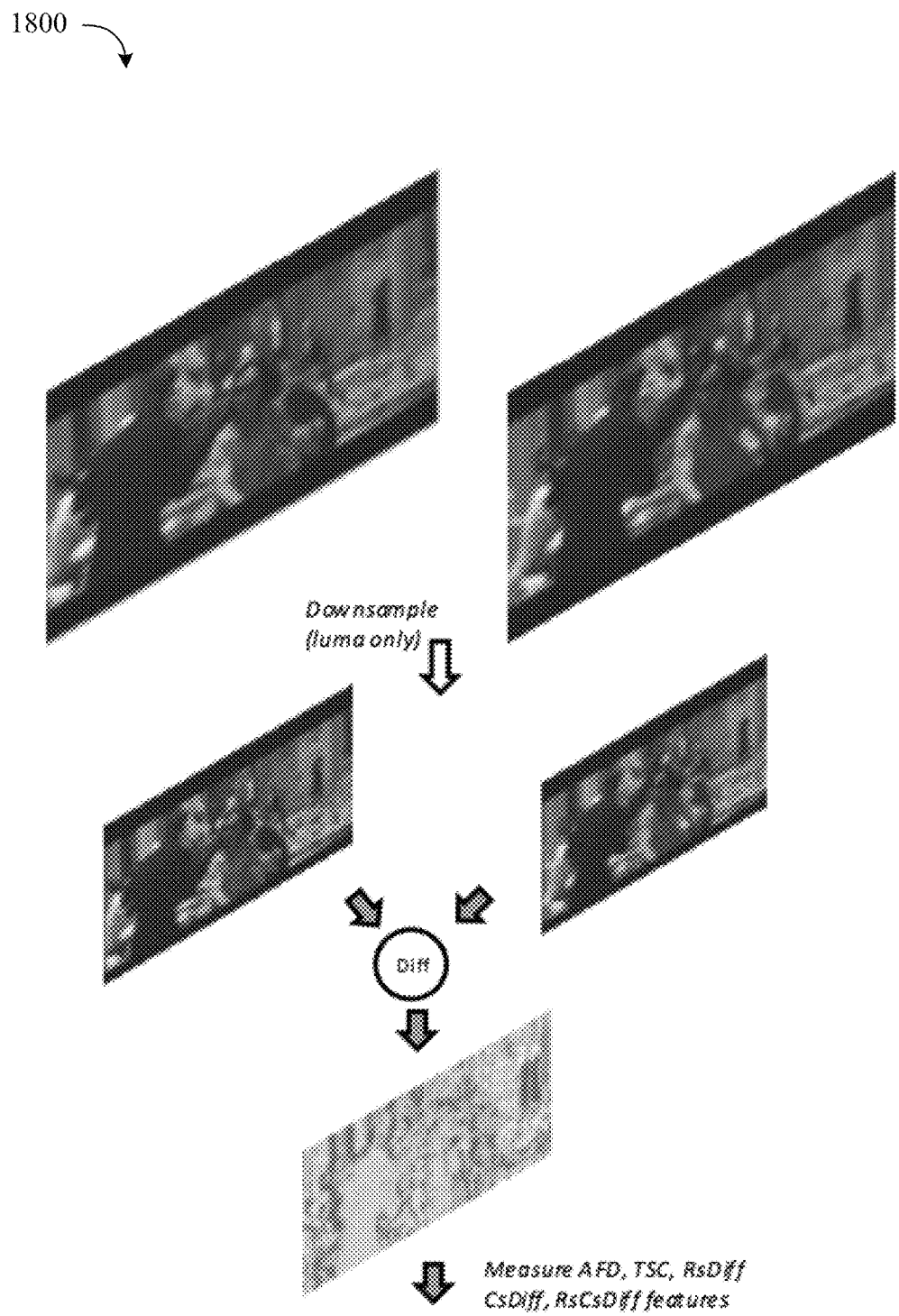
FIG. 18 is an illustrative diagram of an example luma downsampled high motion video frame sequence with associated temporal feature values.

FIG. 18 is an illustrative diagram of an example luma downsampled high motion video frame sequence 1800 with associated temporal feature values. In various implementations, luma downsampled high motion video frame sequence 1800 may be associated with the illustrated temporal feature values that illustrate the amount and distribution of motion and covered/uncovered areas over the video frame sequence.

Figure 19:
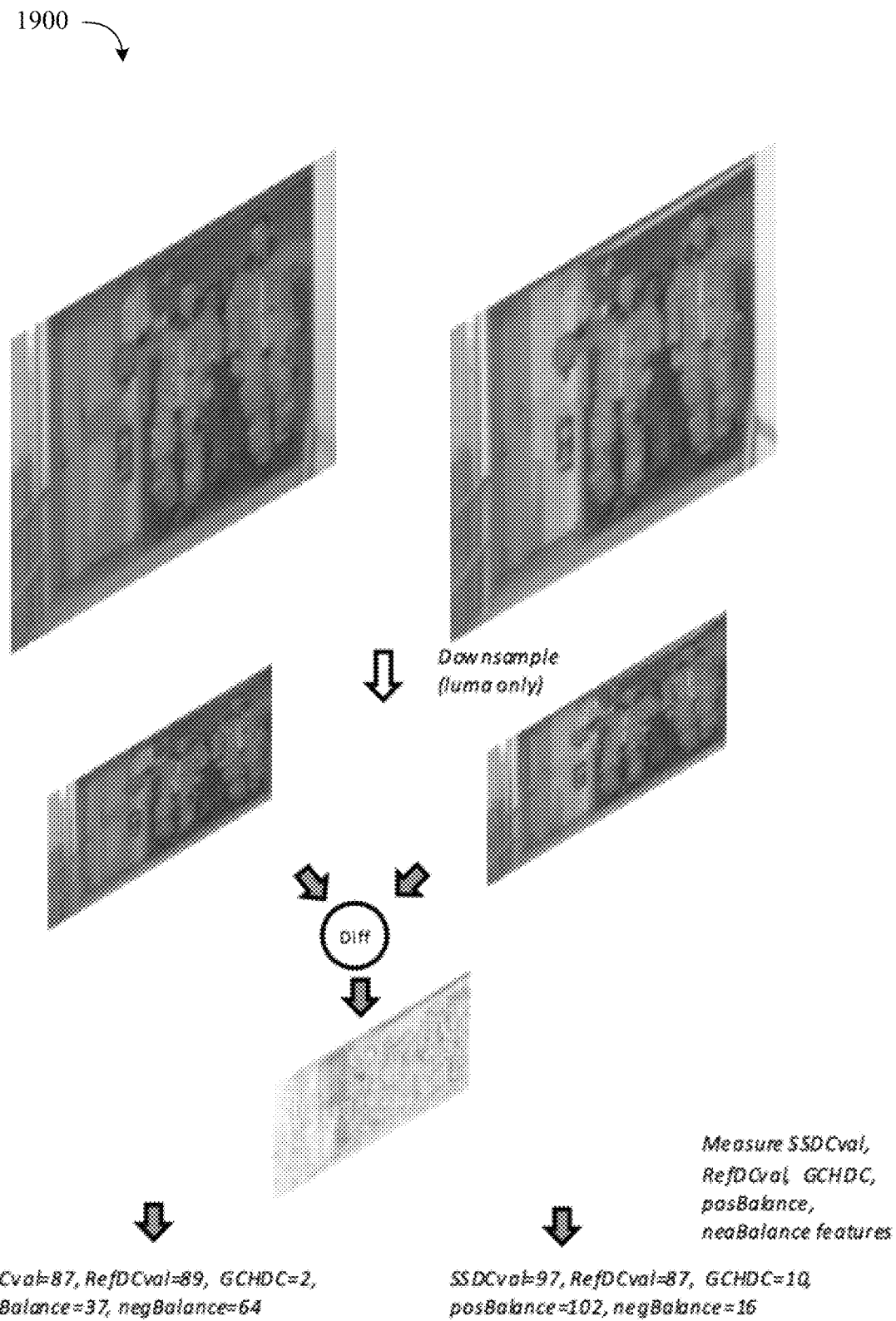
FIG. 19 is an illustrative diagram of an example luma downsampled gain change video frame sequence with associated spatial and temporal feature values.

FIG. 19 is an illustrative diagram of an example luma downsampled gain change video frame sequence 1900 with associated spatial and temporal feature values. In various implementations, luma downsampled gain change video frame sequence 1900 may be associated with the illustrated spatial and temporal feature values that illustrate how much luma energy is changing (and whether the luma energy is getting darker or brighter) over the video frame sequence.

Figure 20:
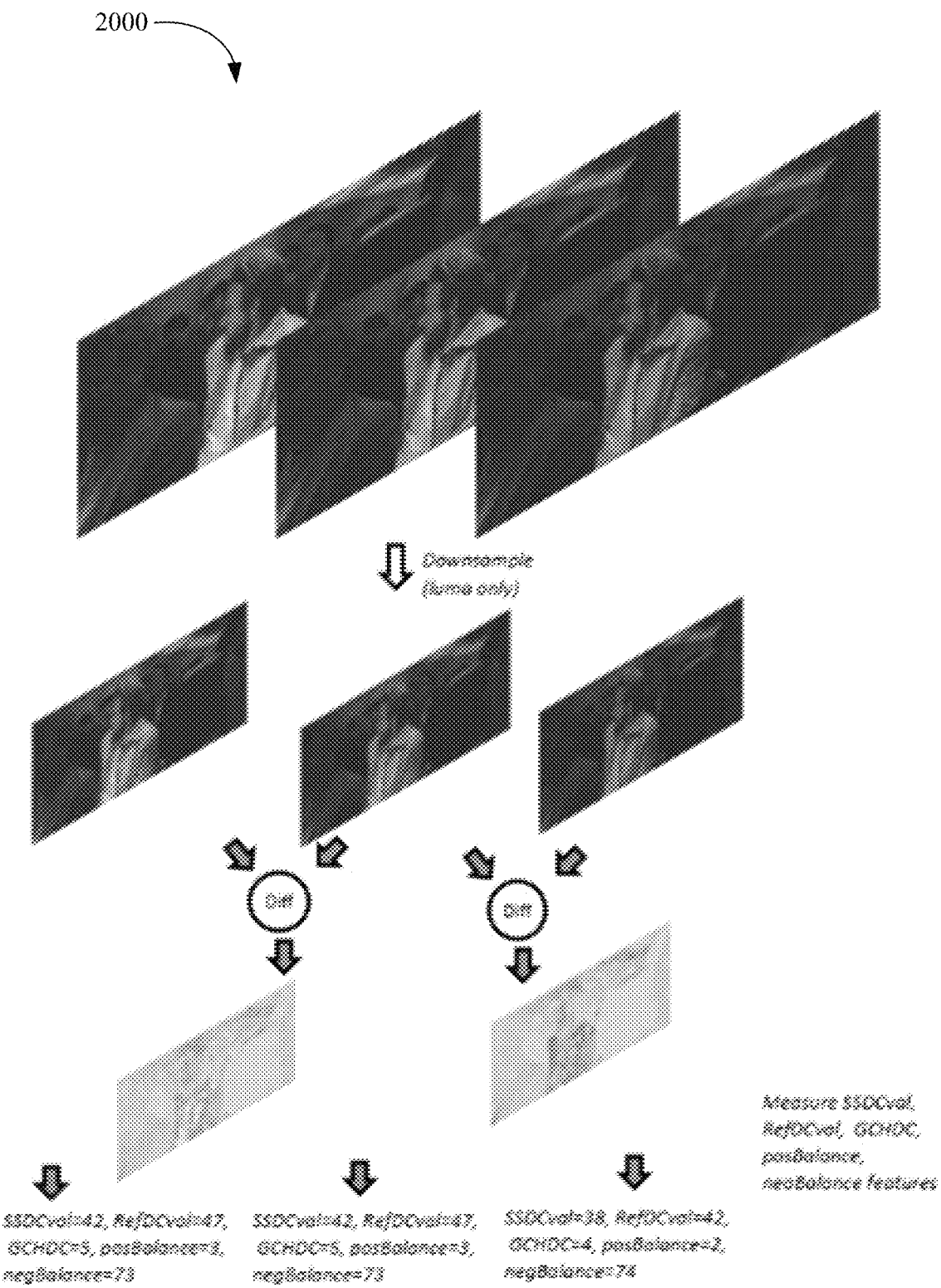
FIG. 20 is an illustrative diagram of an example luma downsampled fade video frame sequence with associated spatial and temporal feature values.

FIG. 20 is an illustrative diagram of an example luma downsampled fade video frame sequence 2000 with associated spatial and temporal feature values. In various implementations, luma downsampled fade video frame sequence 2000 may be associated with the illustrated spatial and temporal feature values that illustrate how much luma energy is changing (and whether the luma energy is getting darker or brighter) over the video frame sequence.

Figure 21:
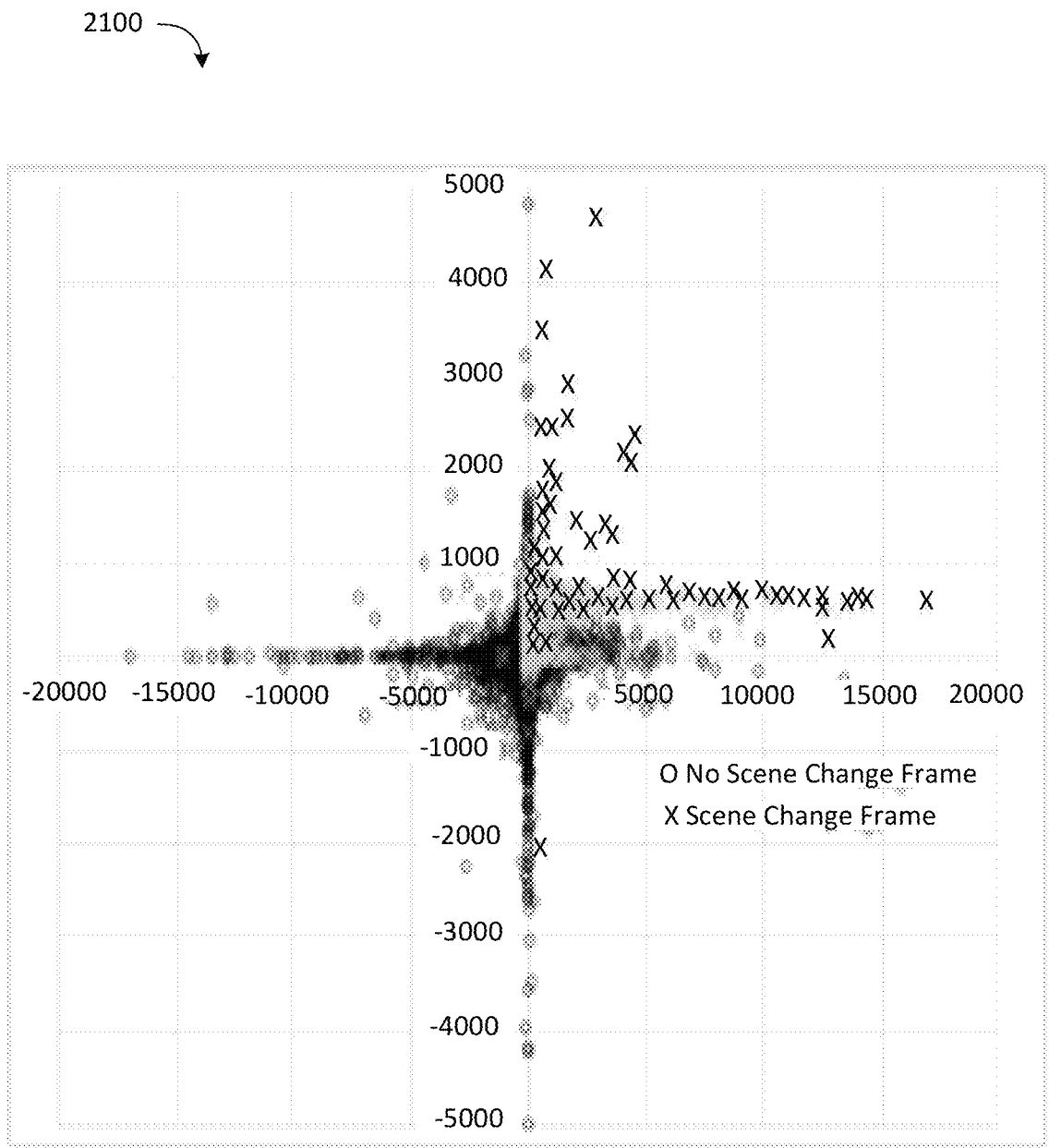
FIG. 21 is an illustrative chart of an example data point distribution of historical temporal feature values indicating whether a video frame sequence is moving towards more complex or simpler behavior.

FIG. 21 is an illustrative chart of an example data point distribution of historical temporal feature values 2100 indicating whether a video frame sequence is moving towards more complex or simpler behavior. In various implementations, the data point distribution of historical temporal feature values 2100 may be associated with the illustrated temporal feature values that illustrate whether a video frame sequence is moving towards more complex or simpler behavior. As illustrated, the data point distribution of historical temporal feature values 2100 charts the temporal difference of the temporal difference of the motion vector difference of the current frame with respect to the previous reference frame (DiffMVDiffVal) versus the temporal difference of the temporal difference of picture spatial complexities based on block rows and block columns of the current frame and the previous reference frame (DiffRsCsDiff), where an ("o") indicates no scene change frame and an ("x") indicates a scene change frame.

Figure 22:
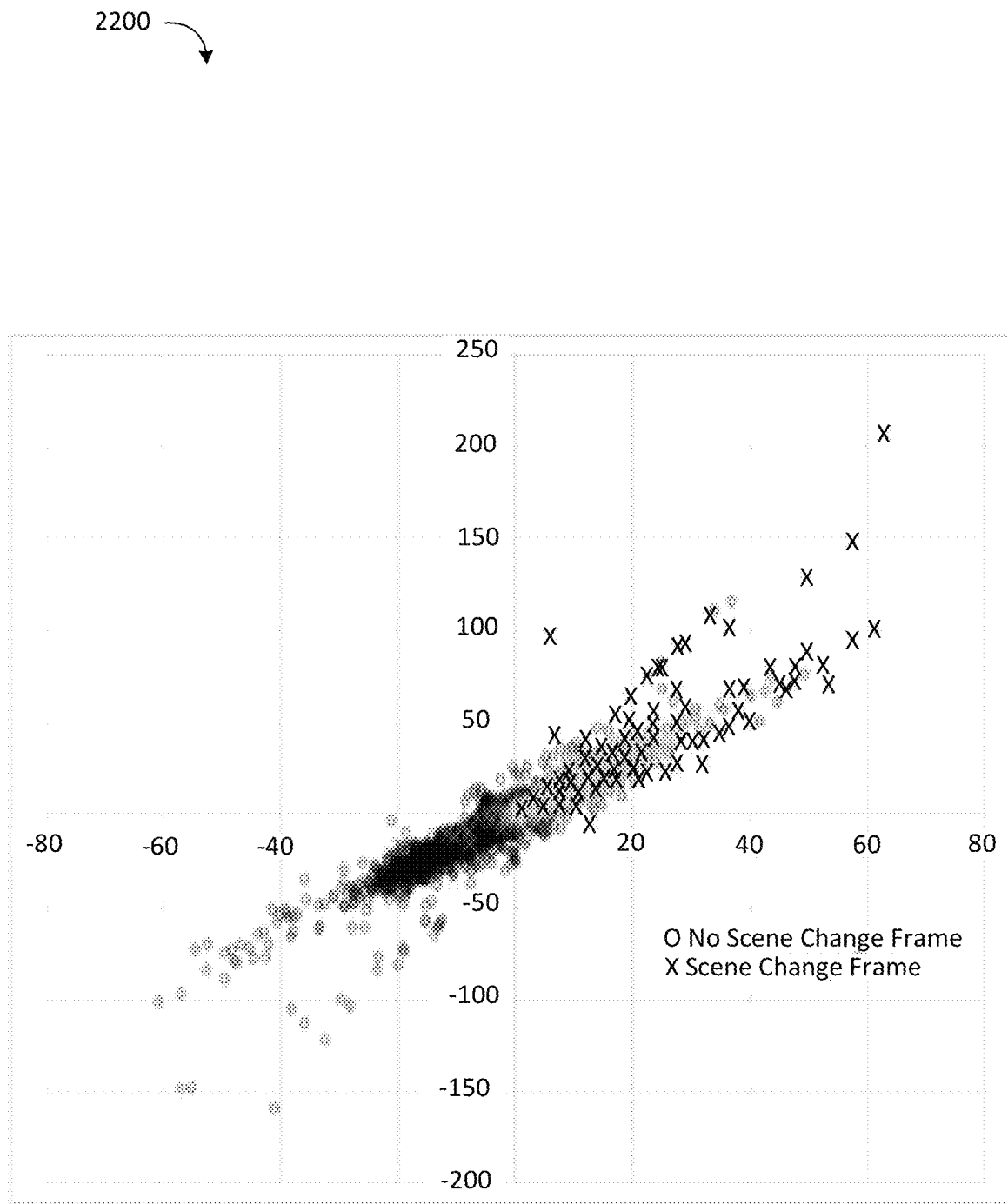
FIG. 22 is an illustrative chart of an example data point distribution of historical temporal feature values indicating whether a video frame sequence is moving towards more complex or simpler behavior.

FIG. 22 is an illustrative chart of an example data point distribution of historical temporal feature values 2200 indicating whether a video frame sequence is moving towards more complex or simpler behavior. In various implementations, the data point distribution of historical temporal feature values 2200 may be associated with the illustrated temporal feature values that illustrate whether a video frame sequence is moving towards more complex or simpler behavior. As illustrated, the data point distribution of historical temporal feature values 2200 charts the temporal difference of the absolute frame difference of the current frame with respect to the previous reference frame (DiffAFD) versus the temporal difference of the average value of motion compensated frame difference between the current frame with respect to the previous reference frame (DiffTSC), where an ("o") indicates no scene change frame and an ("x") indicates a scene change frame.

Figure 23:
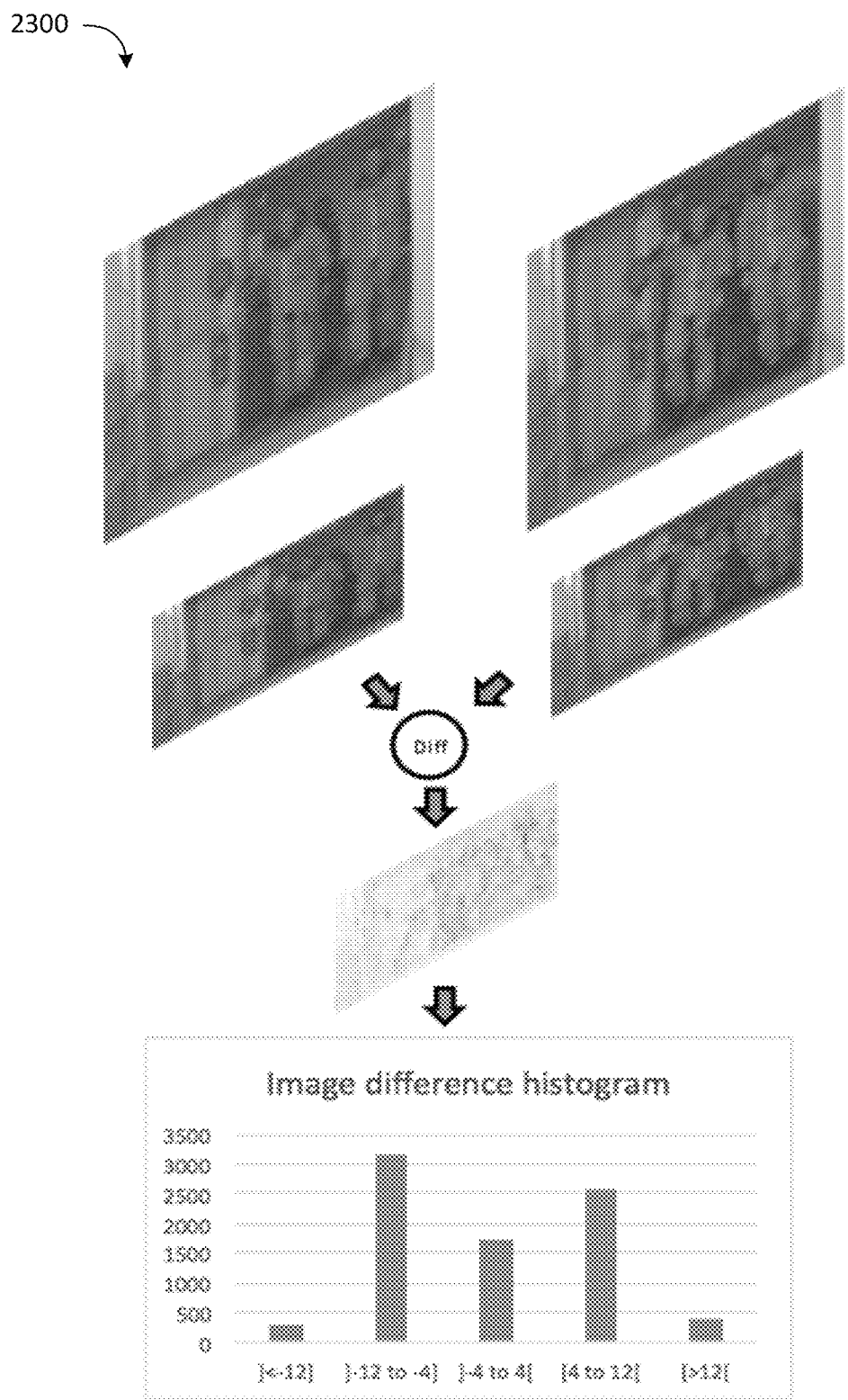
FIG. 23 is an illustrative diagram of an example luma downsampled non-gain change video frame sequence with associated temporal feature histogram.

FIG. 23 is an illustrative diagram of an example luma downsampled non-gain change video frame sequence 2300 with associated temporal feature histogram. In various implementations, luma downsampled non-gain change video frame sequence 2300 may be associated with a frame difference histogram of temporal features. For example, such a frame difference histogram of temporal features may be determined by frame difference histogram calculator 1106 (e.g., see FIG. 11).

Figure 24:
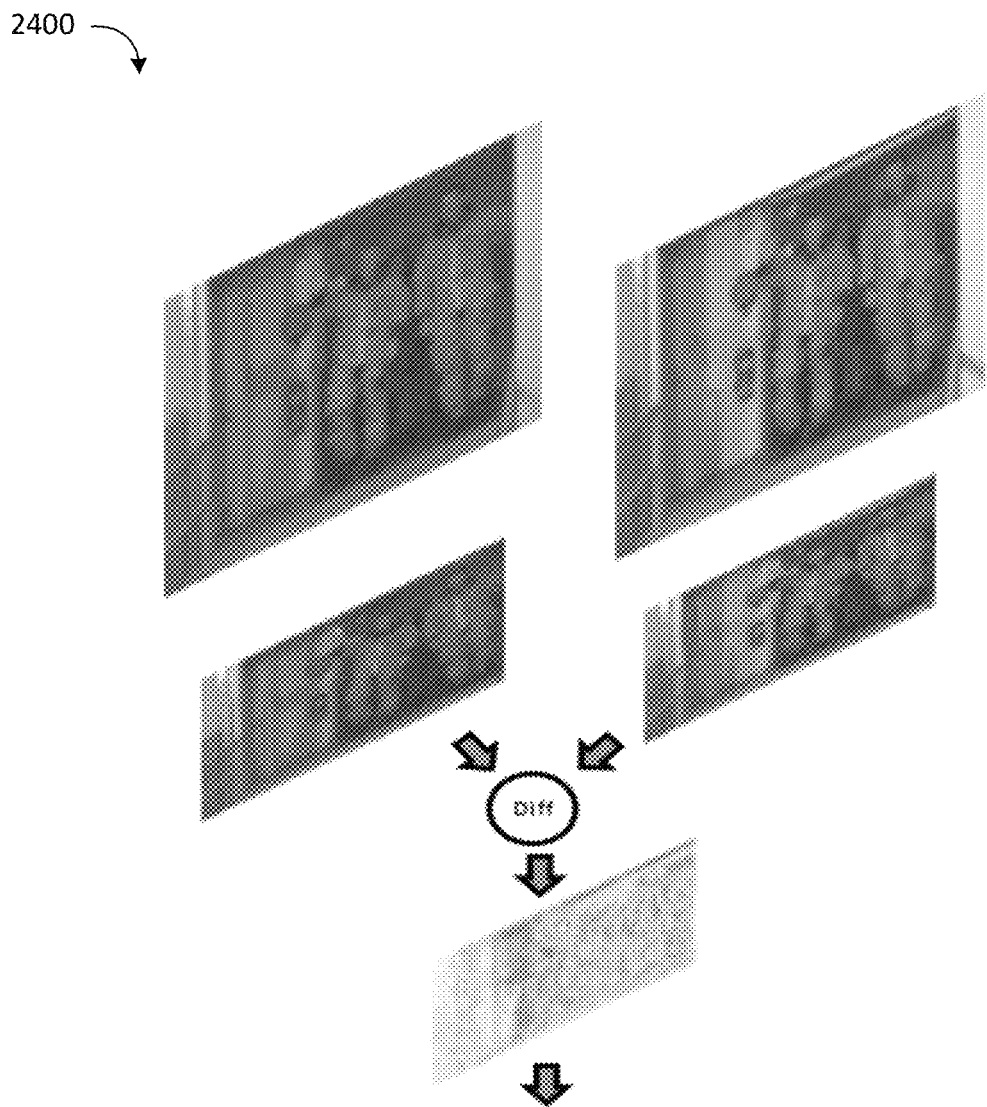
FIG. 24 is an illustrative diagram of an example luma downsampled gain change video frame sequence with associated temporal feature histogram.
Figure 25F:
Figure 26I:
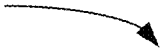
Figure 27A:
Figure 27B:
Figure 27D:
Figure 27E:
Figure 27F:
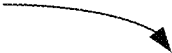
Figure 27G:
Figure 27H:

FIG. 24 is an illustrative diagram of an example luma downsampled gain change video frame sequence 2400 with associated temporal feature histogram. In various implementations, luma downsampled gain change video frame sequence 2400.

ADDITIONAL NOTES AND EXAMPLES

Example 1 may include an apparatus for video processing on a computer, comprising: one or more processors; one or more memory stores communicatively coupled to the one or more processors; a scene change detector communicatively coupled to the one or more processors, the scene change detector to: evaluate a current frame based at least in part on a plurality of feature groups, where each of the feature groups includes a plurality of feature values determined from individual features, where the individual features include one or more spatial features of the current frame and one or more temporal features of the current frame as compared with previously evaluated temporal features of a previous reference frame; and determine whether a scene change has occurred at the current frame based at least in part on a majority vote among the plurality of feature groups.

Example 2 may include the apparatus of Example 1, where the one or more temporal features include one or more of the following features: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the spatial differentials of the temporal features of the current frame as compared to the previous reference frame.

Example 3 may include the apparatus of Example 1, where the scene change detector further comprises: a downscaler to downsample luma of the current frame based at least in part on point sampling or box filtering; and a coder controller of a video coder communicatively coupled to the scene change detector, the coder controller to adjust coding operations based at least in part on the scene change determination.

Example 4 may include the apparatus of Example 3, where the scene change detector further comprises: a spatial features extractor to determine spatial features values from the current frame without reference to other frames, where the spatial features values are determined from the one or more spatial features including one or more of the following: a picture based average of a row wise block gradient array (Rs), a picture based average of a column wise gradient array (Cs), a picture based sum and then an average of a block-wise spatial complexity (SC), and a spatial complexity index that maps picture spatial complexity ranges to a single value (SCindex), an average luma value of the current frame (ssDCval), and an average luma value of the previous reference frame (refDCval).

Example 5 may include the apparatus of Example 4, where the scene change detector further comprises: a frame buffer to store a luma array of the previous reference frame; a luma difference calculator to calculate a picture luma average of a luma array of the current frame and to difference the picture luma average of the current frame from a picture luma average of the previous reference frame; and a gain normalizer to compensate the luma level of the previous reference frame based at least in part on a luma level difference between the current frame and the previous reference frame.

Example 6 may include the apparatus of Example 5, where the scene change detector further comprises: a temporal features extractor to determine temporal features values from the luma of the current frame, the luma of previous reference frame, and the determined spatial feature values, where the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the spatial differentials of the temporal features of the current frame as compared to the previous reference frame; where the one or more temporal features of the current frame as compared to the previous reference frame include one or more of the following: a count of a number of positive frame difference pixels in the current frame (posBalance), a count of a number of negative frame difference pixels in the current frame (negBalance), an absolute frame difference of the current frame with respect to the previous reference frame (AFD), an average value of motion compensated frame difference between the current frame with respect to the previous reference frame (TSC), and a mapped value of a range of values associated with the average value of motion compensated frame difference between the current frame with respect to the previous reference frame that is mapped to a single value (TSCindex); where the one or more temporal differentials of the spatial features of the current frame as compared to the previous reference frame include one or more of the following: a gain change temporal difference between the average luma value of the current frame and the previous reference frame (gchDC), a temporal difference of picture spatial complexities based on block rows of the current frame and the previous reference frame (RsDiff), a temporal difference of picture spatial complexities based on block columns of the current frame and the previous reference frame (CsDiff), and a temporal difference of picture spatial complexities based on block rows and block columns of the current frame and the previous reference frame (RsCsDiff); where the one or more temporal differentials of the spatial features of the current frame as compared with spatial features of the previous reference frame include one or more of the following: a temporal difference of the absolute frame difference of the current frame with respect to the previous reference frame (DiffAFD), a motion vector difference of the current frame with respect to the previous reference frame including an average of picture of a square of difference of current frame minus previous reference frame x component of motion vector and of square of difference of the current frame minus the previous reference frame y component of motion vector (MVDiff), a temporal difference of the temporal difference of the motion vector difference of the current frame with respect to the previous reference frame (DiffMVDiffVal), and a temporal difference of the average value of motion compensated frame difference between the current frame with respect to the previous reference frame (DiffTSC); and where the at least one temporal differential of the spatial differentials of the temporal features of the current frame as compared to the previous reference frame includes: a temporal difference of the temporal difference of picture spatial complexities based on block rows and block columns of the current frame and the previous reference frame (DiffRsCsDiff).

Example 7 may include the apparatus of Example 6, where the scene change detector further comprises: a spatial and temporal features buffer to store the determined spatial features values of the previous reference frame and the determined temporal feature values of the previous reference frame; and a decision logic controller to perform the determination of whether a scene change has occurred based at least in part on the determined spatial features values of the current frame, the determined temporal feature values of the current frame, the determined spatial features values of the previous reference frame and the determined temporal feature values of the previous reference frame.

Example 8 may include the apparatus of Example 6, where a first feature group involved in the majority vote among the plurality of feature groups includes the picture based average of a row wise block gradient array (Rs), the picture based average of a column wise gradient array (Cs), and the picture based sum and then an average of a block-wise spatial complexity (SC); where a second feature group involved in the majority vote among the plurality of feature groups includes the absolute frame difference of the current frame with respect to the previous reference frame (AFD), the average value of motion compensated frame difference between the current frame with respect to the previous reference frame (TSC), the temporal difference of picture spatial complexities based on block rows of the current frame and the previous reference frame (RsDiff), the temporal difference of picture spatial complexities based on block columns of the current frame and the previous reference frame (CsDiff), and the temporal difference of picture spatial complexities based on block rows and block columns of the current frame and the previous reference frame (RsCsDiff); where a third feature group involved in the majority vote among the plurality of feature groups includes the temporal difference of the absolute frame difference of the current frame with respect to the previous reference frame (DiffAFD), the motion vector difference of the current frame with respect to the previous reference frame including an average of picture of a square of difference of current frame minus previous reference frame x component of motion vector and of square of difference of the current frame minus the previous reference frame y component of motion vector (MVDiff), the temporal difference of the temporal difference of the motion vector difference of the current frame with respect to the previous reference frame (DiffMVDiffVal), the temporal difference of the average value of motion compensated frame difference between the current frame with respect to the previous reference frame (DiffTSC), and the temporal difference of the temporal difference of picture spatial complexities based on block rows and block columns of the current frame and the previous reference frame (DiffRsCsDiff); where a fourth feature group involved in the majority vote among the plurality of feature groups includes the average luma value of the current frame (ssDCval), the average luma value of the previous reference frame (refDCval), the gain change temporal difference between the average luma value of the current frame and the previous reference frame (gchDC), the count of a number of positive frame difference pixels in the current frame (posBalance), and the count of a number of negative frame difference pixels in the current frame (negBalance); and where each of the feature groups correspond to a decision tree deduced from a Random Forest machine learning approach.

Example 19 may include the apparatus of Example 1, where the operations of the scene change detector is performed in real-time in the absence of lookahead operations, and where the coder controller is to assign the current frame as an I-picture based at least in part on the determination of whether a scene change has occurred at the current frame.

Example 10 may include the apparatus of Example 1, where the scene change detector further comprises: a downscaler to downsample luma of the current frame based at least in part on point sampling or box filtering; a spatial features extractor to determine spatial features values from the current frame without reference to other frames, where the spatial features values are determined from the one or more spatial features including one or more of the following: a picture based average of a row wise block gradient array (Rs), a picture based average of a column wise gradient array (Cs), a picture based sum and then an average of a block-wise spatial complexity (SC), and a spatial complexity index that maps picture spatial complexity ranges to a single value (SCindex), an average luma value of the current frame (ssDCval), and an average luma value of the previous reference frame (refDCval); a frame buffer to store a luma array of the previous reference frame; a luma difference calculator to calculate a picture luma average of a luma array of the current frame and to difference the picture luma average of the current frame from a picture luma average of the previous reference frame; a gain normalizer to compensate the luma level of the previous reference frame based at least in part on a luma level difference between the current frame and the previous reference frame; a temporal features extractor to determine temporal features values from the luma of the current frame, the luma of previous reference frame, and the determined spatial feature values, where the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the spatial differentials of the temporal features of the current frame as compared to the previous reference frame; where the one or more temporal features of the current frame as compared to the previous reference frame include one or more of the following: a count of a number of positive frame difference pixels in the current frame (posBalance), a count of a number of negative frame difference pixels in the current frame (negBalance), an absolute frame difference of the current frame with respect to the previous reference frame (AFD), an average value of motion compensated frame difference between the current frame with respect to the previous reference frame (TSC), and a mapped value of a range of values associated with the average value of motion compensated frame difference between the current frame with respect to the previous reference frame that is mapped to a single value (TSCindex); where the one or more temporal differentials of the spatial features of the current frame as compared to the previous reference frame include one or more of the following: a gain change temporal difference between the average luma value of the current frame and the previous reference frame (gchDC), a temporal difference of picture spatial complexities based on block rows of the current frame and the previous reference frame (RsDiff), a temporal difference of picture spatial complexities based on block columns of the current frame and the previous reference frame (CsDiff), and a temporal difference of picture spatial complexities based on block rows and block columns of the current frame and the previous reference frame (RsCsDiff); where the one or more temporal differentials of the spatial features of the current frame as compared with spatial features of the previous reference frame include one or more of the following: a temporal difference of the absolute frame difference of the current frame with respect to the previous reference frame (DiffAFD), a motion vector difference of the current frame with respect to the previous reference frame including an average of picture of a square of difference of current frame minus previous reference frame x component of motion vector and of square of difference of the current frame minus the previous reference frame y component of motion vector (MVDiff), a temporal difference of the temporal difference of the motion vector difference of the current frame with respect to the previous reference frame (DiffMVDiffVal), and a temporal difference of the average value of motion compensated frame difference between the current frame with respect to the previous reference frame (DiffTSC); and where the at least one temporal differential of the spatial differentials of the temporal features of the current frame as compared to the previous reference frame includes: a temporal difference of the temporal difference of picture spatial complexities based on block rows and block columns of the current frame and the previous reference frame (DiffRsCsDiff); a spatial and temporal features buffer to store the determined spatial features values of the previous reference frame and the determined temporal feature values of the previous reference frame; and a decision logic controller to perform the determination of whether a scene change has occurred based at least in part on the determined spatial features values of the current frame, the determined temporal feature values of the current frame, the determined spatial features values of the previous reference frame and the determined temporal feature values of the previous reference frame; and a coder controller of a video coder communicatively coupled to the scene change detector, the coder controller to adjust coding operations based at least in part on the scene change determination; where a first feature group involved in the majority vote among the plurality of feature groups includes the picture based average of a row wise block gradient array (Rs), the picture based average of a column wise gradient array (Cs), and the picture based sum and then an average of a block-wise spatial complexity (SC); where a second feature group involved in the majority vote among the plurality of feature groups includes the absolute frame difference of the current frame with respect to the previous reference frame (AFD), the average value of motion compensated frame difference between the current frame with respect to the previous reference frame (TSC), the temporal difference of picture spatial complexities based on block rows of the current frame and the previous reference frame (RsDiff), the temporal difference of picture spatial complexities based on block columns of the current frame and the previous reference frame (CsDiff), and the temporal difference of picture spatial complexities based on block rows and block columns of the current frame and the previous reference frame (RsCsDiff); where a third feature group involved in the majority vote among the plurality of feature groups includes the temporal difference of the absolute frame difference of the current frame with respect to the previous reference frame (DiffAFD), the motion vector difference of the current frame with respect to the previous reference frame including an average of picture of a square of difference of current frame minus previous reference frame x component of motion vector and of square of difference of the current frame minus the previous reference frame y component of motion vector (MVDiff), the temporal difference of the temporal difference of the motion vector difference of the current frame with respect to the previous reference frame (DiffMVDiffVal), the temporal difference of the average value of motion compensated frame difference between the current frame with respect to the previous reference frame (DiffTSC), and the temporal difference of the temporal difference of picture spatial complexities based on block rows and block columns of the current frame and the previous reference frame (DiffRsCsDiff); where a fourth feature group involved in the majority vote among the plurality of feature groups includes the average luma value of the current frame (ssDCval), the average luma value of the previous reference frame (refDCval), the gain change temporal difference between the average luma value of the current frame and the previous reference frame (gchDC), the count of a number of positive frame difference pixels in the current frame (posBalance), and the count of a number of negative frame difference pixels in the current frame (negBalance); and where each of the feature groups correspond to a decision tree deduced from a Random Forest machine learning approach; where the operations of the scene change detector is performed in real-time in the absence of lookahead operations; and where the coder controller is to assign the current frame as an I-picture based at least in part on the determination of whether a scene change has occurred at the current frame.

Example 11 may include a method for scene change detection on a computer, comprising: evaluating a current frame based at least in part on a plurality of feature groups, where each of the feature groups includes a plurality of feature values determined from individual features, where the individual features include one or more spatial features of the current frame and one or more temporal features of the current frame as compared with previously evaluated temporal features of a previous reference frame; and determining whether a scene change has occurred at the current frame based at least in part on a majority vote among the plurality of feature groups.

Example 12 may include the method of Example 11, further comprising:

downsampling, via a downscaler, luma of the current frame based at least in part on point sampling or box filtering; and determining, via a spatial features extractor, spatial features values from the current frame without reference to other frames, where the spatial features values are determined from the one or more spatial features including one or more of the following: a picture based average of a row wise block gradient array (Rs), a picture based average of a column wise gradient array (Cs), a picture based sum and then an average of a block-wise spatial complexity (SC), and a spatial complexity index that maps picture spatial complexity ranges to a single value (SCindex), an average luma value of the current frame (ssDCval), and an average luma value of the previous reference frame (refDCval).

Example 13 may include the method of Example 12, further comprising: storing, via a frame buffer, a luma array of the previous reference frame; measuring, via a luma difference calculator, a picture luma average of a luma array of the current frame and to difference the picture luma average of the current frame from a picture luma average of the previous reference frame; and compensating, via a gain normalizer, the luma level of the previous reference frame based at least in part on a luma level difference between the current frame and the previous reference frame.

Example 14 may include the method of Example 13, further comprising: determining, via a temporal features extractor, temporal features values from the luma of the current frame, the luma of the previous reference frame, and the determined spatial feature values, where the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the spatial differentials of the temporal features of the current frame as compared to the previous reference frame; where the one or more temporal features of the current frame as compared to the previous reference frame include one or more of the following: a count of a number of positive frame difference pixels in the current frame (posBalance), a count of a number of negative frame difference pixels in the current frame (negBalance), an absolute frame difference of the current frame with respect to the previous reference frame (AFD), an average value of motion compensated frame difference between the current frame with respect to the previous reference frame (TSC), and a mapped value of a range of values associated with the average value of motion compensated frame difference between the current frame with respect to the previous reference frame that is mapped to a single value (TSCindex); where the one or more temporal differentials of the spatial features of the current frame as compared to the previous reference frame include one or more of the following: a gain change temporal difference between the average luma value of the current frame and the previous reference frame (gchDC), a temporal difference of picture spatial complexities based on block rows of the current frame and the previous reference frame (RsDiff), a temporal difference of picture spatial complexities based on block columns of the current frame and the previous reference frame (CsDiff), and a temporal difference of picture spatial complexities based on block rows and block columns of the current frame and the previous reference frame (RsCsDiff); where the one or more temporal differentials of the spatial features of the current frame as compared with spatial features of the previous reference frame include one or more of the following: a temporal difference of the absolute frame difference of the current frame with respect to the previous reference frame (DiffAFD), a motion vector difference of the current frame with respect to the previous reference frame including an average of picture of a square of difference of current frame minus previous reference frame x component of motion vector and of square of difference of the current frame minus the previous reference frame y component of motion vector (MVDiff), a temporal difference of the temporal difference of the motion vector difference of the current frame with respect to the previous reference frame (DiffMVDiffVal), and a temporal difference of the average value of motion compensated frame difference between the current frame with respect to the previous reference frame (DiffTSC); and where the at least one temporal differential of the spatial differentials of the temporal features of the current frame as compared to the previous reference frame includes: a temporal difference of the temporal difference of picture spatial complexities based on block rows and block columns of the current frame and the previous reference frame (DiffRsCsDiff).

Example 15 may include the method of Example 13, further comprising: storing, via a spatial and temporal features buffer, the determined spatial features values of the previous reference frame and the determined temporal feature values of the previous reference frame; and performing, via a decision logic controller, the determination of whether a scene change has occurred based at least in part on the determined spatial features values of the current frame, the determined temporal feature values of the current frame, the determined spatial features values of the previous reference frame and the determined temporal feature values of the previous reference frame.

Example 16 may include the method of Example 15, further comprising: where a first feature group involved in the majority vote among the plurality of feature groups includes the picture based average of a row wise block gradient array (Rs), the picture based average of a column wise gradient array (Cs), and the picture based sum and then an average of a block-wise spatial complexity (SC); where a second feature group involved in the majority vote among the plurality of feature groups includes the absolute frame difference of the current frame with respect to the previous reference frame (AFD), the average value of motion compensated frame difference between the current frame with respect to the previous reference frame (TSC), the temporal difference of picture spatial complexities based on block rows of the current frame and the previous reference frame (RsDiff), the temporal difference of picture spatial complexities based on block columns of the current frame and the previous reference frame (CsDiff), and the temporal difference of picture spatial complexities based on block rows and block columns of the current frame and the previous reference frame (RsCsDiff); where a third feature group involved in the majority vote among the plurality of feature groups includes the temporal difference of the absolute frame difference of the current frame with respect to the previous reference frame (DiffAFD), the motion vector difference of the current frame with respect to the previous reference frame including an average of picture of a square of difference of current frame minus previous reference frame x component of motion vector and of square of difference of the current frame minus the previous reference frame y component of motion vector (MVDiff), the temporal difference of the temporal difference of the motion vector difference of the current frame with respect to the previous reference frame (DiffMVDiffVal), the temporal difference of the average value of motion compensated frame difference between the current frame with respect to the previous reference frame (DiffTSC), and the temporal difference of the temporal difference of picture spatial complexities based on block rows and block columns of the current frame and the previous reference frame (DiffRsCsDiff); where a fourth feature group involved in the majority vote among the plurality of feature groups includes the average luma value of the current frame (ssDCval), the average luma value of the previous reference frame (refDCval), the gain change temporal difference between the average luma value of the current frame and the previous reference frame (gchDC), the count of a number of positive frame difference pixels in the current frame (posBalance), and the count of a number of negative frame difference pixels in the current frame (negBalance); and where each of the feature groups correspond to a decision tree deduced from a Random Forest machine learning approach.

Example 17 may include a system to detect scene changes, comprising: a scene change detector, the scene change detector including a substrate and logic coupled to the substrate, where the logic is to: evaluate a current frame based at least in part on a plurality of feature groups, where each of the feature groups includes a plurality of feature values determined from individual features, where the individual features include one or more spatial features of the current frame and one or more temporal features of the current frame as compared with previously evaluated temporal features of a previous reference frame; determine whether a scene change has occurred at the current frame based at least in part on a majority vote among the plurality of feature groups; and a power supply to provide power to the scene change detector.

Example 18 may include the system of Example 17, where the logic is to downsample luma of the current frame based at least in part on point sampling or box filtering; determine spatial features values from the current frame without reference to other frames, where the spatial features values are determined from the one or more spatial features including one or more of the following: a picture based average of a row wise block gradient array (Rs), a picture based average of a column wise gradient array (Cs), a picture based sum and then an average of a block-wise spatial complexity (SC), and a spatial complexity index that maps picture spatial complexity ranges to a single value (SCindex), an average luma value of the current frame (ssDCval), and an average luma value of the previous reference frame (refDCval); store a luma array of the previous reference frame; calculate a picture luma average of a luma array of the current frame and to difference the picture luma average of the current frame from a picture luma average of the previous reference frame; and compensate the luma level of the previous reference frame based at least in part on a luma level difference between the current frame and the previous reference frame.

Example 19 may include the system of Example 18, where the logic is to: determine temporal features values from the downsampled luma of the current frame, the downsampled luma of the previous reference frame, and the determined spatial feature values, where the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the temporal differentials of the spatial features of the current frame as compared to the previous reference frame; where the one or more temporal features of the current frame as compared to the previous reference frame include one or more of the following: a count of a number of positive frame difference pixels in the current frame (posBalance), a count of a number of negative frame difference pixels in the current frame (negBalance), an absolute frame difference of the current frame with respect to the previous reference frame (AFD), an average value of motion compensated frame difference between the current frame with respect to the previous reference frame (TSC), and a mapped value of a range of values associated with the average value of motion compensated frame difference between the current frame with respect to the previous reference frame that is mapped to a single value (TSCindex); where the one or more temporal differentials of the spatial features of the current frame as compared to the previous reference frame include one or more of the following: a gain change temporal difference between the average luma value of the current frame and the previous reference frame (gchDC), a temporal difference of picture spatial complexities based on block rows of the current frame and the previous reference frame (RsDiff), a temporal difference of picture spatial complexities based on block columns of the current frame and the previous reference frame (CsDiff), and a temporal difference of picture spatial complexities based on block rows and block columns of the current frame and the previous reference frame (RsCsDiff); where the one or more temporal differentials of the spatial features of the current frame as compared with spatial features of the previous reference frame include one or more of the following: a temporal difference of the absolute frame difference of the current frame with respect to the previous reference frame (DiffAFD), a motion vector difference of the current frame with respect to the previous reference frame including an average of picture of a square of difference of current frame minus previous reference frame x component of motion vector and of square of difference of the current frame minus the previous reference frame y component of motion vector (MVDiff), a temporal difference of the temporal difference of the motion vector difference of the current frame with respect to the previous reference frame (DiffMVDiffVal), and a temporal difference of the average value of motion compensated frame difference between the current frame with respect to the previous reference frame (DiffTSC); and where the at least one temporal differential of the temporal differentials of the spatial features of the current frame as compared to the previous reference frame includes: a temporal difference of the temporal difference of picture spatial complexities based on block rows and block columns of the current frame and the previous reference frame (DiffRsCsDiff).

Example 20 may include at least one computer readable storage medium comprising a set of instructions, which when executed by a computing system, cause the computing system to: evaluate a current frame based at least in part on a plurality of feature groups, where each of the feature groups includes a plurality of feature values determined from individual features, where the individual features include one or more spatial features of the current frame and one or more temporal features of the current frame as compared with previously evaluated temporal features of a previous reference frame; and determine whether a scene change has occurred at the current frame based at least in part on a majority vote among the plurality of feature groups.

Example 21 may include the at least one computer readable storage medium of Example 20, where the instructions, when executed, cause the computing system to: downsample luma of the current frame based at least in part on point sampling or box filtering; determine spatial features values from the current frame without reference to other frames, where the spatial features values are determined from the one or more spatial features including one or more of the following: a picture based average of a row wise block gradient array (Rs), a picture based average of a column wise gradient array (Cs), a picture based sum and then an average of a block-wise spatial complexity (SC), and a spatial complexity index that maps picture spatial complexity ranges to a single value (SCindex), an average luma value of the current frame (ssDCval), and an average luma value of the previous reference frame (refDCval); store a luma array of the previous reference frame; calculate a picture luma average of a luma array of the current frame and to difference the picture luma average of the current frame from a picture luma average of the previous reference frame; and compensate the luma level of the previous reference frame based at least in part on a luma level difference between the current frame and the previous reference frame.

Example 22 may include an apparatus, including means for performing a method as described in any preceding Example.

Example 23 may include machine-readable storage including machine-readable instructions which, when executed, implement a method or realize an apparatus as described in any preceding Example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A video processing apparatus, comprising:
   one or more processors;
   one or more memory stores communicatively coupled to the one or more processors;
   a scene change detector communicatively coupled to the one or more processors, the scene change detector to:
      evaluate a current frame in a video sequence including a plurality of different scenes based at least in part on a plurality of feature groups, wherein each of the feature groups includes a plurality of feature values determined from individual features, wherein the individual features include one or more spatial features of the current frame and one or more temporal features of the current frame as compared with previously evaluated temporal features of a previous reference frame; and
      determine whether a scene change has occurred at the current frame based at least in part on a majority vote among the plurality of feature groups, wherein a first feature group includes a first plurality of features to determine an amount and distribution of texture over the current frame, wherein a second feature group includes a second plurality of features to determine an amount and distribution of motion for the current frame and the previous reference frame, wherein a third feature group includes a third plurality of features to determine whether the current frame and the previous reference frame are moving towards a more complex behavior or a simpler behavior, and wherein the first feature group, the second feature group, and the third feature group are each permitted one vote.

2. The video processing apparatus of claim 1, wherein the one or more temporal features include one or more of the following features: one or more temporal differentials of the spatial features of the current frame as compared with spatial features of the previous reference frame, one or more basic temporal features of the current frame as compared to the previous reference frame, one or more temporal differentials of the temporal features of the current frame as compared to the previous reference frame, and at least one temporal differential of the temporal differentials of the spatial features of the current frame as compared to the previous reference frame.

3. The video processing apparatus of claim 1, wherein the scene change detector further comprises:
   a downscaler to downsample luma of the current frame based at least in part on point sampling or box filtering; and
   a coder controller of a video coder communicatively coupled to the scene change detector, the coder controller to adjust coding operations based at least in part on the scene change determination.

4. The video processing apparatus of claim 3, wherein the scene change detector further comprises:
   a spatial features extractor to determine spatial features values from the current frame without reference to other frames, wherein the spatial features values are determined from the one or more spatial features including one or more of the following: a picture based average of a row wise block gradient array, a picture based average of a column wise gradient array, a picture based sum and then an average of a block-wise spatial complexity, and a spatial complexity index that maps picture spatial complexity ranges to a single value, an average luma value of the current frame, and an average luma value of the previous reference frame.

5. The video processing apparatus of claim 4, wherein the scene change detector further comprises:
   a frame buffer to store a luma array of the previous reference frame;
   a luma difference calculator to calculate a picture luma average of a luma array of the current frame and to difference the picture luma average of the current frame from a picture luma average of the previous reference frame; and
   a gain normalizer to compensate the luma level of the previous reference frame based at least in part on a luma level difference between the current frame and the previous reference frame.

6. The video processing apparatus of claim 5, wherein the scene change detector further comprises:
   a temporal features extractor to determine temporal features values from the luma of the current frame, the luma of previous reference frame, and the determined spatial feature values, wherein the temporal features values are determined from one or more temporal features including: one or more temporal differentials of the spatial features of the current frame as compared with spatial features of the previous reference frame, one or more basic temporal features of the current frame as compared to the previous reference frame, one or more temporal differentials of the spatial features of the current frame as compared to the previous reference frame, and at least one temporal differential of the temporal differentials of the spatial features of the current frame as compared to the previous reference frame;
   wherein the one or more basic temporal features of the current frame as compared to the previous reference frame include one or more of the following:
      a count of a number of positive frame difference pixels in the current frame,
      a count of a number of negative frame difference pixels in the current frame, an absolute frame difference of the current frame with respect to the previous reference frame, an average value of motion compensated frame difference between the current frame with respect to the previous reference frame, and a mapped value of a range of values associated with the average value of motion compensated frame difference between the current frame with respect to the previous reference frame that is mapped to a single value;

wherein the one or more temporal differentials of the spatial features of the current frame as compared to the previous reference frame include one or more of the following:

a gain change temporal difference between the average luma value of the current frame and the previous reference frame, a temporal difference of picture spatial complexities based on block rows of the current frame and the previous reference frame, a temporal difference of picture spatial complexities based on block columns of the current frame and the previous reference frame, and a temporal difference of picture spatial complexities based on block rows and block columns of the current frame and the previous reference frame;

wherein the one or more temporal differentials of the spatial features of the current frame as compared with spatial features of the previous reference frame include one or more of the following:

a temporal difference of the absolute frame difference of the current frame with respect to the previous reference frame, a motion vector difference of the current frame with respect to the previous reference frame including an average of picture of a square of difference of current frame minus previous reference frame x component of motion vector and of square of difference of the current frame minus the previous reference frame y component of motion vector, a temporal difference of the temporal difference of the motion vector difference of the current frame with respect to the previous reference frame, and a temporal difference of the average value of motion compensated frame difference between the current frame with respect to the previous reference frame; and wherein the at least one temporal differential of the temporal differentials of the spatial features of the current frame as compared to the previous reference frame includes: a temporal difference of the temporal difference of picture spatial complexities based on block rows and block columns of the current frame and the previous reference frame.

7. The video processing apparatus of claim 6, wherein the scene change detector further comprises:

a spatial and temporal features buffer to store the determined spatial features values of the previous reference frame and the determined temporal feature values of the previous reference frame; and a decision logic controller to perform the determination of whether a scene change has occurred based at least in part on the determined spatial features values of the current frame, the determined temporal feature values of the current frame, the determined spatial features values of the previous reference frame and the determined temporal feature values of the previous reference frame.

8. The video processing apparatus of claim 6, wherein the first feature group involved in the majority vote among the plurality of feature groups includes the picture based average of a row wise block gradient array, the picture based average of a column wise gradient array, and the picture based sum and then an average of a block-wise spatial complexity;

wherein the second feature group involved in the majority vote among the plurality of feature groups includes the absolute frame difference of the current frame with respect to the previous reference frame, the average value of motion compensated frame difference between the current frame with respect to the previous reference frame, the temporal difference of picture spatial complexities based on block rows of the current frame and the previous reference frame, the temporal difference of picture spatial complexities based on block columns of the current frame and the previous reference frame, and the temporal difference of picture spatial complexities based on block rows and block columns of the current frame and the previous reference frame;

wherein the third feature group involved in the majority vote among the plurality of feature groups includes the temporal difference of the absolute frame difference of the current frame with respect to the previous reference frame, the motion vector difference of the current frame with respect to the previous reference frame including an average of picture of a square of difference of current frame minus previous reference frame x component of motion vector and of square of difference of the current frame minus the previous reference frame y component of motion vector, the temporal difference of the temporal difference of the motion vector difference of the current frame with respect to the previous reference frame, the temporal difference of the average value of motion compensated frame difference between the current frame with respect to the previous reference frame, and the temporal difference of the temporal difference of picture spatial complexities based on block rows and block columns of the current frame and the previous reference frame;

wherein a fourth feature group involved in the majority vote among the plurality of feature groups includes the average luma value of the current frame, the average luma value of the previous reference frame, the gain change temporal difference between the average luma value of the current frame and the previous reference frame, the count of a number of positive frame difference pixels in the current frame, and the count of a number of negative frame difference pixels in the current frame; and wherein each of the feature groups correspond to a decision tree deduced from a Random Forest machine learning approach.

9. The video processing apparatus of claim 1, wherein the operations of the scene change detector is performed in real-time in the absence of lookahead operations, and wherein the coder controller is to assign the current frame as an I-picture based at least in part on the determination of whether a scene change has occurred at the current frame.

10. The video processing apparatus of claim 1, wherein the scene change detector further comprises:

a downscaler to downsample luma of the current frame based at least in part on point sampling or box filtering;

a spatial features extractor to determine spatial features values from the current frame without reference to other frames, wherein the spatial features values are determined from the one or more spatial features including one or more of the following: a picture based average of a row wise block gradient array, a picture based average of a column wise gradient array, a picture based sum and then an average of a block-wise spatial complexity, and a spatial complexity index that maps picture spatial complexity ranges to a single value, an average luma value of the current frame, and an average luma value of the previous reference frame;

a frame buffer to store a luma array of the previous reference frame;

a luma difference calculator to calculate a picture luma average of a luma array of the current frame and to difference the picture luma average of the current frame from a picture luma average of the previous reference frame;

a gain normalizer to compensate the luma level of the previous reference frame based at least in part on a luma level difference between the current frame and the previous reference frame;

a temporal features extractor to determine temporal features values from the luma of the current frame, the luma of previous reference frame, and the determined spatial feature values, wherein the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the temporal differentials of the spatial features of the current frame as compared to the previous reference frame; wherein the one or more temporal features of the current frame as compared to the previous reference frame include one or more of the following: a count of a number of positive frame difference pixels in the current frame, a count of a number of negative frame difference pixels in the current frame, an absolute frame difference of the current frame with respect to the previous reference frame, an average value of motion compensated frame difference between the current frame with respect to the previous reference frame, and a mapped value of a range of values associated with the average value of motion compensated frame difference between the current frame with respect to the previous reference frame that is mapped to a single value; wherein the one or more temporal differentials of the spatial features of the current frame as compared to the previous reference frame include one or more of the following: a gain change temporal difference between the average luma value of the current frame and the previous reference frame, a temporal difference of picture spatial complexities based on block rows of the current frame and the previous reference frame, a temporal difference of picture spatial complexities based on block columns of the current frame and the previous reference frame, and a temporal difference of picture spatial complexities based on block rows and block columns of the current frame and the previous reference frame; wherein the one or more temporal differentials of the spatial features of the current frame as compared with spatial features of the previous reference frame include one or more of the following: a temporal difference of the absolute frame difference of the current frame with respect to the previous reference frame, a motion vector difference of the current frame with respect to the previous reference frame including an average of picture of a square of difference of current frame minus previous reference frame x component of motion vector and of square of difference of the current frame minus the previous reference frame y component of motion vector, a temporal difference of the temporal difference of the motion vector difference of the current frame with respect to the previous reference frame, and a temporal difference of the average value of motion compensated frame difference between the current frame with respect to the previous reference frame; and wherein the at least one temporal differential of the temporal differentials of the spatial features of the current frame as compared to the previous reference frame includes: a temporal difference of the temporal difference of picture spatial complexities based on block rows and block columns of the current frame and the previous reference frame;

a spatial and temporal features buffer to store the determined spatial features values of the previous reference frame and the determined temporal feature values of the previous reference frame; and a decision logic controller to perform the determination of whether a scene change has occurred based at least in part on the determined spatial features values of the current frame, the determined temporal feature values of the current frame, the determined spatial features values of the previous reference frame and the determined temporal feature values of the previous reference frame; and a coder controller of a video coder communicatively coupled to the scene change detector, the coder controller to adjust coding operations based at least in part on the scene change determination;

wherein the first feature group involved in the majority vote among the plurality of feature groups includes the picture based average of a row wise block gradient array, the picture based average of a column wise gradient array, and the picture based sum and then an average of a block-wise spatial complexity;

wherein the second feature group involved in the majority vote among the plurality of feature groups includes the absolute frame difference of the current frame with respect to the previous reference frame, the average value of motion compensated frame difference between the current frame with respect to the previous reference frame, the temporal difference of picture spatial complexities based on block rows of the current frame and the previous reference frame, the temporal difference of picture spatial complexities based on block columns of the current frame and the previous reference frame, and the temporal difference of picture spatial complexities based on block rows and block columns of the current frame and the previous reference frame;

wherein the third feature group involved in the majority vote among the plurality of feature groups includes the temporal difference of the absolute frame difference of the current frame with respect to the previous reference frame, the motion vector difference of the current frame with respect to the previous reference frame including an average of picture of a square of difference of current frame minus previous reference frame x component of motion vector and of square of difference of the current frame minus the previous reference frame y component of motion vector, the temporal difference of the temporal difference of the motion vector difference of the current frame with respect to the previous reference frame, the temporal difference of the average value of motion compensated frame difference between the current frame with respect to the previous reference frame, and the temporal difference of the temporal difference of picture spatial complexities based on block rows and block columns of the current frame and the previous reference frame;

wherein a fourth feature group involved in the majority vote among the plurality of feature groups includes the average luma value of the current frame, the average luma value of the previous reference frame, the gain change temporal difference between the average luma value of the current frame and the previous reference frame, the count of a number of positive frame difference pixels in the current frame, and the count of a number of negative frame difference pixels in the current frame; and wherein each of the feature groups correspond to a decision tree deduced from a Random Forest machine learning approach;

wherein the operations of the scene change detector is performed in real-time in the absence of lookahead operations; and wherein the coder controller is to assign the current frame as an I-picture based at least in part on the determination of whether a scene change has occurred at the current frame.

11. A method of conducting scene change detection on a computer, comprising:

evaluating a current frame in a video sequence including a plurality of different scenes based at least in part on a plurality of feature groups, wherein each of the feature groups includes a plurality of feature values determined from individual features, wherein the individual features include one or more spatial features of the current frame and one or more temporal features of the current frame as compared with previously evaluated temporal features of a previous reference frame; and determining whether a scene change has occurred at the current frame based at least in part on a majority vote among the plurality of feature groups, wherein a first feature group includes a first plurality of features to determine an amount and distribution of texture over the current frame, wherein a second feature group includes a second plurality of features to determine an amount and distribution of motion for the current frame and the previous reference frame, wherein a third feature group includes a third plurality of features to determine whether the current frame and the previous reference frame are moving towards a more complex behavior or a simpler behavior, and wherein the first feature group, the second feature group, and the third feature group are each permitted one vote.

12. The method of claim 11, further comprising:

downsampling, via a downscaler, luma of the current frame based at least in part on point sampling or box filtering; and determining, via a spatial features extractor, spatial features values from the current frame without reference to other frames, wherein the spatial features values are determined from the one or more spatial features including one or more of the following: a picture based average of a row wise block gradient array, a picture based average of a column wise gradient array, a picture based sum and then an average of a block-wise spatial complexity, and a spatial complexity index that maps picture spatial complexity ranges to a single value, an average luma value of the current frame, and an average luma value of the previous reference frame.

13. The method of claim 12, further comprising:

storing, via a frame buffer, a luma array of the previous reference frame;

measuring, via a luma difference calculator, a picture luma average of a luma array of the current frame and to difference the picture luma average of the current frame from a picture luma average of the previous reference frame; and compensating, via a gain normalizer, the luma level of the previous reference frame based at least in part on a luma level difference between the current frame and the previous reference frame.

14. The method of claim 13, further comprising:

determining, via a temporal features extractor, temporal features values from the luma of the current frame, the luma of the previous reference frame, and the determined spatial feature values, wherein the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the temporal differentials of the spatial features of the current frame as compared to the previous reference frame;

wherein the one or more temporal features of the current frame as compared to the previous reference frame include one or more of the following:

a count of a number of positive frame difference pixels in the current frame, a count of a number of negative frame difference pixels in the current frame, an absolute frame difference of the current frame with respect to the previous reference frame, an average value of motion compensated frame difference between the current frame with respect to the previous reference frame, and a mapped value of a range of values associated with the average value of motion compensated frame difference between the current frame with respect to the previous reference frame that is mapped to a single value;

wherein the one or more temporal differentials of the spatial features of the current frame as compared to the previous reference frame include one or more of the following:

a gain change temporal difference between the average luma value of the current frame and the previous reference frame, a temporal difference of picture spatial complexities based on block rows of the current frame and the previous reference frame, a temporal difference of picture spatial complexities based on block columns of the current frame and the previous reference frame, and a temporal difference of picture spatial complexities based on block rows and block columns of the current frame and the previous reference frame;

wherein the one or more temporal differentials of the spatial features of the current frame as compared with spatial features of the previous reference frame include one or more of the following:

a temporal difference of the absolute frame difference of the current frame with respect to the previous reference frame, a motion vector difference of the current frame with respect to the previous reference frame including an average of picture of a square of difference of current frame minus previous reference frame x component of motion vector and of square of difference of the current frame minus the previous reference frame y component of motion vector, a temporal difference of the temporal difference of the motion vector difference of the current frame with respect to the previous reference frame, and a temporal difference of the average value of motion compensated frame difference between the current frame with respect to the previous reference frame; and wherein the at least one temporal differential of the spatial differentials of the temporal features of the current frame as compared to the previous reference frame includes: a temporal difference of the temporal difference of picture spatial complexities based on block rows and block columns of the current frame and the previous reference frame.

15. The method of claim 13, further comprising:

storing, via a spatial and temporal features buffer, the determined spatial features values of the previous reference frame and the determined temporal feature values of the previous reference frame; and performing, via a decision logic controller, the determination of whether a scene change has occurred based at least in part on the determined spatial features values of the current frame, the determined temporal feature values of the current frame, the determined spatial features values of the previous reference frame and the determined temporal feature values of the previous reference frame.

16. The method of claim 15, further comprising:

wherein the first feature group involved in the majority vote among the plurality of feature groups includes the picture based average of a row wise block gradient array, the picture based average of a column wise gradient array, and the picture based sum and then an average of a block-wise spatial complexity;

wherein the second feature group involved in the majority vote among the plurality of feature groups includes the absolute frame difference of the current frame with respect to the previous reference frame, the average value of motion compensated frame difference between the current frame with respect to the previous reference frame, the temporal difference of picture spatial complexities based on block rows of the current frame and the previous reference frame, the temporal difference of picture spatial complexities based on block columns of the current frame and the previous reference frame, and the temporal difference of picture spatial complexities based on block rows and block columns of the current frame and the previous reference frame;

wherein the third feature group involved in the majority vote among the plurality of feature groups includes the temporal difference of the absolute frame difference of the current frame with respect to the previous reference frame, the motion vector difference of the current frame with respect to the previous reference frame including an average of picture of a square of difference of current frame minus previous reference frame x component of motion vector and of square of difference of the current frame minus the previous reference frame y component of motion vector, the temporal difference of the temporal difference of the motion vector difference of the current frame with respect to the previous reference frame, the temporal difference of the average value of motion compensated frame difference between the current frame with respect to the previous reference frame, and the temporal difference of the temporal difference of picture spatial complexities based on block rows and block columns of the current frame and the previous reference frame;

wherein a fourth feature group involved in the majority vote among the plurality of feature groups includes the average luma value of the current frame, the average luma value of the previous reference frame, the gain change temporal difference between the average luma value of the current frame and the previous reference frame, the count of a number of positive frame difference pixels in the current frame, and the count of a number of negative frame difference pixels in the current frame; and wherein each of the feature groups correspond to a decision tree deduced from a Random Forest machine learning approach.

17. A system to detect scene changes, comprising:

a scene change detector, the scene change detector including a substrate and logic coupled to the substrate, wherein the logic is to:

evaluate a current frame in a video sequence including a plurality of different scenes based at least in part on a plurality of feature groups, wherein each of the feature groups includes a plurality of feature values determined from individual features, wherein the individual features include one or more spatial features of the current frame and one or more temporal features of the current frame as compared with previously evaluated temporal features of a previous reference frame;

determine whether a scene change has occurred at the current frame based at least in part on a majority vote among the plurality of feature groups, wherein a first feature group includes a first plurality of features to determine an amount and distribution of texture over the current frame, wherein a second feature group includes a second plurality of features to determine an amount and distribution of motion for the current frame and the previous reference frame, wherein a third feature group includes a third plurality of features to determine whether the current frame and the previous reference frame are moving towards a more complex behavior or a simpler behavior, and wherein the first feature group, the second feature group, and the third feature group are each permitted one vote; and a power supply to provide power to the scene change detector.

18. The system of claim 17, wherein the logic is to:
downsample luma of the current frame based at least in part on point sampling or box filtering;
determine spatial features values from the current frame without reference to other frames, wherein the spatial features values are determined from the one or more spatial features including one or more of the following: a picture based average of a row wise block gradient array, a picture based average of a column wise gradient array, a picture based sum and then an average of a block-wise spatial complexity, and a spatial complexity index that maps picture spatial complexity ranges to a single value, an average luma value of the current frame, and an average luma value of the previous reference frame;
store a luma array of the previous reference frame;
calculate a picture luma average of a luma array of the current frame and to difference the picture luma average of the current frame from a picture luma average of the previous reference frame; and
compensate the luma level of the previous reference frame based at least in part on a luma level difference between the current frame and the previous reference frame.

19. The system of claim 18, wherein the logic is to:
determine temporal features values from the downsampled luma of the current frame, the downsampled luma of the previous reference frame, and the determined spatial feature values, wherein the temporal features values are determined from one or more temporal features including: one or more temporal differentials of the spatial features of the current frame as compared with spatial features of the previous reference frame, one or more temporal features of the current frame as compared to the previous reference frame, one or more temporal differentials of the spatial features of the current frame as compared to the previous reference frame, and at least one temporal differential of the spatial differentials of the temporal features of the current frame as compared to the previous reference frame;
wherein the one or more temporal features of the current frame as compared to the previous reference frame include one or more of the following:
  a count of a number of positive frame difference pixels in the current frame,
  a count of a number of negative frame difference pixels in the current frame,
  an absolute frame difference of the current frame with respect to the previous reference frame,
  an average value of motion compensated frame difference between the current frame with respect to the previous reference frame, and
  a mapped value of a range of values associated with the average value of motion compensated frame difference between the current frame with respect to the previous reference frame that is mapped to a single value;
wherein the one or more temporal differentials of the spatial features of the current frame as compared to the previous reference frame include one or more of the following:
  a gain change temporal difference between the average luma value of the current frame and the previous reference frame,
  a temporal difference of picture spatial complexities based on block rows of the current frame and the previous reference frame,
  a temporal difference of picture spatial complexities based on block columns of the current frame and the previous reference frame, and
  a temporal difference of picture spatial complexities based on block rows and block columns of the current frame and the previous reference frame;
wherein the one or more temporal differentials of the spatial features of the current frame as compared with spatial features of the previous reference frame include one or more of the following:
  a temporal difference of the absolute frame difference of the current frame with respect to the previous reference frame,
  a motion vector difference of the current frame with respect to the previous reference frame including an average of picture of a square of difference of current frame minus previous reference frame x component of motion vector and of square of difference of the current frame minus the previous reference frame y component of motion vector,
  a temporal difference of the temporal difference of the motion vector difference of the current frame with respect to the previous reference frame, and
  a temporal difference of the average value of motion compensated frame difference between the current frame with respect to the previous reference frame; and
wherein the at least one temporal differential of the spatial differentials of the temporal features of the current frame as compared to the previous reference frame includes: a temporal difference of the temporal difference of picture spatial complexities based on block rows and block columns of the current frame and the previous reference frame.

20. At least one non-transitory computer readable storage medium comprising a set of instructions, which when executed by a computing system, cause the computing system to:
evaluate a current frame in a video sequence including a plurality of different scenes based at least in part on a plurality of feature groups, wherein each of the feature groups includes a plurality of feature values determined from individual features, wherein the individual features include one or more spatial features of the current frame and one or more temporal features of the current frame as compared with previously evaluated temporal features of a previous reference frame; and
determine whether a scene change has occurred at the current frame based at least in part on a majority vote among the plurality of feature groups, wherein a first feature group includes a first plurality of features to determine an amount and distribution of texture over the current frame, wherein a second feature group includes a second plurality of features to determine an amount and distribution of motion for the current frame and the previous reference frame, wherein a third feature group includes a third plurality of features to determine whether the current frame and the previous reference frame are moving towards a more complex behavior or a simpler behavior, and wherein the first feature group, the second feature group, and the third feature group are each permitted one vote.

21. The at least one non-transitory computer readable storage medium of claim 20, wherein the instructions, when executed, cause the computing system to:
- downsample luma of the current frame based at least in part on point sampling or box filtering;
- determine spatial features values from the current frame without reference to other frames, wherein the spatial features values are determined from the one or more spatial features including one or more of the following: a picture based average of a row wise block gradient array, a picture based average of a column wise gradient array, a picture based sum and then an average of a block-wise spatial complexity, and a spatial complexity index that maps picture spatial complexity ranges to a single value, an average luma value of the current frame, and an average luma value of the previous reference frame;
- store a luma array of the previous reference frame;
- calculate a picture luma average of a luma array of the current frame and to difference the picture luma average of the current frame from a picture luma average of the previous reference frame; and
- compensate the luma level of the previous reference frame based at least in part on a luma level difference between the current frame and the previous reference frame.

* * * * *